United States Patent
Meisel et al.

(10) Patent No.: US 9,495,956 B2
(45) Date of Patent: Nov. 15, 2016

(54) DEALING WITH SWITCH LATENCY IN SPEECH RECOGNITION

(71) Applicant: Nuance Communications, Inc., Burlington, MA (US)

(72) Inventors: William S. Meisel, Tarzana, CA (US); Michael S. Phillips, Belmont, MA (US); John N. Nguyen, Arlington, MA (US)

(73) Assignee: Nuance Communications, Inc., Burlington, MA (US)

(*) Notice: Subject to any disclaimer, the term of this patent is extended or adjusted under 35 U.S.C. 154(b) by 0 days.

(21) Appl. No.: 14/537,418

(22) Filed: Nov. 10, 2014

(65) Prior Publication Data
US 2015/0073802 A1  Mar. 12, 2015

Related U.S. Application Data

(63) Continuation of application No. 12/691,504, filed on Jan. 21, 2010, now Pat. No. 8,886,545, and a continuation-in-part of application No. 12/603,446, filed on Oct. 21, 2009, now Pat. No. 8,949,130, and a (Continued)

(51) Int. Cl.
*G10L 15/08* (2006.01)
*G10L 15/22* (2006.01)
(Continued)

(52) U.S. Cl.
CPC ............... *G10L 15/08* (2013.01); *G06F 3/167* (2013.01); *G10L 15/22* (2013.01); *G10L 17/22* (2013.01); *G10L 2015/088* (2013.01)

(58) Field of Classification Search
USPC .................................................. 704/270, 275
See application file for complete search history.

(56) References Cited

U.S. PATENT DOCUMENTS

| 5,613,036 A | 3/1997 | Strong |
| 5,632,002 A | 5/1997 | Hashimoto et al. |
| 5,717,828 A | 2/1998 | Rothenberg |

(Continued)

FOREIGN PATENT DOCUMENTS

| EP | 1104155 A1 | 5/2001 |
| WO | 03054859 A1 | 7/2003 |
| WO | 2008109835 A2 | 9/2008 |

OTHER PUBLICATIONS

Final Office Action issued in U.S. Appl. No. 12/603,446, mailed Jul. 13, 2012, 26 pgs.

(Continued)

*Primary Examiner* — Michael N Opsasnick
(74) *Attorney, Agent, or Firm* — Holland & Knight LLP; Mark H. Whittenberger, Esq.

(57) ABSTRACT

In embodiments of the present disclosure, capabilities are described for interacting with a mobile communication facility, which may include receiving a switch activation from a user to initiate a speech recognition recording session, recording the speech recognition recording session using a mobile communication facility resident capture facility, recognizing a portion of the voice command as an indication that user speech for recognition will begin following the end of the portion of the voice command, recognizing the recorded speech using a speech recognition facility to produce an external output, and using the selected output to perform a function on the mobile communication facility. The speech recognition recording session may include a voice command from the user followed by the speech to be recognized from the user.

24 Claims, 32 Drawing Sheets

Related U.S. Application Data continuation-in-part of application No. 12/123,952, filed on May 20, 2008, now abandoned, said application No. 12/603,446 is a continuation-in-part of application No. 12/184,282, filed on Aug. 1, 2008, now abandoned, and a continuation-in-part of application No. 12/184,286, filed on Aug. 1, 2008, now abandoned, and a continuation-in-part of application No. 12/184,342, filed on Aug. 1, 2008, now abandoned, and a continuation-in-part of application No. 12/184,359, filed on Aug. 1, 2008, now abandoned, and a continuation-in-part of application No. 12/184,375, filed on Aug. 1, 2008, now Pat. No. 8,886,540, and a continuation-in-part of application No. 12/184,465, filed on Aug. 1, 2008, now abandoned, and a continuation-in-part of application No. 12/184,490, filed on Aug. 1, 2008, and a continuation-in-part of application No. 12/184,512, filed on Aug. 1, 2008, now abandoned, and a continuation-in-part of application No. 11/865,692, filed on Oct. 1, 2007, now Pat. No. 8,880,405, and a continuation-in-part of application No. 11/865,694, filed on Oct. 1, 2007, now Pat. No. 8,996,379, and a continuation-in-part of application No. 11/865,697, filed on Oct. 1, 2007, now abandoned, and a continuation-in-part of application No. 11/866,675, filed on Oct. 3, 2007, now abandoned, and a continuation-in-part of application No. 11/866,704, filed on Oct. 3, 2007, now abandoned, and a continuation-in-part of application No. 11/866,725, filed on Oct. 3, 2007, now abandoned, and a continuation-in-part of application No. 11/866,755, filed on Oct. 3, 2007, now abandoned, and a continuation-in-part of application No. 11/866,777, filed on Oct. 3, 2007, now abandoned, and a continuation-in-part of application No. 11/866,804, filed on Oct. 3, 2007, now abandoned, and a continuation-in-part of application No. 11/866,818, filed on Oct. 3, 2007, now abandoned, and a continuation-in-part of application No. 12/044,573, filed on Mar. 7, 2008, now abandoned, and a continuation-in-part of application No. PCT/US2008/056242, filed on Mar. 7, 2008.

(60) Provisional application No. 61/146,073, filed on Jan. 21, 2009, provisional application No. 60/976,050, filed on Sep. 28, 2007, provisional application No. 60/977,143, filed on Oct. 3, 2007, provisional application No. 61/034,794, filed on Mar. 7, 2008, provisional application No. 60/893,600, filed on Mar. 7, 2007.

(51) Int. Cl.
  G06F 3/16 (2006.01)
  G10L 17/22 (2013.01)

(56) References Cited

U.S. PATENT DOCUMENTS

| | | | |
|---|---|---|---|
| 5,748,191 A | 5/1998 | Rozak et al. | |
| 5,749,072 A | 5/1998 | Mazurkiewicz et al. | |
| 5,806,034 A * | 9/1998 | Naylor | G10L 15/144 704/238 |
| 5,890,122 A | 3/1999 | Van Kleeck et al. | |
| 5,949,886 A * | 9/1999 | Nevins | H03G 3/001 381/104 |
| 6,081,779 A | 6/2000 | Besling et al. | |
| 6,101,467 A | 8/2000 | Bartosik | |
| 6,154,722 A | 11/2000 | Bellegarda | |
| 6,192,339 B1 | 2/2001 | Cox | |
| 6,374,226 B1 | 4/2002 | Hunt et al. | |
| 6,418,410 B1 | 7/2002 | Nassiff et al. | |
| 6,453,281 B1 | 9/2002 | Walters et al. | |
| 6,487,534 B1 | 11/2002 | Thelen et al. | |
| 6,513,010 B1 | 1/2003 | Lewin et al. | |
| 6,532,446 B1 | 3/2003 | King | |
| 6,704,707 B2 | 3/2004 | Anderson et al. | |
| 6,718,308 B1 | 4/2004 | Nolting | |
| 6,757,655 B1 | 6/2004 | Besling et al. | |
| 6,757,718 B1 | 6/2004 | Halverson et al. | |
| 6,766,294 B2 | 7/2004 | MacGinite et al. | |
| 6,766,295 B1 | 7/2004 | Murveit et al. | |
| 6,784,654 B2 | 8/2004 | Cyr et al. | |
| 6,785,647 B2 | 8/2004 | Hutchison | |
| 6,792,291 B1 | 9/2004 | Topol et al. | |
| 6,807,574 B1 | 10/2004 | Partovi et al. | |
| 6,823,307 B1 | 11/2004 | Steinbiss et al. | |
| 6,832,196 B2 | 12/2004 | Reich | |
| 6,839,667 B2 | 1/2005 | Reich | |
| 6,839,670 B1 * | 1/2005 | Stammler et al. | 704/251 |
| 6,856,957 B1 | 2/2005 | Dumoulin | |
| 6,868,385 B1 | 3/2005 | Gerson | |
| 6,910,003 B1 * | 6/2005 | Arnold | G06F 17/30616 704/1 |
| 6,934,684 B2 | 8/2005 | Alpdemir et al. | |
| 6,941,264 B2 | 9/2005 | Konopka et al. | |
| 6,999,930 B1 | 2/2006 | Roberts et al. | |
| 7,003,463 B1 | 2/2006 | Maes et al. | |
| 7,003,464 B2 | 2/2006 | Ferrans et al. | |
| 7,013,265 B2 | 3/2006 | Huang et al. | |
| 7,013,275 B2 | 3/2006 | Arnold et al. | |
| 7,016,827 B1 | 3/2006 | Ramaswamy et al. | |
| 7,027,975 B1 | 4/2006 | Pazandak et al. | |
| 7,035,804 B2 | 4/2006 | Saindon et al. | |
| 7,062,444 B2 | 6/2006 | He et al. | |
| 7,085,723 B2 | 8/2006 | Ross et al. | |
| 7,120,582 B1 | 10/2006 | Young et al. | |
| 7,139,715 B2 | 11/2006 | Dragosh et al. | |
| 7,174,297 B2 | 2/2007 | Guerra et al. | |
| 7,203,651 B2 | 4/2007 | Baruch et al. | |
| 7,203,721 B1 | 4/2007 | Ben-Efraim et al. | |
| 7,209,880 B1 | 4/2007 | Gajic et al. | |
| 7,225,130 B2 | 5/2007 | Roth et al. | |
| 7,228,275 B1 | 6/2007 | Endo et al. | |
| 7,236,931 B2 | 6/2007 | He et al. | |
| 7,277,853 B1 | 10/2007 | Bou-Ghazale et al. | |
| 7,283,850 B2 * | 10/2007 | Granovetter et al. | 455/570 |
| 7,302,383 B2 | 11/2007 | Valles | |
| 7,302,390 B2 | 11/2007 | Yang et al. | |
| 7,302,394 B1 | 11/2007 | Baray et al. | |
| 7,308,404 B2 | 12/2007 | Venkataraman et al. | |
| 7,313,526 B2 | 12/2007 | Roth et al. | |
| 7,328,155 B2 | 2/2008 | Endo et al. | |
| 7,340,395 B2 | 3/2008 | Gurram et al. | |
| 7,376,586 B1 | 5/2008 | Partovi et al. | |
| 7,409,349 B2 | 8/2008 | Wang et al. | |
| 7,437,291 B1 | 10/2008 | Stewart et al. | |
| 7,451,085 B2 | 11/2008 | Rose et al. | |
| 7,478,038 B2 | 1/2009 | Chelba et al. | |
| 7,487,440 B2 | 2/2009 | Gergic et al. | |
| 7,509,588 B2 | 3/2009 | Van Os et al. | |
| 7,555,431 B2 | 6/2009 | Bennett | |
| 7,558,731 B1 | 7/2009 | Hodjat et al. | |
| 7,574,672 B2 | 8/2009 | Jobs et al. | |
| 7,584,102 B2 | 9/2009 | Hwang et al. | |
| 7,603,276 B2 | 10/2009 | Yoshizawa | |
| 7,624,018 B2 | 11/2009 | Chambers et al. | |
| 7,647,225 B2 | 1/2010 | Bennett et al. | |
| 7,657,828 B2 | 2/2010 | Lucas et al. | |
| 7,672,543 B2 | 3/2010 | Hull et al. | |
| 7,676,367 B2 | 3/2010 | Roth et al. | |
| 7,689,416 B1 * | 3/2010 | Poirier | 704/235 |
| 7,689,420 B2 | 3/2010 | Pack et al. | |
| 7,716,051 B2 | 5/2010 | Dow et al. | |
| 7,725,307 B2 | 5/2010 | Bennett | |
| 7,725,320 B2 * | 5/2010 | Bennett | 704/255 |
| 7,729,904 B2 | 6/2010 | Bennett | |
| 7,752,043 B2 | 7/2010 | Watson | |

(56) References Cited

U.S. PATENT DOCUMENTS

| | | | |
|---|---|---|---|
| 7,752,152 B2 | 7/2010 | Paek et al. | |
| 7,756,708 B2 | 7/2010 | Cohen et al. | |
| 7,774,202 B2 * | 8/2010 | Spengler et al. | 704/236 |
| 7,831,429 B2 | 11/2010 | O'Hagan | |
| 7,839,532 B2 * | 11/2010 | Brawn | H04N 1/00403 358/1.1 |
| 7,921,011 B2 * | 4/2011 | Hernandez Abrego et al. | 704/254 |
| 7,956,846 B2 * | 6/2011 | Ording et al. | 345/173 |
| 7,979,277 B2 * | 7/2011 | Larri et al. | 704/238 |
| 7,983,912 B2 * | 7/2011 | Hirakawa et al. | 704/251 |
| 8,032,373 B2 * | 10/2011 | Dunsmuir | H04M 3/53333 379/88.01 |
| 8,056,070 B2 | 11/2011 | Goller et al. | |
| 8,086,604 B2 | 12/2011 | Arrouye et al. | |
| 8,175,876 B2 | 5/2012 | Bou-Ghazale et al. | |
| 8,311,835 B2 | 11/2012 | Lecoeuche | |
| 8,332,218 B2 | 12/2012 | Cross, Jr. et al. | |
| 8,838,457 B2 | 9/2014 | Cerra et al. | |
| 8,880,405 B2 | 11/2014 | Cerra et al. | |
| 8,886,540 B2 | 11/2014 | Cerra et al. | |
| 8,886,545 B2 | 11/2014 | Meisel et al. | |
| 8,949,130 B2 | 2/2015 | Phillips | |
| 8,949,266 B2 * | 2/2015 | Phillips | G10L 15/30 704/7 |
| 2001/0047258 A1 | 11/2001 | Rodrigo | |
| 2002/0010582 A1 | 1/2002 | Firman | |
| 2002/0055844 A1 * | 5/2002 | L'Esperance et al. | 704/260 |
| 2002/0072896 A1 | 6/2002 | Roberge et al. | |
| 2002/0087315 A1 | 7/2002 | Lee | |
| 2002/0091515 A1 * | 7/2002 | Garudadri | 704/231 |
| 2002/0091527 A1 | 7/2002 | Shiau | |
| 2002/0097692 A1 | 7/2002 | Ruotoistenmaki | |
| 2002/0099542 A1 | 7/2002 | Mitchell et al. | |
| 2002/0161579 A1 | 10/2002 | Saindon et al. | |
| 2002/0193986 A1 | 12/2002 | Schirris | |
| 2002/0194000 A1 | 12/2002 | Bennett et al. | |
| 2003/0023440 A1 | 1/2003 | Chu | |
| 2003/0033288 A1 | 2/2003 | Shanahan et al. | |
| 2003/0036903 A1 | 2/2003 | Konopka et al. | |
| 2003/0050783 A1 | 3/2003 | Yoshizawa | |
| 2003/0061200 A1 | 3/2003 | Hubert et al. | |
| 2003/0074183 A1 | 4/2003 | Eisele et al. | |
| 2003/0101054 A1 | 5/2003 | Davis et al. | |
| 2003/0115289 A1 | 6/2003 | Chinn et al. | |
| 2003/0125955 A1 | 7/2003 | Arnold et al. | |
| 2003/0167167 A1 | 9/2003 | Gong | |
| 2003/0182131 A1 | 9/2003 | Arnold et al. | |
| 2003/0236672 A1 | 12/2003 | Aaron et al. | |
| 2004/0054539 A1 | 3/2004 | Simpson | |
| 2004/0078191 A1 | 4/2004 | Tian et al. | |
| 2004/0078202 A1 | 4/2004 | Kamiya | |
| 2004/0083092 A1 | 4/2004 | Valles | |
| 2004/0083109 A1 | 4/2004 | Halonen et al. | |
| 2004/0117188 A1 | 6/2004 | Kiecza et al. | |
| 2004/0117189 A1 | 6/2004 | Bennett | |
| 2004/0128137 A1 | 7/2004 | Bush et al. | |
| 2004/0138890 A1 | 7/2004 | Ferrans et al. | |
| 2004/0148170 A1 | 7/2004 | Acero et al. | |
| 2004/0176958 A1 | 9/2004 | Salmenkaita et al. | |
| 2004/0192384 A1 | 9/2004 | Anastasakos et al. | |
| 2004/0215449 A1 | 10/2004 | Roy | |
| 2004/0230637 A1 | 11/2004 | Lecoueche et al. | |
| 2004/0236580 A1 | 11/2004 | Bennett | |
| 2004/0243307 A1 | 12/2004 | Geelen | |
| 2004/0260438 A1 | 12/2004 | Chernetsky et al. | |
| 2004/0260543 A1 | 12/2004 | Horowitz et al. | |
| 2004/0267518 A1 | 12/2004 | Kashima et al. | |
| 2005/0004798 A1 | 1/2005 | Kaminuma et al. | |
| 2005/0043947 A1 | 2/2005 | Roth et al. | |
| 2005/0043949 A1 | 2/2005 | Roth et al. | |
| 2005/0055210 A1 | 3/2005 | Venkataraman et al. | |
| 2005/0065779 A1 | 3/2005 | Odinak | |
| 2005/0091037 A1 | 4/2005 | Haluptzok et al. | |
| 2005/0114122 A1 | 5/2005 | Uhrbach et al. | |
| 2005/0137878 A1 | 6/2005 | Roth et al. | |
| 2005/0149327 A1 | 7/2005 | Roth et al. | |
| 2005/0154692 A1 | 7/2005 | Jacobsen et al. | |
| 2005/0159948 A1 | 7/2005 | Roth et al. | |
| 2005/0159949 A1 | 7/2005 | Yu et al. | |
| 2005/0159950 A1 | 7/2005 | Roth et al. | |
| 2005/0201540 A1 | 9/2005 | Rampey et al. | |
| 2005/0203740 A1 | 9/2005 | Chambers et al. | |
| 2005/0203751 A1 | 9/2005 | Stevens et al. | |
| 2005/0234723 A1 | 10/2005 | Arnold et al. | |
| 2005/0283364 A1 | 12/2005 | Longe | |
| 2005/0288005 A1 | 12/2005 | Roth et al. | |
| 2006/0009965 A1 | 1/2006 | Gao et al. | |
| 2006/0009974 A1 | 1/2006 | Junqua | |
| 2006/0009980 A1 | 1/2006 | Burke et al. | |
| 2006/0026140 A1 | 2/2006 | King et al. | |
| 2006/0058996 A1 | 3/2006 | Barker | |
| 2006/0080103 A1 | 4/2006 | Van Breemen | |
| 2006/0080105 A1 | 4/2006 | Lee et al. | |
| 2006/0085186 A1 | 4/2006 | Ma et al. | |
| 2006/0089798 A1 | 4/2006 | Kaufman et al. | |
| 2006/0095266 A1 | 5/2006 | McA'Nulty et al. | |
| 2006/0136221 A1 | 6/2006 | James et al. | |
| 2006/0149551 A1 | 7/2006 | Ganong, III et al. | |
| 2006/0167686 A1 | 7/2006 | Kahn | |
| 2006/0173683 A1 | 8/2006 | Roth | |
| 2006/0173684 A1 | 8/2006 | Fischer et al. | |
| 2006/0182346 A1 | 8/2006 | Yoda et al. | |
| 2006/0195323 A1 | 8/2006 | Monne et al. | |
| 2006/0212451 A1 | 9/2006 | Serdy, Jr. et al. | |
| 2006/0235684 A1 | 10/2006 | Chang | |
| 2006/0247915 A1 | 11/2006 | Bradford et al. | |
| 2006/0271364 A1 | 11/2006 | Mirkovic et al. | |
| 2006/0293889 A1 | 12/2006 | Kiss et al. | |
| 2006/0293893 A1 | 12/2006 | Horvitz | |
| 2007/0005363 A1 | 1/2007 | Cucerzan et al. | |
| 2007/0033037 A1 | 2/2007 | Mowatt et al. | |
| 2007/0033055 A1 | 2/2007 | Tanaka | |
| 2007/0038436 A1 | 2/2007 | Cristo et al. | |
| 2007/0038461 A1 | 2/2007 | Abbott et al. | |
| 2007/0046982 A1 | 3/2007 | Hull et al. | |
| 2007/0047818 A1 | 3/2007 | Hull et al. | |
| 2007/0049682 A1 | 3/2007 | Walsh | |
| 2007/0050360 A1 | 3/2007 | Hull et al. | |
| 2007/0053360 A1 | 3/2007 | Hino et al. | |
| 2007/0053380 A1 | 3/2007 | Graham | |
| 2007/0061147 A1 | 3/2007 | Monne et al. | |
| 2007/0061148 A1 | 3/2007 | Cross et al. | |
| 2007/0078822 A1 | 4/2007 | Cucerzan et al. | |
| 2007/0088556 A1 | 4/2007 | Andrew | |
| 2007/0100635 A1 | 5/2007 | Mahajan et al. | |
| 2007/0150278 A1 | 6/2007 | Bates et al. | |
| 2007/0162282 A1 | 7/2007 | Odinak | |
| 2007/0174058 A1 | 7/2007 | Burns et al. | |
| 2007/0208567 A1 | 9/2007 | Amento et al. | |
| 2007/0219974 A1 | 9/2007 | Chickering et al. | |
| 2007/0222734 A1 | 9/2007 | Tran | |
| 2007/0233488 A1 | 10/2007 | Carus | |
| 2007/0237334 A1 | 10/2007 | Willins et al. | |
| 2007/0239637 A1 | 10/2007 | Paek et al. | |
| 2007/0276651 A1 | 11/2007 | Bliss et al. | |
| 2008/0005284 A1 | 1/2008 | Ungar et al. | |
| 2008/0037727 A1 | 2/2008 | Siversten et al. | |
| 2008/0040099 A1 | 2/2008 | Wu | |
| 2008/0059195 A1 | 3/2008 | Brown | |
| 2008/0077386 A1 | 3/2008 | Gao et al. | |
| 2008/0082329 A1 | 4/2008 | Watson | |
| 2008/0091406 A1 | 4/2008 | Baldwin et al. | |
| 2008/0091435 A1 | 4/2008 | Strope et al. | |
| 2008/0091443 A1 | 4/2008 | Strope et al. | |
| 2008/0091721 A1 | 4/2008 | Harboe | |
| 2008/0114604 A1 | 5/2008 | Wei et al. | |
| 2008/0120112 A1 | 5/2008 | Jordan et al. | |
| 2008/0120665 A1 | 5/2008 | Relyea et al. | |
| 2008/0126075 A1 | 5/2008 | Thorn | |
| 2008/0130699 A1 | 6/2008 | Ma et al. | |
| 2008/0133228 A1 | 6/2008 | Rao | |
| 2008/0154600 A1 | 6/2008 | Tian et al. | |
| 2008/0154611 A1 | 6/2008 | Evermann et al. | |

(56) References Cited

U.S. PATENT DOCUMENTS

| | | |
|---|---|---|
| 2008/0162136 A1 | 7/2008 | Agapi et al. |
| 2008/0183462 A1 | 7/2008 | Ma et al. |
| 2008/0221879 A1 | 9/2008 | Cerra et al. |
| 2008/0221880 A1 | 9/2008 | Cerra et al. |
| 2008/0221884 A1 | 9/2008 | Cerra et al. |
| 2008/0221889 A1 | 9/2008 | Cerra et al. |
| 2008/0221897 A1 | 9/2008 | Cerra et al. |
| 2008/0221898 A1 | 9/2008 | Cerra et al. |
| 2008/0221899 A1 | 9/2008 | Cerra et al. |
| 2008/0221900 A1 | 9/2008 | Cerra et al. |
| 2008/0221901 A1 | 9/2008 | Cerra et al. |
| 2008/0221902 A1 | 9/2008 | Cerra et al. |
| 2008/0262848 A1 | 10/2008 | Shienbrood et al. |
| 2008/0288252 A1 | 11/2008 | Cerra et al. |
| 2008/0312934 A1 | 12/2008 | Cerra et al. |
| 2009/0006100 A1 | 1/2009 | Badger et al. |
| 2009/0030684 A1 | 1/2009 | Cerra et al. |
| 2009/0030685 A1 | 1/2009 | Cerra et al. |
| 2009/0030687 A1 | 1/2009 | Cerra et al. |
| 2009/0030688 A1 | 1/2009 | Cerra et al. |
| 2009/0030691 A1 | 1/2009 | Cerra et al. |
| 2009/0030696 A1 | 1/2009 | Cerra et al. |
| 2009/0030697 A1 | 1/2009 | Cerra et al. |
| 2009/0030698 A1 | 1/2009 | Cerra et al. |
| 2009/0319267 A1 | 12/2009 | Kurki-Suonio |
| 2010/0106497 A1 | 4/2010 | Phillips |
| 2010/0139002 A1 | 6/2010 | Walker et al. |
| 2010/0185448 A1* | 7/2010 | Meisel ............... G10L 15/22 704/256.1 |
| 2010/0250243 A1 | 9/2010 | Schalk et al. |
| 2011/0054894 A1 | 3/2011 | Phillips et al. |
| 2011/0054895 A1 | 3/2011 | Phillips et al. |
| 2011/0054896 A1 | 3/2011 | Phillips et al. |
| 2011/0054897 A1 | 3/2011 | Phillips et al. |
| 2011/0054898 A1 | 3/2011 | Phillips et al. |
| 2011/0054899 A1 | 3/2011 | Phillips et al. |
| 2011/0054900 A1 | 3/2011 | Phillips et al. |
| 2011/0055256 A1* | 3/2011 | Phillips ............... G10L 15/30 707/769 |
| 2011/0060587 A1 | 3/2011 | Phillips et al. |
| 2011/0066634 A1 | 3/2011 | Phillips et al. |

OTHER PUBLICATIONS

Final Office Action issued in U.S. Appl. No. 12/184,375, mailed Jun. 27, 2012, 22 pgs.
Final Office Action issued in U.S. Appl. No. 12/184,465, mailed on Jun. 27, 2012, 33 pgs.
Non-Final Office Action issued in U.S. Appl. No. 11/866,777, mailed on Jun. 14, 2012, 27 pgs.
Final Office Action issued in U.S. Appl. No. 12/184,490, mailed on May 2, 2012, 40 pgs.
Final Office action issued in U.S. Appl. No. 12/184,512, mailed on May 2, 2012, 25 pgs.
Non-Final Office Action issued in U.S. Appl. No. 12/870,257, mailed on May 1, 2012, 24 pgs.
Final Office Action issued in U.S. Appl. No. 12/123,952, mailed on May 14, 2012, 23 pgs.
Sorin et al., "The ETSI Extended Distributed Speech Recognition (DSR) Standards: Client Side Processing and Tonal Language Recognition Evaluation", 2004, pp. 129-132.
Ramabadran et al., "The ETSI Extended Distributed Speech Recognition (DSR) Standards: Servcer-Side Speech Reconstruction", 2004, pp. 53-56.
Final Office Action issued in U.S. Appl. No. 11/866,675, mailed on Oct. 4, 2011, 23 pgs.
Final Office Action issued in U.S. Appl. No. 11/866,725, mailed on Oct. 4, 2011, 26 pgs.
Final Office Action issued in U.S. Appl. No. 11/866,755, mailed on Oct. 4, 2011, 25 pgs.
Non-Final Office Action issued in U.S. Appl. No. 11/866,818, mailed on Jun. 9, 2011, 22 pgs.
Non-Final Office Action issued in U.S. Appl. No. 12/044,573, mailed on Jul. 7, 2011, 38 pgs.
Final Office Action issued in U.S. Appl. No. 12/184,375, mailed on Jul. 5, 2011, 22 pgs.
Non-Final Office Action in U.S. Appl. No. 12/870,008, mailed Jan. 31, 2013.
Non-Final Office Action in U.S. Appl. No. 12/870,025, mailed Jan. 23, 2013.
Non-Final Office Action in U.S. Appl. No. 12/870,071, mailed Jan. 18, 2013.
Non-Final Office Action in U.S. Appl. No. 12/870,112, mailed Feb. 13, 2013.
Final Office Action in U.S. Appl. No. 12/870,221, mailed Oct. 25, 2012.
International Search Report for US Patent Application No. PCT/US2008/056242, mailed Aug. 8, 2008.
Oral Proceeding from related EU Patent Application No. 08731692.3 mailed May 21, 2014, 21 pages.
Final Office Action in related U.S. Appl. No. 12/044,573, mailed Apr. 19, 2012, 28 pages.
Final Office Action in related U.S. Appl. No. 12/184,282, mailed Apr. 25, 2012, 23 pages.
Non-Final Office Action in related U.S. Appl. No. 12/184,375, mailed Dec. 2, 2011, 15 pages.
Non-Final Office Action in related U.S. Appl. No. 12/870,221, mailed Mar. 12, 2012, 24 pages.
Final Office Action in related U.S. Appl. No. 11/866,818, mailed Feb. 17, 2012, 24 pages.
Final Office Action in related U.S. Appl. No. 11/865,692, mailed Sep. 30, 2011, 20 pages.
Non-Final Office Action in related U.S. Appl. No. 12/123,952, mailed Sep. 8, 2011, 20 pages.
Non-Final Office Action in related U.S. Appl. No. 11/865,694, mailed Sep. 30, 2011, 18 pages.
Final Office Action in related U.S. Appl. No. 11/865,697, mailed Oct. 4, 2011, 16 pages.
Final Office Action in related U.S. Appl. No. 11/866,777, mailed Sep. 30, 2011, 25 pages.
Final Office Action in related U.S. Appl. No. 11/866,804, mailed Sep. 30, 2011, 25 pages.
Non-Final Office Action in related U.S. Appl. No. 12/184,512, mailed Aug. 26, 2011, 24 pages.
Notice of Allowance in related U.S. Appl. No. 12/184,465, mailed Jun. 27, 2011, 26 pages.
Brondsted, et al. "Mobile Information Access with Spoken Query Answering," pp. 1-4 (2005).
Non-Final Office Action in related U.S. Appl. No. 11/865,697, mailed Mar. 17, 2011, 14 pages.
Non-Final Office Action in related U.S. Appl. No. 11/865,675, mailed May 10, 2011, 19 pages.
Final Office Action in related U.S. Appl. No. 12/184,342, mailed Apr. 5, 2011, 49 pages.
Non-Final Office Action in related U.S. Appl. No. 11/865,692, mailed Dec. 23, 2010, 19 pages.
Non-Final Office Action in related U.S. Appl. No. 11/865,694, mailed Feb. 2, 2011, 14 pages.
Non-Final Office Action in related U.S. Appl. No. 11/866,704, mailed Feb. 11, 2011, 24 pages.
Non-Final Office Action in related U.S. Appl. No. 11/866,725, mailed Feb. 14, 2011.
Non-Final Office Action in related U.S. Appl. No. 11/866,755, mailed Mar. 8, 2011, 25 pages.
Non-Final Office Action in related U.S. Appl. No. 11/866,777, mailed Mar. 8, 2011, 25 pages.
Non-Final Office Action in related U.S. Appl. No. 11/866,804, mailed Mar. 7, 2011, 25 pages.
Non-Final Office Action in related U.S. Appl. No. 12/184,375, mailed Jan. 26, 2011, 28 pages.
Non-Final Office Action in related U.S. Appl. No. 12/184,465, mailed Jan. 26, 2011, 32 pages.
Non-Final Office Action in related U.S. Appl. No. 12/184,490, mailed Jan. 27, 2011, 30 pages.

(56) References Cited

OTHER PUBLICATIONS

Non-Final Office Action in related U.S. Appl. No. 12/184,512, mailed Jan. 26, 2011, 16 pages.
Non-Final Office Action in related U.S. Appl. No. 12/603,446, mailed Feb. 23, 2011, 25 pages.
Final Office Action in related U.S. Appl. No. 12/184,282, mailed Dec. 15, 2010, 152 pages.
Final Office Action in related U.S. Appl. No. 12/184,286, mailed Mar. 9, 2011, 44 pages.
Final Office Action in related U.S. Appl. No. 12/184,359, mailed Mar. 4, 2011, 51 pages.
Speech Processing, Transmission and Quality Aspects (STQ); Distributed Speech Recognition; Extend Advanced Front-End Feature Extraction Algorithm; Compression Algorithms, Back-end Speech Reconstruction Algorithm, ETSI ES 202 212, ETSI Standard, 1.1.2 (Nov. 2005).
Final Office Action in related U.S. Appl. No. 11/866,704, mailed Oct. 4, 2011, 26 pages.
Non-Final Office Action in related U.S. Appl. No. 12/184,342, mailed Jul. 29, 2010, 42 pages.
Non-Final Office Action in related U.S. Appl. No. 12/184,359, mailed Jul. 22, 2010, 149 pages.
Non-Final Office Action in related U.S. Appl. No. 12/184,286, mailed Jul. 20, 2010, 37 pages.
Non-Final Office Action in related U.S. Appl. No. 12/184,282, mailed Jul. 2, 2010, 44 pages.
Brondsted, et al., "Distrubuted Speech Recognition for Information Retrieval on Mobile Devices," (Sep. 2006), Speech and Multimedia Communication (SMC), Department of Communication Technology, Aalborg Univ.
Non-Final Office Action in related U.S. Appl. No. 12/184,465, mailed Oct. 21, 2011, 27 pages.
Mirkovic, et al., "Practical Plug-and-Play Dialogue Management," 2005.
Paek, et al., "Improving Command and Control Speech Recognition on Mobile Devices: Using predictive User Models for Language Modeling," (Jan. 18, 2007).
Rayner, et al., "Plug and Play Speech Understanding," 2001.
Xu, et al., "A Configurable Distributed Speech Recognition System." Sep. 2005.
European Search Report in Application No. 08731692.3, mailed Jun. 20, 2011.
Communication in European Patent Application No. 08731692.3, mailed May 21, 2014.
Non-Final Office Action in U.S. Appl. No. 12/184,282, mailed Aug. 24, 2011.
Non-Final Office Action in related U.S. Appl. No. 12/603,446, mailed Oct. 19, 2011, 23 pages.
Final Office Action in U.S. Appl. No. 12/184,286, mailed Oct. 21, 2013.
Final Office Action in U.S. Appl. No. 12/184,342, mailed Oct. 23, 2013.
Final Office Action in related U.S. Appl. No. 12/184,282, mailed Dec. 15, 2010.
Final Office Action in U.S. Appl. No. 12/870,221, mailed Apr. 30, 2014.
Final Office Action in U.S. Appl. No. 12/870,368, mailed Nov. 21, 2013.
Galindo, et al., "Control Architecture for Human-Robot Integration: Application to a Robotic Wheelchair," IEEE Transactions on Systems, Man, and Cybernetics—Part B: Cybernetics, vol. 36, No. 5 (Oct. 2006).
Harper, et al., "Integrating Language Models with Speech Recognition," Purdue University, http://www.umiacs.umd.edu/~mharper/papers/aaai94.pdf, 9 pages, (retrieved on Mar. 26, 2014).
Li, Jin-Yu, et al., "A Complexity Reduction of ETSI Advanced Front-End for DSR," ICASSP 2004, IEEE, pp. I-61-4 vol. 1 (May 17-21, 2004).
Non-Final Office Action in U.S. Appl. No. 11/865,692, mailed Oct. 3, 2013.
Non-Final Office Action in U.S. Appl. No. 11/865,694, mailed Oct. 8, 2013.
Non-Final Office Action in U.S. Appl. No. 11/865,694, mailed Jun. 5, 2014.
Non-Final Office Action in U.S. Appl. No. 11/865,697, mailed Oct. 3, 2013.
Non-Final Office Action in U.S. Appl. No. 11/866,675, mailed Feb. 26, 2014.
Non-Final Office Action in U.S. Appl. No. 11/866,704, mailed Aug. 30, 2013.
Non-Final Office Action in U.S. Appl. No. 11/866,725, mailed Sep. 10, 2013.
Non-Final Office Action in U.S. Appl. No. 11/866,755, mailed Oct. 10, 2013.
Non-Final Office Action in U.S. Appl. No. 11/866,804, mailed Nov. 8, 2013.
Non-Final Office Action in U.S. Appl. No. 12/044,573, mailed Dec. 5, 2013.
Non-Final Office Action in U.S. Appl. No. 12/184,375, mailed Oct. 28, 2013.
Non-Final Office Action in U.S. Appl. No. 12/603,446, mailed Oct. 16, 2013.
Non-Final Office Action in U.S. Appl. No. 12/870,138, mailed Nov. 19, 2013.
Notice of Allowance in U.S. Appl. No. 11/865,692, mailed Jun. 18, 2014.
Notice of Allowance in U.S. Appl. No. 12/184,342, mailed May 7, 2014.
Notice of Allowance in U.S. Appl. No. 12/184,375, mailed Apr. 30, 2014.
Notice of Allowance in U.S. Appl. No. 12/603,446, mailed May 2, 2014.
Notice of Allowance mailed in U.S. Appl. No. 12/870,257, mailed Sep. 13, 2013.
Non-Final Office Action in U.S. Appl. No. 12/870,368, mailed Feb. 12, 2013.
Non-Final Office Action in U.S. Appl. No. 12/870,411, mailed Dec. 6, 2012.
Non-Final Office Action in U.S. Appl. No. 12/870,453, mailed Dec. 7, 2012.
Non-Final Office Action in U.S. Appl. No. 12/184,359, mailed Feb. 11, 2013.
Non-Final Office Action in U.S. Appl. No. 12/184,286, mailed Feb. 21, 2013.
Non-Final Office Action in U.S. Appl. No. 12/184,282, mailed Feb. 7, 2013.
Non-Final Office Action in U.S. Appl. No. 12/184,342, mailed Feb. 12, 2013.
Non-Final Office Action in U.S. Appl. No. 12/870,138, mailed Mar. 13, 2013.
Non-Final Office Action in U.S. Appl. No. 12/184,375, mailed Mar. 5, 2013.
Final Office Action in U.S. Appl. No. 11/866,777, mailed Feb. 1, 2013.
Non-Final Office Action in U.S. Appl. No. 12/603,446, mailed Dec. 6, 2012.
Final Office Action in U.S. Appl. No. 12/603,446, mailed Apr. 24, 2013.
Final Office Action in U.S. Appl. No. 12/870,257, mailed Jan. 16, 2013.
Notice of Allowance in U.S. Appl. No. 12/184,375, mailed Aug. 4, 2014 (30 pages).
Notice of Allowance in U.S. Appl. No. 12/603,446, mailed Jul. 30, 2014 (23 pages).
Notice of Allowance in U.S. Appl. No. 12/870,221, mailed Oct. 1, 2014 (29 pages).
Notice of Allowance in U.S. Appl. No. 11/865,692, mailed Aug. 15, 2014 (19 pages).
Non-Final Office Action in related U.S. Appl. No. 14/570,404, mailed Dec. 2, 2015, 10 pages.
Decision on Appeal in related U.S. Appl. No. 12/184,490, mailed Oct. 14, 2015, 8 pages.

(56) References Cited

OTHER PUBLICATIONS

Final Office Action in related U.S. Appl. No. 12/691,504, mailed Apr. 30, 2013.
Non-Final Office Action in related U.S. Appl. No. 11/866,675, mailed May 10, 2011.
Non-Final Office Action in related U.S. Appl. No. 12/184,490, mailed Aug. 25, 2011.
Non-Final Office Action in related U.S. Appl. No. 12/691,504, mailed Oct. 3, 2012.
Non-Final Office Action in related U.S. Appl. No. 11/865,694, mailed Jun. 5, 2014.
Notice of Allowance in related U.S. Appl. No. 12/691,504, mailed Jul. 24, 2014.
Notice of Allowance in related U.S. Appl. No. 11/865,694, mailed Nov. 21, 2014.
Ex Parte Quayle Action in related U.S. Appl. No. 14/570,404, mailed Jul. 8, 2016 (47 pages).
Non-Final Office Action in related U.S. Appl. No. 12/184,490, mailed Apr. 14, 2016 (49 pages).
Final Office Action in related U.S. Appl. No. 12/184,490, mailed Sep. 26, 2016 (32 pages).

* cited by examiner

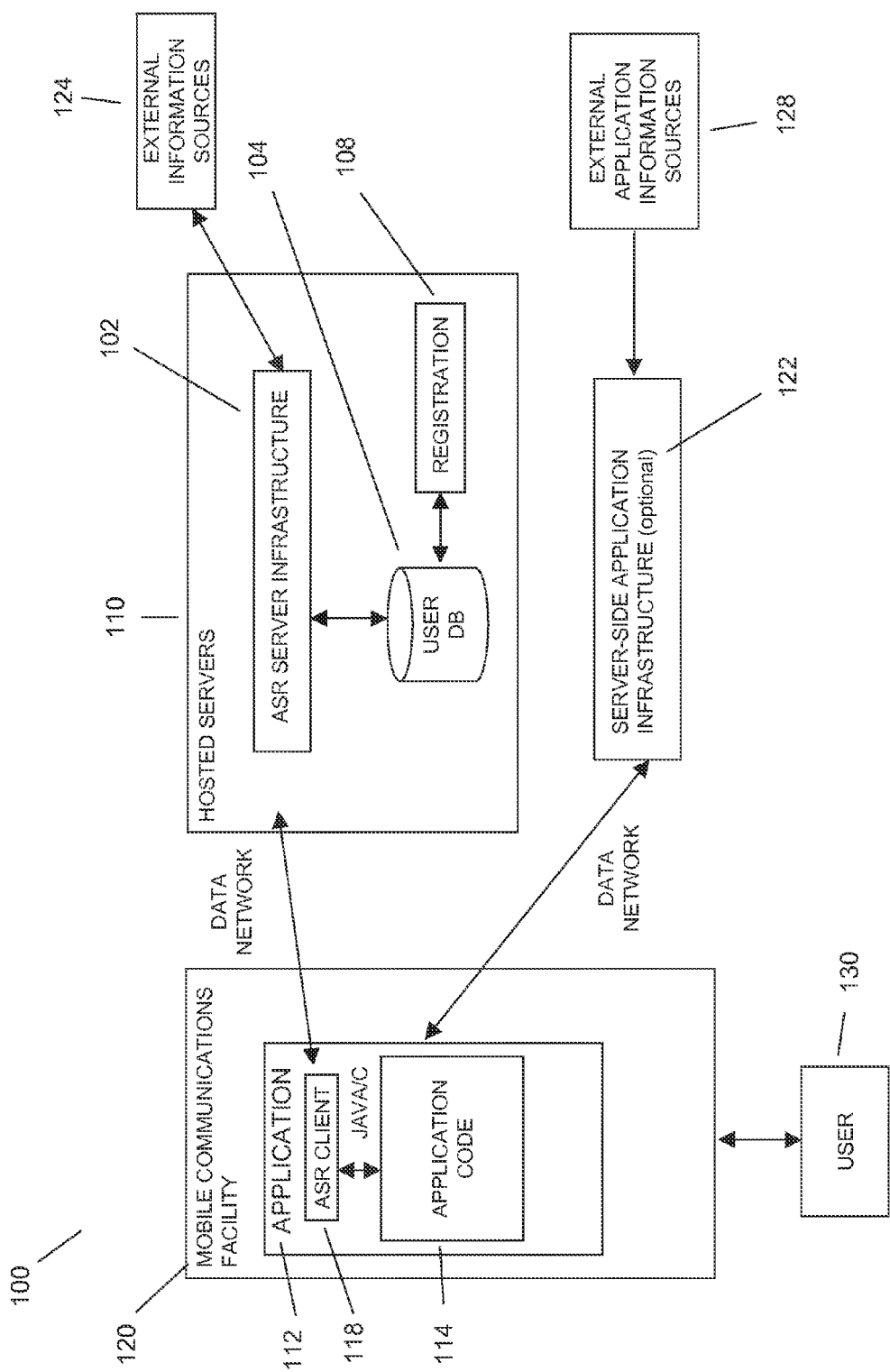

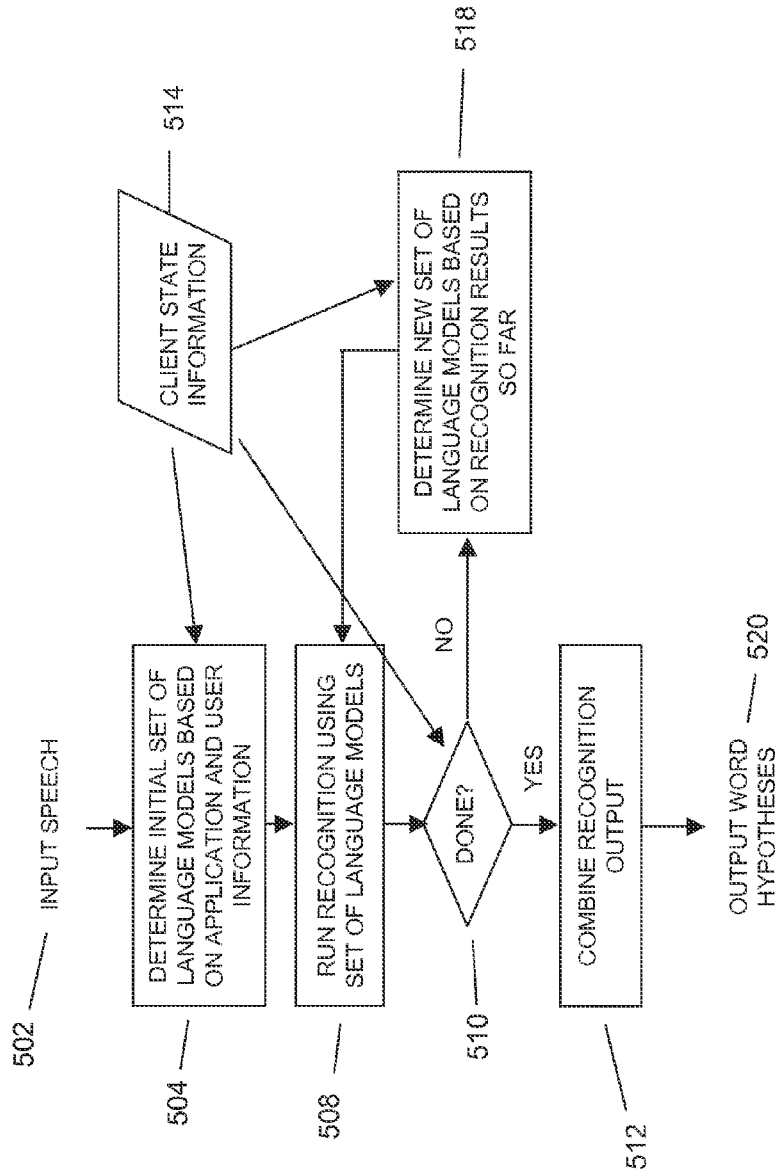

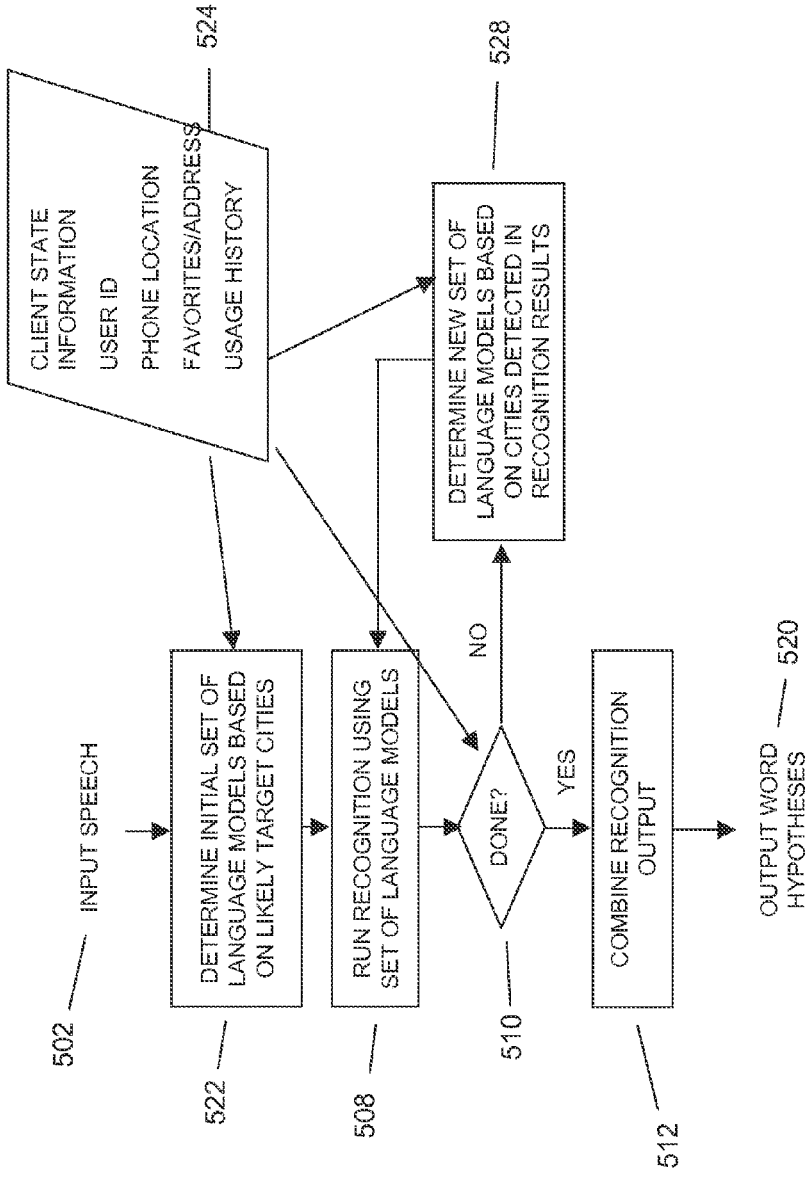

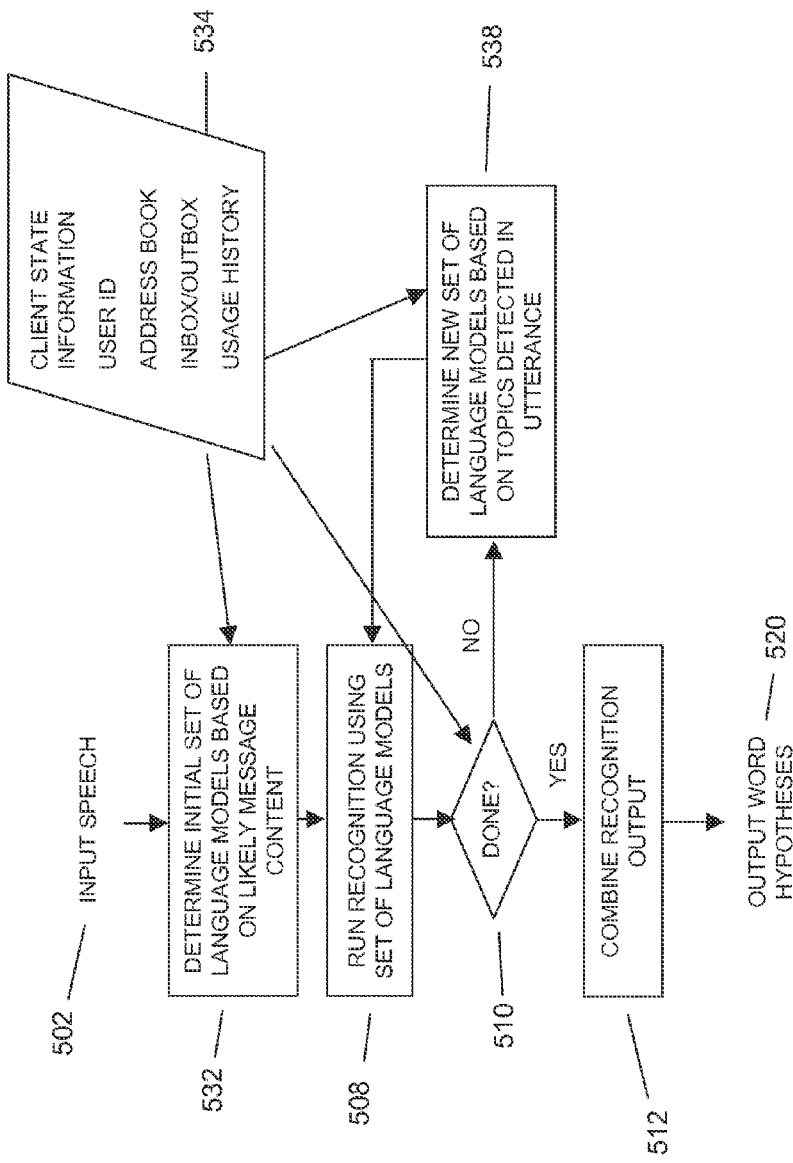

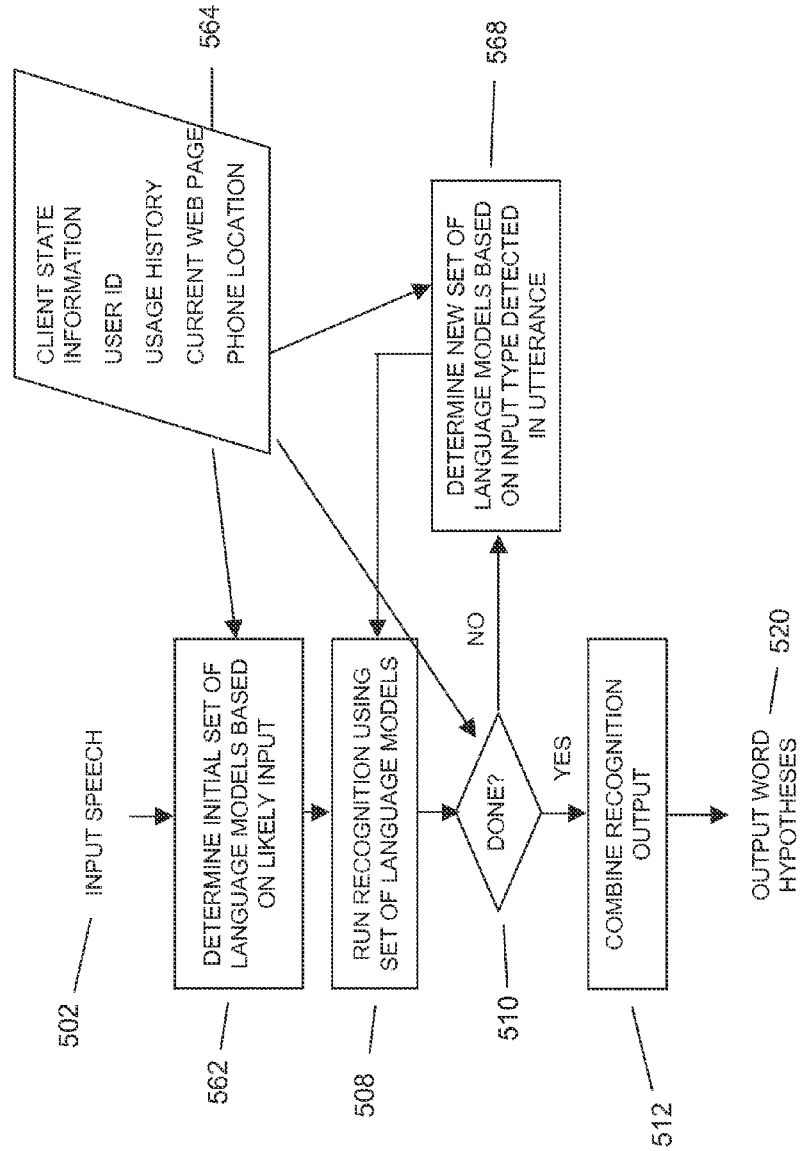

| BYTE(S) | DESCRIPTION |
|---|---|
| 0 | PACKET VERSION (HEX VALUE 80) |
| 1-3 | PACKET TYPE |
| 4-7 | LENGTH OF PACKET (EXCLUDING HEADER) |
| 8-11 | DATA FLAGS (INCLUDING GENERATION COUNT, ETC) |
| 12-19 | UNRESERVED DATA (LOAD BALANCING, EXTRA FLAGS, ETC) |

Fig. 18

```
<RouterStatus maxServers="max number servers"
activeThreadCount="number active threads" timestamp="month/day/year
hour:min:second.millisecond am/pm">
    <RegisteredModels count="number of registered models">
        <Model AM="server am" LM="server lm"/>
        ⋮
    </RegisteredModels>
    <RegisteredServers count="number of registered servers">
        <Server ID="server id"/>
        ⋮
    </RegisteredServers>
    <ActiveServers count="number of active servers">
        <Server ID="server id" IP="ip address" port="port number"
name="server name" AM="server am" LM="server lm" protocol="server
protocol (float)" load="load (double)" utteranceLoad="load (int)"
sessionLoad="load (int)" available="availability (true/false)"/>
        ⋮
    </ActiveServers>
</RouterStatus>
```

Fig. 19

DEALING WITH SWITCH LATENCY IN SPEECH RECOGNITION

CROSS-REFERENCE TO RELATED APPLICATIONS

The subject application is a continuation application of U.S. patent application with Ser. No. 12/691,504, filed on Jan. 21, 2010, now U.S. Pat. No. 8,886,545 issued on Nov. 11, 2014, which is hereby incorporated by reference in its entirety. This application claims the benefit of U.S. Provisional Appl. No. 61/146,073 filed Jan. 21, 2009, which is hereby incorporated by reference in its entirety.

This application is a continuation-in-part of U.S. patent application Ser. No. 12/603,446 filed Oct. 21, 2009 ('446 application), which is hereby incorporated by reference in its entirety. The '446 application is a continuation-in-part of the following U.S. patent application: U.S. patent application Ser. No. 12/123,952 filed May 20, 2008 which claims the benefit of U.S. Provisional App. Ser. No. 60/976,050 filed Sep. 28, 2007; U.S. Provisional App. Ser. No. 60/977,143 filed Oct. 3, 2007; and U.S. Provisional App. Ser. No. 61/034,794 filed Mar. 7, 2008, each of which is incorporated herein by reference in its entirety.

The '446 application is also a continuation-in-part of the following U.S. patent applications, each of which is incorporated by reference in its entirety: U.S. patent application Ser. No. 12/184,282 filed Aug. 1, 2008; U.S. patent application Ser. No. 12/184,286 filed Aug. 1, 2008; U.S. patent application Ser. No. 12/184,342 filed Aug. 1, 2008; U.S. patent application Ser. No. 12/184,359 filed Aug. 1, 2008; U.S. patent application Ser. No. 12/184,375 filed Aug. 1, 2008; U.S. patent application Ser. No. 12/184,465 filed Aug. 1, 2008; U.S. patent application Ser. No. 12/184,490 filed Aug. 1, 2008; U.S. patent application Ser. No. 12/184,512 filed Aug. 1, 2008; U.S. patent application Ser. No. 11/865,692 filed Oct. 1, 2007; U.S. patent application Ser. No. 11/865,694 filed Oct. 1, 2007; U.S. patent application Ser. No. 11/865,697 filed Oct. 1, 2007; U.S. patent application Ser. No. 11/866,675 filed Oct. 3, 2007; U.S. patent application Ser. No. 11/866,704 filed Oct. 3, 2007; U.S. patent application Ser. No. 11/866,725 filed Oct. 3, 2007; U.S. patent application Ser. No. 11/866,755 filed Oct. 3, 2007; U.S. patent application Ser. No. 11/866,777 filed Oct. 3, 2007; U.S. patent application Ser. No. 11/866,804 filed Oct. 3, 2007; U.S. patent application Ser. No. 11/866,818 filed Oct. 3, 2007; and U.S. patent application Ser. No. 12/044,573 filed Mar. 7, 2008 which claims the benefit of U.S. Provisional App. Ser. No. 60/893,600 filed Mar. 7, 2007.

The '446 application claims priority to international patent application Ser. No. PCTUS2008056242 filed Mar. 7, 2008, which is incorporated herein by reference in its entirety.

BACKGROUND

Field

The present invention is related to speech recognition, and specifically to speech recognition in association with a mobile communications facility or a device that provides a service to a user such as a music-playing device or a navigation system.

Description of the Related Art

Speech recognition, also known as automatic speech recognition, is the process of converting a speech signal to a sequence of words by means of an algorithm implemented as a computer program. Speech recognition applications that have emerged in recent years include voice dialing (e.g., call home), call routing (e.g., I would like to make a collect call), simple data entry (e.g., entering a credit card number), and preparation of structured documents (e.g., a radiology report). Current systems are either not for mobile communication devices or utilize constraints, such as requiring a specified grammar, to provide real-time speech recognition.

SUMMARY

In embodiments, a solution to the instantiation problem may be to implement "application naming." A name may be assigned to the application, and the user is told that they must address the application (or their digital "personal assistant") by name before telling the application what they want—e.g., "Vlingo, call John Jones." If the time needed to say the name before the command is sufficient to allow the key press to be detected, only part of the name will be cut off, and the command will be left intact. While the command itself is fully intact, the problem of dealing with a clipped name remains, since we must "remove" this remnant so that it doesn't get incorporated into the interpretation of the spoken command. Giving the application a name has the additional advantage that it can "personalize" it, making it seem more like a human assistant than software, and increasing acceptance of the application.

In embodiments, the present invention may provide for a method of interacting with a mobile communication facility comprising receiving a switch activation from a user to initiate a speech recognition recording session, wherein the speech recognition recording session comprises a voice command from the user followed by the speech to be recognized from the user; recording the speech recognition recording session using a mobile communication facility resident capture facility; recognizing at least a portion of the voice command as an indication that user speech for recognition will begin following the end of the at least a portion of the voice command; recognizing the recorded speech using a speech recognition facility to produce an external output; and using the selected output to perform a function on the mobile communication facility. In embodiments, the voice command may be a single word or multiple words. The switch may be a physical switch on the mobile communication facility. The switch may be a virtual switch displayed on the mobile communications facility. The voice command may be pre-defined. The voice command may be an application name. The voice command may be user selectable. The user may input the voice command by voice input, by typing, and the like. The voice command may be verified by the characteristics of the user's voice. The at least a portion of the voice command may be a portion of the command that was not clipped off during the speech recognition recording session as a result of user providing the command before the mobile communication facility resident capture facility was ready to receive. The recognizing at least a portion of the voice command may be through language modeling. The language modeling may involve collecting examples of portions of the voice command as spoken by a plurality of users. The recognizing at least a portion of the voice command may be through dictionary representation, acoustic modeling, and the like. The acoustic modeling may create a statistical model that can be used in Hidden Markov Model processing to fit a sound of the at least a portion of the voice command. The at least a portion of the voice command may be an individual sound, a plurality of sounds, and the like. The acoustic modeling may involve collecting examples of sounds for the voice command as spoken by a plurality of users. The speech recognition facility may be internal to the mobile communication facility, external to the mobile communication facility, or a combination of the two. The recognizing at least a portion of the voice command may be performed internal to the mobile communication facility, and recognizing the recorded speech may be performed external to the mobile communications facility.

In embodiments, the present invention may provide for a method of interacting with a mobile communication facility comprising receiving a switch activation from a user to initiate a speech recognition recording session, wherein the speech recognition recording session comprises a voice command from the user followed by the speech to be recognized from the user; recording the speech recognition recording session using a mobile communication facility resident capture facility; recognizing the voice-command as an indication that user speech for recognition will begin following the end of voice command; recognizing the recorded speech using a speech recognition facility to produce an external output; and using the selected output to perform a function on the mobile communication facility.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIG. 1 depicts a block diagram of the mobile environment speech processing facility.

FIG. 5A depicts the process by which multiple language models may be used by the ASR engine.

FIG. 5B depicts the process by which multiple language models may be used by the ASR engine for a navigation application embodiment.

FIG. 5C depicts the process by which multiple language models may be used by the ASR engine for a messaging application embodiment.

FIG. 5F depicts the process by which multiple language models may be used by the ASR engine for a browser application embodiment.

FIG. 18 depicts an example of the contents of a header.

FIG. 19 depicts the format of a status packet.

DETAILED DESCRIPTION

Figure 1A:
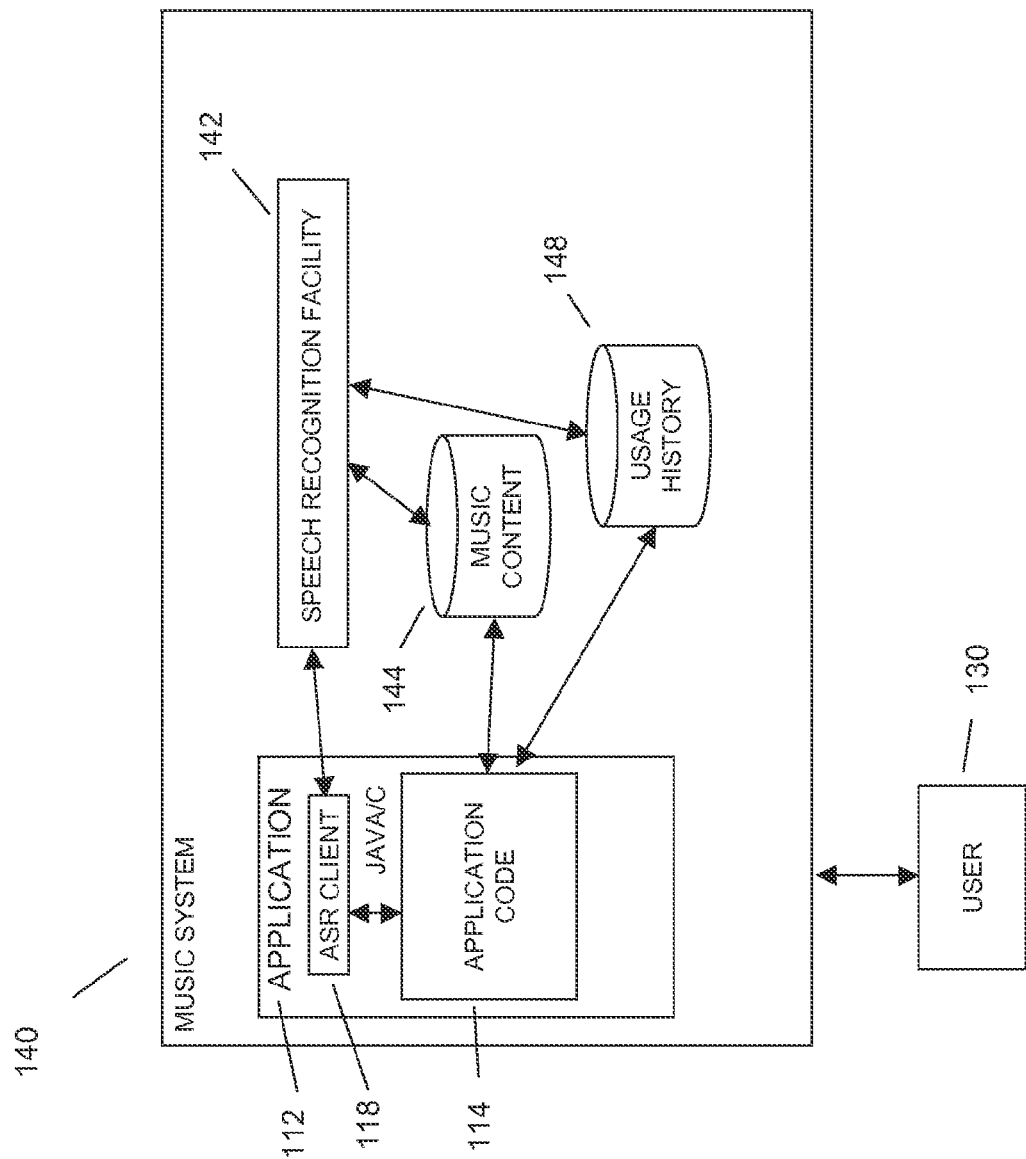
FIG. 1A depicts a block diagram of a music system.

The current invention may provide an unconstrained, real-time, mobile environment speech processing facility 100, as shown in FIG. 1, that allows a user with a mobile communications facility 120 to use speech recognition to enter text into an application 112, such as a communications application, an SMS message, IM message, e-mail, chat, blog, or the like, or any other kind of application, such as a social network application, mapping application, application for obtaining directions, search engine, auction application, application related to music, travel, games, or other digital media, enterprise software applications, word processing, presentation software, and the like. In various embodiments, text obtained through the speech recognition facility described herein may be entered into any application or environment that takes text input.

In an embodiment of the invention, the user's 130 mobile communications facility 120 may be a mobile phone, programmable through a standard programming language, such as Java, C, Brew, C++, and any other current or future programming language suitable for mobile device applications, software, or functionality. The mobile environment speech processing facility 100 may include a mobile communications facility 120 that is preloaded with one or more applications 112. Whether an application 112 is preloaded or not, the user 130 may download an application 112 to the mobile communications facility 120. The application 112 may be a navigation application, a music player, a music download service, a messaging application such as SMS or email, a video player or search application, a local search application, a mobile search application, a general internet browser, or the like. There may also be multiple applications 112 loaded on the mobile communications facility 120 at the same time. The user 130 may activate the mobile environment speech processing facility's 100 user interface software by starting a program included in the mobile environment speech processing facility 120 or activate it by performing a user 130 action, such as pushing a button or a touch screen to collect audio into a domain application. The audio signal may then be recorded and routed over a network to servers 110 of the mobile environment speech processing facility 100. Text, which may represent the user's 130 spoken words, may be output from the servers 110 and routed back to the user's 130 mobile communications facility 120, such as for display. In embodiments, the user 130 may receive feedback from the mobile environment speech processing facility 100 on the quality of the audio signal, for example, whether the audio signal has the right amplitude: whether the audio signal's amplitude is clipped, such as clipped at the beginning or at the end; whether the signal was too noisy; or the like.

The user 130 may correct the returned text with the mobile phone's keypad or touch screen navigation buttons. This process may occur in real-time, creating an environment where a mix of speaking and typing is enabled in combination with other elements on the display. The corrected text may be muted back to the servers 110, where an Automated Speech Recognition (ASR) Server infrastructure 102 may use the corrections to help model how a user 130 typically speaks, what words are used, how the user 130 tends to use words, in what contexts the user 130 speaks, and the like. The user 130 may speak or type into text boxes, with keystrokes routed back to the ASR server infrastructure 102.

In addition, the hosted servers 110 may be run as an application service provider (ASP). This may allow the benefit of running data from multiple applications 112 and users 130, combining them to make more effective recognition models. This may allow usage based adaptation of speech recognition to the user 130, to the scenario, and to the application 112.

One of the applications 112 may be a navigation application which provides the user 130 one or more of maps, directions, business searches, and the like. The navigation application may make use of a GPS unit in the mobile communications facility 120 or other means to determine the current location of the mobile communications facility 120. The location information may be used both by the mobile environment speech processing facility 100 to predict what users may speak, and may be used to provide better location searches, maps, or directions to the user. The navigation application may use the mobile environment speech processing facility 100 to allow users 130 to enter addresses, business names, search queries and the like by speaking.

Another application 112 may be a messaging application which allows the user 130 to send and receive messages as text via Email, SMS, IM, or the like to and from other people. The messaging application may use the mobile environment speech processing facility 100 to allow users 130 to speak messages which are then turned into text to be sent via the existing text channel.

Another application 112 may be a music application which allows the user 130 to play music, search for locally stored content, search for and download and purchase content from network-side resources and the like. The music application may use the mobile environment speech processing facility 100 to allow users 130 to speak song title, artist names, music categories, and the like which may be used to search for music content locally or in the network, or may allow users 130 to speak commands to control the functionality of the music application.

Another application 112 may be a content search application which allows the user 130 to search for music, video, games, and the like. The content search application may use the mobile environment speech processing facility 100 to allow users 130 to speak song or artist names, music categories, video titles, game titles, and the like which may be used to search for content locally or in the network Another application 112 may be a local search application which allows the user 130 to search for business, addresses, and the like. The local search application may make use of a GPS unit in the mobile communications facility 120 or other means to determine the current location of the mobile communications facility 120. The current location information may be used both by the mobile environment speech processing facility 100 to predict what users may speak, and may be used to provide better location searches, maps, or directions to the user. The local search application may use the mobile environment speech processing facility 100 to allow users 130 to enter addresses, business names, search queries and the like by speaking.

Another application 112 may be a general search application which allows the user 130 to search for information and content from sources such as the World Wide Web. The general search application may use the mobile environment speech processing facility 100 to allow users 130 to speak arbitrary search queries.

Another application 112 may be a browser application which allows the user 130 to display and interact with arbitrary content from sources such as the World Wide Web. This browser application may have the full or a subset of the functionality of a web browser found on a desktop or laptop computer or may be optimized for a mobile environment. The browser application may use the mobile environment speech processing facility 100 to allow users 130 to enter web addresses, control the browser, select hyperlinks, or fill in text boxes on web pages by speaking.

In an embodiment, the speech recognition facility 142 may be built into a device, such as a music device 140 or a navigation system 150, where the speech recognition facility 142 may be referred to as an internal speech recognition facility 142, resident speech recognition facility 142, device integrated speech recognition facility 142, local speech recognition facility 142, and the like. In this case, the speech recognition facility allows users to enter information such as a song or artist name or a navigation destination into the device, and the speech recognition is preformed on the device. In embodiments, the speech recognition facility 142 may be provided externally, such as in a hosted server 110, in a server-side application infrastructure 122, on the Internet, on an intranet, through a service provider, on a second mobile communications facility 120, and the like. In this case, the speech recognition facility may allow the user to enter information into the device, where speech recognition is performed in a location other than the device itself, such as in a networked location. In embodiments, speech recognition may be performed internal to the device; external to the device; in a combination, where the results of the resident speech recognition facility 142 are combined with the results of the external speech recognition facility 142; in a selected way, where the result is chosen from the resident speech recognition facility 142 and/or external speech recognition facility 142 based on a criteria such as time, policy, confidence score, network availability, and the like.

FIG. 1 depicts an architectural block diagram for the mobile environment speech processing facility 100, including a mobile communications facility 120 and hosted servers 110 The ASR client may provide the functionality of speech-enabled text entry to the application. The ASR server infrastructure 102 may interface with the ASR client 118, in the user's 130 mobile communications facility 120, via a data protocol, such as a transmission control protocol (TCP) connection or the like. The ASR server infrastructure 102 may also interface with the user database 104. The user database 104 may also be connected with the registration 108 facility. The ASR server infrastructure 102 may make use of external information sources 124 to provide information about words, sentences, and phrases that the user 130 is likely to speak. The application 112 in the user's mobile communication facility 120 may also make use of server-side application infrastructure 122, also via a data protocol. The server-side application infrastructure 122 may provide content for the applications, such as navigation information, music or videos to download, search facilities for content, local, or general web search, and the like. The server-side application infrastructure 122 may also provide general capabilities to the application such as translation of HTML or other web-based markup into a form which is suitable for the application 112. Within the user's 130 mobile communications facility 120, application code 114 may interface with the ASR client 118 via a resident software interface, such as Java, C, C++, and the like. The application infrastructure 122 may also interface with the user database 104, and with other external application information sources 128 such as the World Wide Web 330, or with external application-specific content such as navigation services, music, video, search services, and the like.

FIG. 1A depicts the architecture in the case where the speech recognition facility 142 as described in various preferred embodiments disclosed herein is associated with or built into a music device 140. The application 112 provides functionality for selecting songs, albums, genres, artists, play lists and the like, and allows the user 130 to control a variety of other aspects of the operation of the music player such as volume, repeat options, and the like. In an embodiment, the application code 114 interacts with the ASR client 118 to allow users to enter information, enter search terms, provide commands by speaking, and the like. The ASR client 118 interacts with the speech recognition facility 142 to recognize the words that the user spoke. There may be a database of music content 144 on or available to the device which may be used both by the application code 114 and by the speech recognition facility 142. The speech recognition facility 142 may use data or metadata from the database of music content 144 to influence the recognition models used by the speech recognition facility 142. There may be a database of usage history 148 which keeps track of the past usage of the music system 140. This usage history 148 may include songs, albums, genres, artists, and play lists the user 130 has selected in the past. In embodiments, the usage history 148 may be used to influence the recognition models used in the speech recognition facility 142. This influence of the recognition models may include altering the language models to increase the probability that previously requested artists, songs, albums, or other music terms may be recognized in future queries. This may include directly altering the probabilities of terms used in the past, and may also include altering the probabilities of terms related to those used in the past. These related terms may be derived based on the structure of the data, for example groupings of artists or other terms based on genre, so that if a user asks for an artist from a particular genre, the terms associated with other artists in that genre may be altered. Alternatively, these related terms may be derived based on correlations of usages of terms observed in the past, including observations of usage across users. Therefore, it may be learned by the system that if a user asks for artist1, they are also likely to ask about artist2 in the future. The influence of the language models based on usage may also be based on error-reduction criteria. So, not only may the probabilities of used terms be increased in the language models, but in addition, terms which are misrecognized may be penalized in the language models to decrease their chances of future misrecognitions.

Figure 1B:
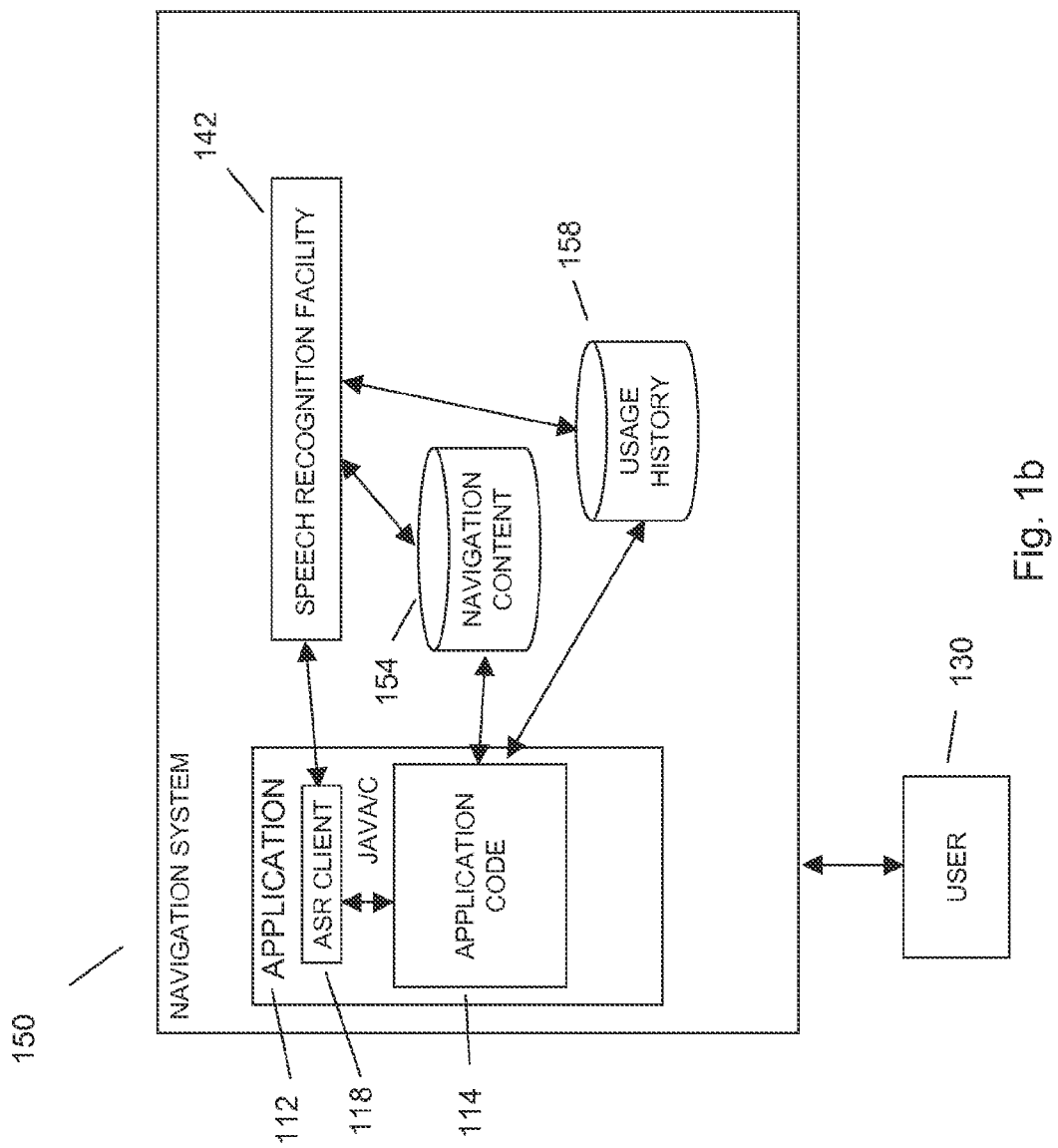
FIG. 1B depicts a block diagram of a navigation system.

FIG. 1B depicts the architecture in the case where the speech recognition facility 142 is built into a navigation system 150. The navigation system 150 might be an in-vehicle navigation system, a personal navigation system, or other type of navigation system. In embodiments the navigation system 150 might, for example, be a personal navigation system integrated with a mobile phone or other mobile facility as described throughout this disclosure. The application 112 of the navigation system 150 can provide functionality for selecting destinations, computing routes, drawing maps, displaying points of interest, managing favorites and the like, and can allow the user 130 to control a variety of other aspects of the operation of the navigation system, such as display modes, playback modes, and the like. The application code 114 interacts with the ASR client 118 to allow users to enter information, destinations, search terms, and the like and to provide commands by speaking. The ASR client 118 interacts with the speech recognition facility 142 to recognize the words that the user spoke. There may be a database of navigation-related content 154 on or available to the device. Data or metadata from the database of navigation-related content 154 may be used both by the application code 114 and by the speech recognition facility 142. The navigation content or metadata may include general information about maps, streets, routes, traffic patterns, points of interest and the like, and may include information specific to the user such as address books, favorites, preferences, default locations, and the like. The speech recognition facility 142 may use this navigation content 154 to influence the recognition models used by the speech recognition facility 142. There may be a database of usage history 158 which keeps track of the past usage of the navigation system 150. This usage history 158 may include locations, search terms, and the like that the user 130 has selected in the past. The usage history 158 may be used to influence the recognition models used in the speech recognition facility 142. This influence of the recognition models may include altering the language models to increase the probability that previously requested locations, commands, local searches, or other navigation terms may be recognized in future queries. This may include directly altering the probabilities of terms used in the past, and may also include altering the probabilities of terms related to those used in the past. These related terms may be derived based on the structure of the data, for example business names, street names, or the like within particular geographic locations, so that if a user asks for a destination within a particular geographic location, the terms associated with other destinations within that geographic location may be altered. Or, these related terms may be derived based on correlations of usages of terms observed in the past, including observations of usage across users. So, it may be learned by the system that if a user asks for a particular business name they may be likely to ask for other related business names in the future. The influence of the language models based on usage may also be based on error-reduction criteria. So, not only may the probabilities of used terms be increased in the language models, but in addition, terms which are misrecognized may be penalized in the language models to decrease their chances of future misrecognitions.

Figure 1C:
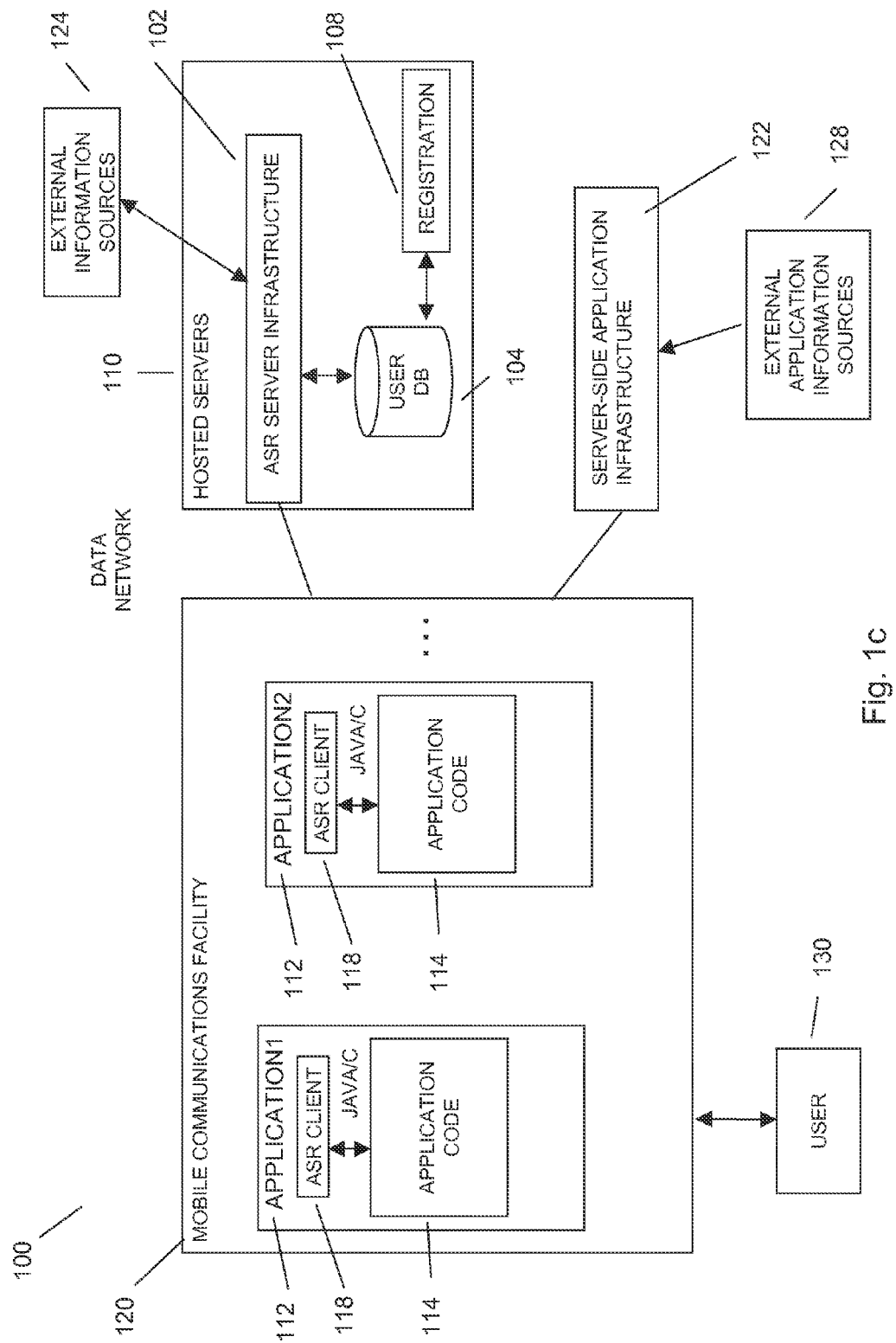
FIG. 1C depicts a block diagram of a mobile communications facility.

FIG. 1C depicts the case wherein multiple applications 112, each interact with one or more ASR clients 118 and use speech recognition facilities 110 to provide speech input to each of the multiple applications 112. The ASR client 118 may facilitate speech-enabled text entry to each of the multiple applications. The ASR server infrastructure 102 may interface with the ASR clients 118 via a data protocol, such as a transmission control protocol (TCP) connection, HTTP, or the like. The ASR server infrastructure 102 may also interface with the user database 104. The user database 104 may also be connected with the registration 108 facility. The ASR server infrastructure 102 may make use of external information sources 124 to provide information about words, sentences, and phrases that the user 130 is likely to speak. The applications 112 in the user's mobile communication facility 120 may also make use of server-side application infrastructure 122, also via a data protocol. The server-side application infrastructure 122 may provide content for the applications, such as navigation information, music or videos to download, search facilities for content, local, or general web search, and the like. The server-side application infrastructure 122 may also provide general capabilities to the application such as translation of HTML or other web-based markup into a form which is suitable for the application 112. Within the user's 130 mobile communications facility 120, application code 114 may interface with the ASR client 118 via a resident software interface, such as Java, C, C++, and the like. The application infrastructure 122 may also interface with the user database 104, and with other external application information sources 128 such as the World Wide Web, or with external application-specific content such as navigation services, music, video, search services, and the like. Each of the applications 112 may contain their own copy of the ASR client 118, or may share one or more ASR clients 118 using standard software practices on the mobile communications facility 118. Each of the applications 112 may maintain state and present their own interfaces to the user or may share information across applications. Applications may include music or content players, search applications for general, local, on-device, or content search, voice dialing applications, calendar applications, navigation applications, email, SMS, instant messaging or other messaging applications, social networking applications, location-based applications, games, and the like. In embodiments speech recognition models may be conditioned based on usage of the applications. In certain preferred embodiments, a speech recognition model may be selected based on which of the multiple applications running on a mobile device is used in connection with the ASR client 118 for the speech that is captured in a particular instance of use.

Figure 2:
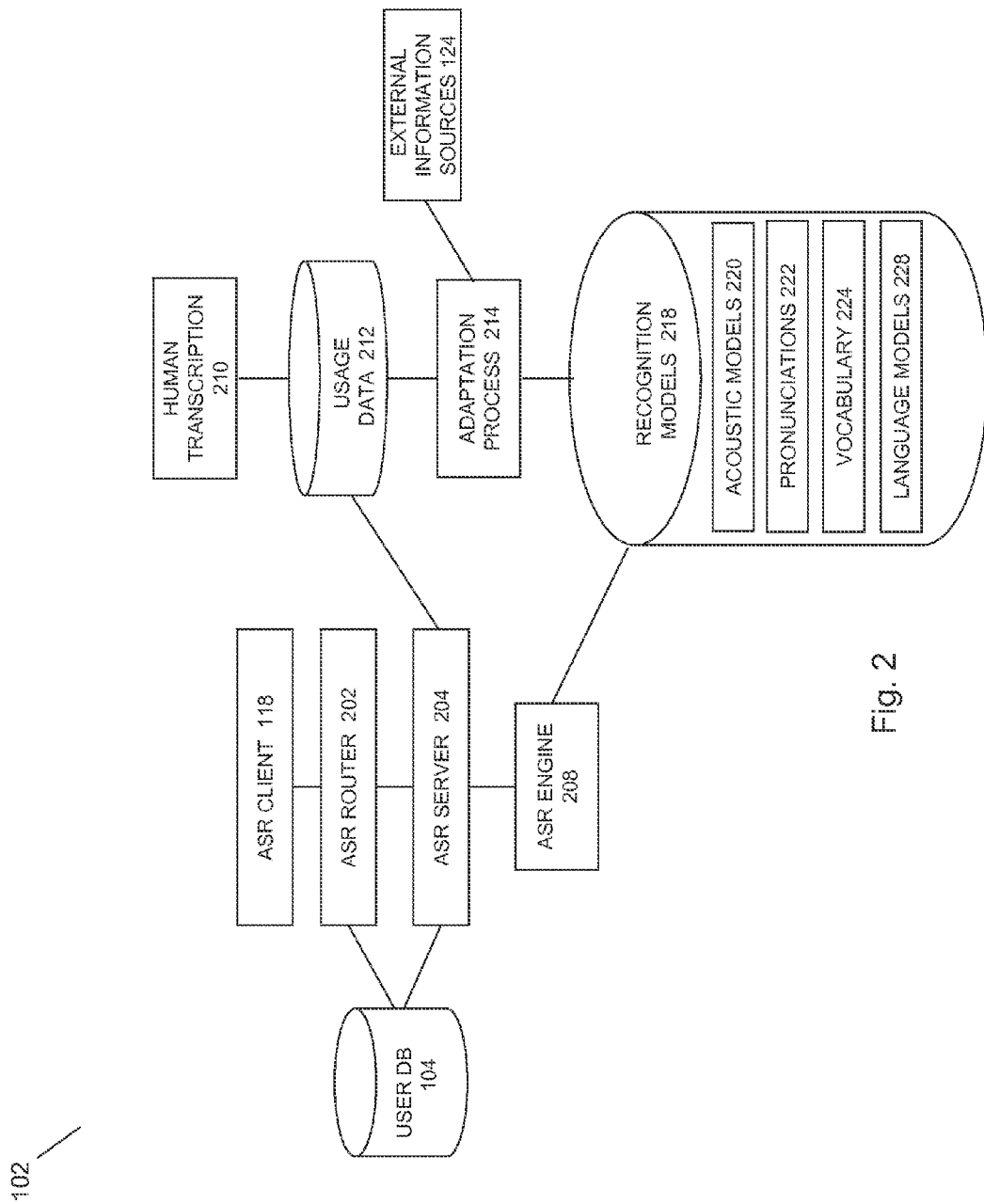
FIG. 2 depicts a block diagram of the automatic speech recognition server infrastructure architecture.

FIG. 2 depicts the architecture for the ASR server infrastructure 102, containing functional blocks for the ASR client 118, ASR router 202, ASR server 204, ASR engine 208, recognition models 218, usage data 212, human transcription 210, adaptation process 214, external information sources 124, and user 130 database 104. In a typical deployment scenario, multiple ASR servers 204 may be connected to an ASR router 202; many ASR clients 118 may be connected to multiple ASR routers 102 and network traffic load balancers may be presented between ASR clients 118 and ASR routers 202. The ASR client 118 may present a graphical user 130 interface to the user 130, and establishes a connection with the ASR router 202. The ASR client 118 may pass information to the ASR router 202, including a unique identifier for the individual phone (client ID) that may be related to a user 130 account created during a subscription process, and the type of phone (phone ID). The ASR client 118 may collect audio from the user 130. Audio may be compressed into a smaller format. Compression may include standard compression scheme used for human-human conversation, or a specific compression scheme optimized for speech recognition. The user 130 may indicate that the use 130 would like to perform, recognition. Indication may be made by way of pressing and holding a button for the duration the user 130 is speaking. Indication may be made by way of pressing a button to indicate that speaking will begin, and the ASR client 118 may collect audio until it determines that the user 130 is done speaking, by determining that there has been no speech within some pre-specified time period. In embodiments, voice activity detection may be entirely automated without the need for an initial key press, such as by voice trained command, by voice command specified on the display of the mobile communications facility 120, or the like.

The ASR client 118 may pass audio, or compressed audio, to the ASR router 202. The audio may be sent after all audio is collected or streamed while the audio is still being collected. The audio may include additional information about the state of the ASR client 118 and application 112 in which this client is embedded. This additional information, plus the client ID and phone ID, comprises at least a portion of the client state information. This additional information may include an identifier for the application; an identifier for the particular text field of the application; an identifier for content being viewed in the current application, the URL of the current web page being viewed in a browser for example; or words which are already entered into a current text field. There may be information about what words are before and after the current cursor location, or alternatively, a list of words along with information about the current cursor location. This additional information may also include other information available in the application 112 or mobile communication facility 120 which may be helpful in predicting what users 130 may speak into the application 112 such as the current location of the phone, information about content such as music or videos stored on the phone, history of usage of the application, time of day, and the like.

The ASR client 118 may wait for results to come back from the ASR router 202. Results may be returned as word strings representing the system's hypothesis about the words, which were spoken. The result may include alternate choices of what may have been spoken, such as choices for each word, choices for strings of multiple words, or the like. The ASR client 118 may present words to the user 130, that appear at the current cursor position in the text box, or shown to the user 130 as alternate choices by navigating with the keys on the mobile communications facility 120. The ASR client 118 may allow the user 130 to correct text by using a combination of selecting alternate recognition hypotheses, navigating to words, seeing list of alternatives, navigating to desired choice, selecting desired choice, deleting individual characters, using some delete key on the keypad or touch screen; deleting entire words one at a time; inserting new characters by typing on the keypad; inserting new words by speaking; replacing highlighted words by speaking; or the like. The list of alternatives may be alternate words or strings of word, or may make use of application constraints to provide a list of alternate application-oriented items such as songs, videos, search topics or the like. The ASK client 118 may also give a user 130 a means to indicate that the user 130 would like the application to take some action based on the input text; sending the current state of the input text (accepted text) back to the ASR router 202 when the user 130 selects the application action based on the input text; logging various information about user 130 activity by keeping track of user 130 actions, such as timing and content of keypad or touch screen actions, or corrections, and periodically sending it to the ASR router 202; or the like.

The ASR router 202 may provide a connection between the ASK client 118 and the ASR server 204. The ASR router 202 may wait for connection requests from ASR clients 118. Once a connection request is made, the ASR router 202 may decide which ASR server 204 to use for the session from the ASR client 118. This decision may be based on the current load on each ASR server 204; the best predicted load on each ASR server 204; client state information; information about the state of each ASR server 204, which may include current recognition models 218 loaded on the ASR engine 208 or status of other connections to each ASR server 204; information about the best mapping of client state information to server state information; routing data which comes from the ASR client 118 to the ASR server 204; or the like. The ASR router 202 may also mute data, which may come from the ASR server 204, back to the ASR client 118.

The ASR server 204 may wait for connection requests from the ASK router 202. Once a connection request is made, the ASR server 204 may decide which recognition models 218 to use given the client state information coming from the ASR router 202. The ASR server 204 may perform any tasks needed to get the ASR engine 208 ready for recognition requests from the ASR router 202. This may include pre-loading recognition models 218 into memory or doing specific processing needed to get the ASR engine 208 or recognition models 218 ready to perform recognition given the client state information. When a recognition request comes from the ASK router 202, the ASR server 204 may perform recognition on the incoming audio and return the results to the ASR router 202. This may include decompressing the compressed audio information, sending audio to the ASR engine 208, getting results back from the ASR engine 208, optionally applying a process to alter the words based on the text and on the Client State Information (changing "five dollars" to $5 for example), sending resulting recognized text to the ASR router 202, and the like. The process to alter the words based on the text and on the Client State Information may depend on the application 112, for example applying address-specific changes (changing "seventeen dunster street" to "17 dunster st.") in a location-based application 112 such as navigation or local search, applying internet-specific changes (changing "yahoo dot com" to "yahoo.com") in a search application 112, and the like.

The ASR router 202 may be a standard internet protocol or http protocol router, and the decisions about which ASK server to use may be influenced by standard rules for determining best servers based on load balancing rules and on content of headers or other information in the data or metadata passed between the ASK client 118 and ASR server 204.

In the case where the speech recognition facility is built-into a device, each of these components may be simplified or non-existent.

The ASR server 204 may log information to the usage data 212 storage. This logged information may include audio coming from the ASK router 202, client state information, recognized text, accepted text, timing information, user 130 actions, and the like. The ASR server 204 may also include a mechanism to examine the audio data and decide if the current recognition models 218 are not appropriate given the characteristics of the audio data and the client state information. In this case the ASK server 204 may load new or additional recognition models 218, do specific processing needed to get ASR engine 208 or recognition models 218 ready to perform recognition given the client state information and characteristics of the audio data, rerun the recognition based on these new models, send back information to the ASR router 202 based on the acoustic characteristics causing the ASK to send the audio to a different ASR server 204, and the like.

The ASR engine 208 may utilize a set of recognition models 218 to process the input audio stream, where there may be a number of parameters controlling the behavior of the ASR engine 208. These may include parameters controlling internal processing components of the ASR engine 208, parameters controlling the amount of processing that the processing components will use, parameters controlling normalizations of the input audio stream, parameters controlling normalizations of the recognition models 218, and the like. The ASR engine 208 may output words representing a hypothesis of what the user 130 said and additional data representing alternate choices for what the user 130 may have said. This may include alternate choices for the entire section of audio; alternate choices for subsections of this audio, where subsections may be phrases (strings of one or more words) or words; scores related to the likelihood that the choice matches words spoken by the user 130; or the like. Additional information supplied by the ASR engine 208 may relate to the performance of the ASR engine 208. The core speech recognition engine 208 may include automated speech recognition (ASR), and may utilize a plurality of models 218, such as acoustic models 220, pronunciations 222, vocabularies 224, language models 228, and the like, in the analysis and translation of user 130 inputs. Personal language models 228 may be biased for first, last name in an address book, user's 130 location, phone number, past usage data, or the like. As a result of this dynamic development of user 130 speech profiles, the user 130 may be free from constraints on how to speak: there may be no grammatical constraints placed on the mobile user 130, such as having to say something in a fixed domain. The user 130 may be able to say anything into the user's 130 mobile communications facility 120, allowing the user 130 to utilize text messaging, searching, entering an address, or the like, and 'speaking into' the text field, rather than having to type everything.

The recognition models 218 may control the behavior of the ASR engine 208. These models may contain acoustic models 220, which may control how the ASR engine 208 maps the subsections of the audio signal to the likelihood that the audio signal corresponds to each possible sound making up words in the target language. These acoustic models 220 may be statistical models, Hidden Markov models, may be trained on transcribed speech coming from previous use of the system (training data), multiple acoustic models with each trained on portions of the training data, models specific to specific users 130 or groups of users 130, or the like. These acoustic models may also have parameters controlling the detailed behavior of the models. The recognition models 218 may include acoustic mappings, which represent possible acoustic transformation effects, may include multiple acoustic mappings representing different possible acoustic transformations, and these mappings may apply to the feature space of the ASR engine 208. The recognition models 218 may include representations of the pronunciations 222 of words in the target language. These pronunciations 222 may be manually created by humans, derived through a mechanism which converts spelling of words to likely pronunciations, derived based on spoken samples of the word, and may include multiple possible pronunciations for each word in the vocabulary 224, multiple sets of pronunciations for the collection of words in the vocabulary 224, and the like. The recognition models 218 may include language models 228, which represent the likelihood of various word sequences that may be spoken by the user 130. These language models 228 may be statistical language models, n-gram statistical language models, conditional statistical language models which take into account the client state information, may be created by combining the effects of multiple individual language models, and the like. The recognition models 218 may include multiple language models 228 which may be used in a variety of combinations by the ASR engine 208. The multiple language models 228 may include language models 228 meant to represent the likely utterances of a particular user 130 or group of users 130. The language models 228 may be specific to the application 112 or type of application 112.

In embodiments, methods and systems disclosed herein may function independent of the structured grammar required in most conventional speech recognition systems. As used herein, references to "unstructured grammar" and "unstructured language models" should be understood to encompass language models and speech recognition systems that allow speech recognition systems to recognize a wide variety of input from users by avoiding rigid constraints or rules on what words can follow other words. One implementation of an unstructured language model is to use statistical language models, as described throughout this disclosure, which allow a speech recognition system to recognize any possible sequence of a known list of vocabulary items with the ability to assign a probability to any possible word sequence. One implementation of statistical language models is to use n-gram models, which model probabilities of sequences of n words. These n-gram probabilities are estimated based on observations of the word sequences in a set of training or adaptation data. Such a statistical language model typically has estimation strategies for approximating the probabilities of unseen n-gram word sequences, typically based on probabilities of shorter sequences of words (so, a 3-gram model would make use of 2-gram and 1-gram models to estimate probabilities of 3-gram word sequences which were not well represented in the training data). References throughout to unstructured grammars, unstructured language models, and operation independent of a structured grammar or language model encompass all such language models, including such statistical language models.

The multiple language models 228 may include language models 228 designed to model words, phrases, and sentences used by people speaking destinations for a navigation or local search application 112 or the like. These multiple language models 228 may include language models 228 about locations, language models 228 about business names, language models 228 about business categories, language models 228 about points of interest, language models 228 about addresses, and the like. Each of these types of language models 228 may be general models which provide broad coverage for each of the particular type of ways of entering a destination or may be specific models which are meant to model the particular businesses, business categories, points of interest, or addresses which appear only within a particular geographic region.

The multiple language models 228 may include language models 228 designed to model words, phrases, and sentences used by people speaking into messaging applications 112. These language models 228 may include language models 228 specific to addresses, headers, and content fields of a messaging application 112. These multiple language models 228 may be specific to particular types of messages or messaging application 112 types.

The multiple language models 228 may include language models 228 designed to model words, phrases, and sentences used by people speaking search terms for content such as music, videos, games, and the like. These multiple language models 228 may include language models 228 representing artist names, song names, movie titles. TV show, popular artists, and the like. These multiple language models 228 may be specific to various types of content such as music or video category or may cover multiple categories.

The multiple language models 228 may include language models 228 designed to model words, phrases, and sentences used by people speaking general search terms into a search application. The multiple language models 228 may include language models 228 for particular types of search including content search, local search, business search, people search, and the like.

The multiple language models 228 may include language models 228 designed to model words, phrases, and sentences used by people speaking text into a general internet browser. These multiple language models 228 may include language models 228 for particular types of web pages or text entry fields such as search, form filling, dates, times, and the like.

Usage data 212 may be a stored set of usage data 212 from the users 130 of the service that includes stored digitized audio that may be compressed audio; client state information from each audio segment; accepted text from the ASK client 118; logs of user 130 behavior, such as key-presses; and the like. Usage data 212 may also be the result of human transcription 210 of stored audio, such as words that were spoken by user 130, additional information such as noise markers, and information about the speaker such as gender or degree of accent, or the like.

Human transcription 210 may be software and processes for a human to listen to audio stored in usage data 212, and annotate data with words which were spoken, additional information such as noise markers, truncated words, information about the speaker such as gender or degree of accent, or the like. A transcriber may be presented with hypothesized text from the system or presented with accepted text from the system. The human transcription 210 may also include a mechanism to target transcriptions to a particular subset of usage data 212. This mechanism may be based on confidence scores of the hypothesized transcriptions from the ASR server 204.

The adaptation process 214 may adapt recognition models 218 based on usage data 212. Another criterion for adaptation 214 may be to reduce the number of errors that the ASR engine 208 would have made on the usage data 212, such as by rerunning the audio through the ASR engine 208 to see if there is a better match of the recognized words to what the user 130 actually said. The adaptation 214 techniques may attempt to estimate what the user 130 actually said from the annotations of the human transcription 210, from the accepted text, from other information derived from the usage data 212, or the like. The adaptation 214 techniques may also make use of client state information 514 to produce recognition models 218 that are personalized to an individual user 130 or group of users 130. For a given user 130 or group of users 130, these personalized recognition models 218 may be created from usage data 212 for that user 130 or group, as well as data from users 130 outside of the group such as through collaborative-filtering techniques to determine usage patterns from a large group of users 130. The adaptation process 214 may also make use of application information to adapt recognition models 218 for specific domain applications 112 or text fields within domain applications 112. The adaptation process 214 may make use of information in the usage data 212 to adapt multiple language models 228 based on information in the annotations of the human transcription 210, from the accepted text, from other information derived from the usage data 212, or the like. The adaptation process 214 may make use of external information sources 124 to adapt the recognition models 218. These external information sources 124 may contain recordings of speech, may contain information about the pronunciations of words, may contain examples of words that users 130 may speak into particular applications, may contain examples of phrases and sentences which users 130 may speak into particular applications, and may contain structured information about underlying entities or concepts that users 130 may speak about. The external information sources 124 may include databases of location entities including city and state names, geographic area names, zip codes, business names, business categories, points of interest, street names, street number ranges on streets, and other information related to locations and destinations. These databases of location entities may include links between the various entities such as which businesses and streets appear in which geographic locations and the like. The external information 124 may include sources of popular entertainment content such as music, videos, games, and the like. The external information 124 may include information about popular search terms, recent news headlines, or other sources of information which may help predict what users may speak into a particular application 112. The external information sources 124 may be specific to a particular application 112, group of applications 112, user 130, or group of users 130. The external information sources 124 may include pronunciations of words that users may use. The external information 124 may include recordings of people speaking a variety of possible words, phrases, or sentences. The adaptation process 214 may include the ability to convert structured information about underlying entities or concepts into words, phrases, or sentences which users 130 may speak in order to refer to those entities or concepts. The adaptation process 214 may include the ability to adapt each of the multiple language models 228 based on relevant subsets of the external information sources 124 and usage data 212. This adaptation 214 of language models 228 on subsets of external information source 124 and usage data 212 may include adapting geographic location-specific language models 22K based on location entities and usage data 212 from only that geographic location, adapting application-specific language models based on the particular application 112 type, adaptation 124 based on related data or usages, or may include adapting 124 language models 228 specific to particular users 130 or groups of users 130 on usage data 212 from just that user 130 or group of users 130.

The user database 104 may be updated by a web registration 108 process, by new information coming from the ASR router 202, by new information coming from the ASR server 204, by tracking application usage statistics, or the like. Within the user database 104 there may be two separate databases, the ASR database and the user database 104. The ASR database may contain a plurality of tables, such as asr_servers; asr_routers; asr_am (AM, profile name & min server count); asr_monitor (debugging), and the like. The user 130 database 104 may also contain a plurality of tables, such as a clients table including client ID, user 130 ID, primary user 130 ID, phone number, carrier, phone make, phone model, and the like; a users 130 table including user 130 ID, developer permissions, registration time, last activity time, activity count recent AM ID, recent LM ID, session count, last session timestamp, AM ID (default AM for user 130 used from priming), and the like; a user 130 preferences table including user 130 ID, sort, results, radius, saved searches, recent searches, home address, city, state (for geocoding), last address, city, state (for geocoding), recent locations, city to state map (used to automatically disambiguate one-to-many city/state relationship) and the like; user 130 private table including user 130 ID, first and last name, email, password, gender, type of user 130 (e.g. data collection, developer, VIP, etc), age and the like; user 130 parameters table including user 130 ID, recognition server URL, proxy server URL, start page URL, logging server URL, logging level, isLogging, isDeveloper, or the like; clients updates table used to send update notices to clients, including client ID, last known version, available version, minimum available version, time last updated, time last reminded, count since update available, count since last reminded, reminders sent, reminder count threshold, reminder time threshold, update URL, update version, update message, and the like; or other similar tables, such as application usage data 212 not related to ASR.

Figure 2A:
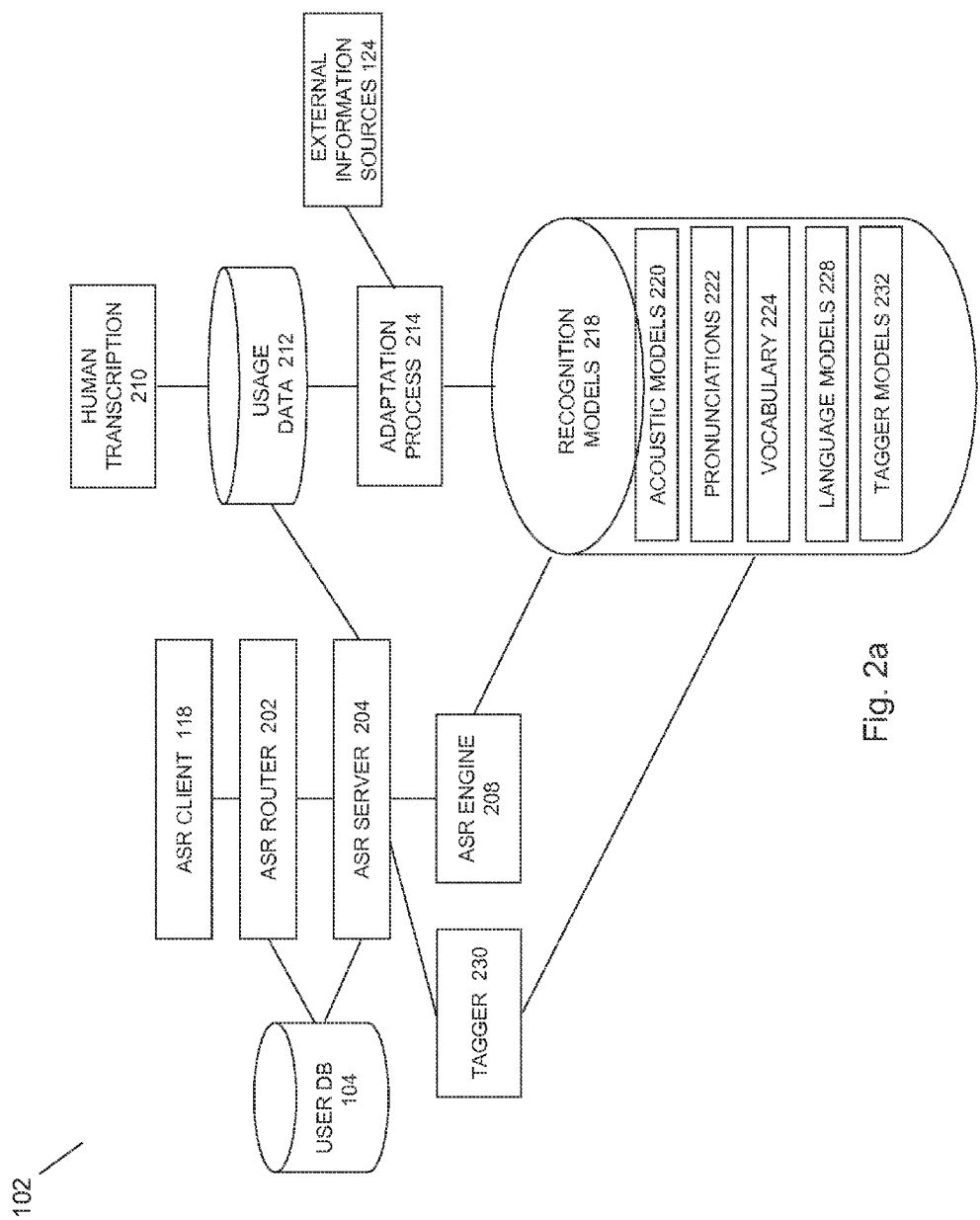
FIG. 2A depicts a block diagram of the automatic speech recognition server infrastructure architecture including a component for tagging words.

FIG. 2A depicts the case where a tagger 230 is used by the ASR server 204 to tag the recognized words according to a set of types of queries, words, or information. For example, in a navigation system 150, the tagging may be used to indicate whether a given utterance by a user is a destination entry or a business search. In addition, the tagging may be used to indicate which words in the utterance are indicative of each of a number of different information types in the utterance such as street number, street name, city name, state name, zip code, and the like. For example in a navigation application, if the user said "navigate to 17 dunster street Cambridge Mass.", the tagging may be [type=navigate] [state=MA] [city=Cambridge] [street=dunster] [street_number=17]. The set of tags and the mapping between word strings and tag sets may depend on the application. The tagger 230 may get words and other information from the ASR server 204, or alternatively directly from the ASR engine 208, and may make use of recognition models 218, including tagger models 232 specifically designed for this task. In one embodiment, the tagger models 232 may include statistical models indicating the likely type and meaning of words (for example "Cambridge" has the highest probability of being a city name, but can also be a street name or part of a business name), may include a set of transition or parse probabilities (for example, street names tend to come before city names in a navigation query), and may include a set of rules and algorithms to determine the best set of tags for a given input. The tagger 230 may produce a single set of tags for a given word string, or may produce multiple possible tags sets for the given word string and provide these to the application. Each of the tag results may include probabilities or other scores indicating the likelihood or certainty of the tagging of the input word string.

Figure 2B:
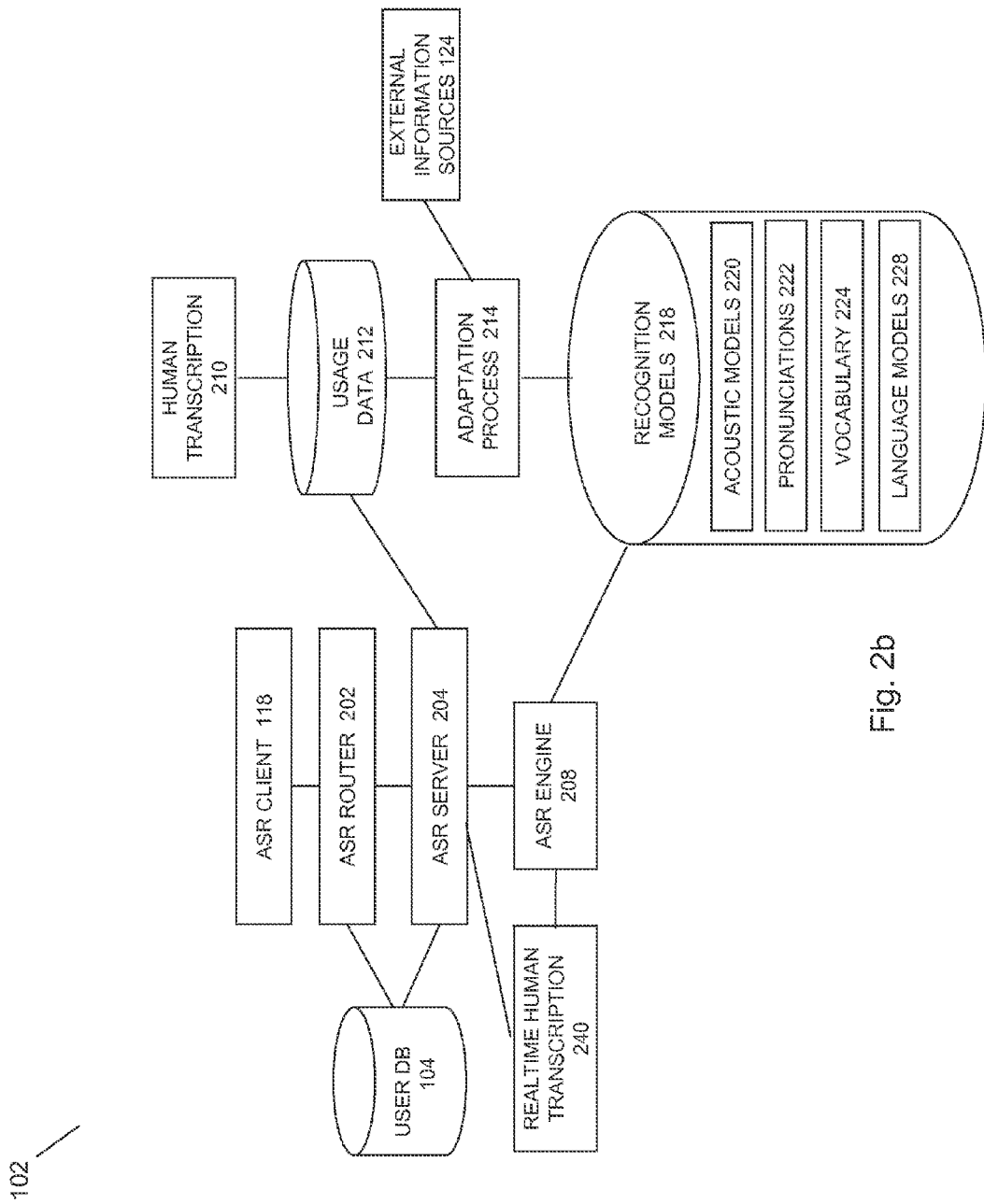
FIG. 2B depicts a block diagram of the automatic speech recognition server infrastructure architecture including a component for real time human transcription.

FIG. 2B depicts the case where real time human transcription 240 is used to augment the ASR engine 208. The real time human transcription 240 may be used to verify or correct the output of the ASR engine before it is transmitted to the ASR client 118. The may be done on all or a subset of the user 130 input. If on a subset, this subset may be based on confidence scores or other measures of certainty from the ASK engine 208 or may be based on tasks where it is already known that the ASR engine 208 may not perform well enough. The output of the real time human transcription 240 may be fed back into the usage data 212. The embodiments of FIGS. 2, 2A and 2B may be combined in various ways so that, for example, real-time human transcription and tagging may interact with the ASR server and other aspects of the ASR server infrastructure.

Figure 3:
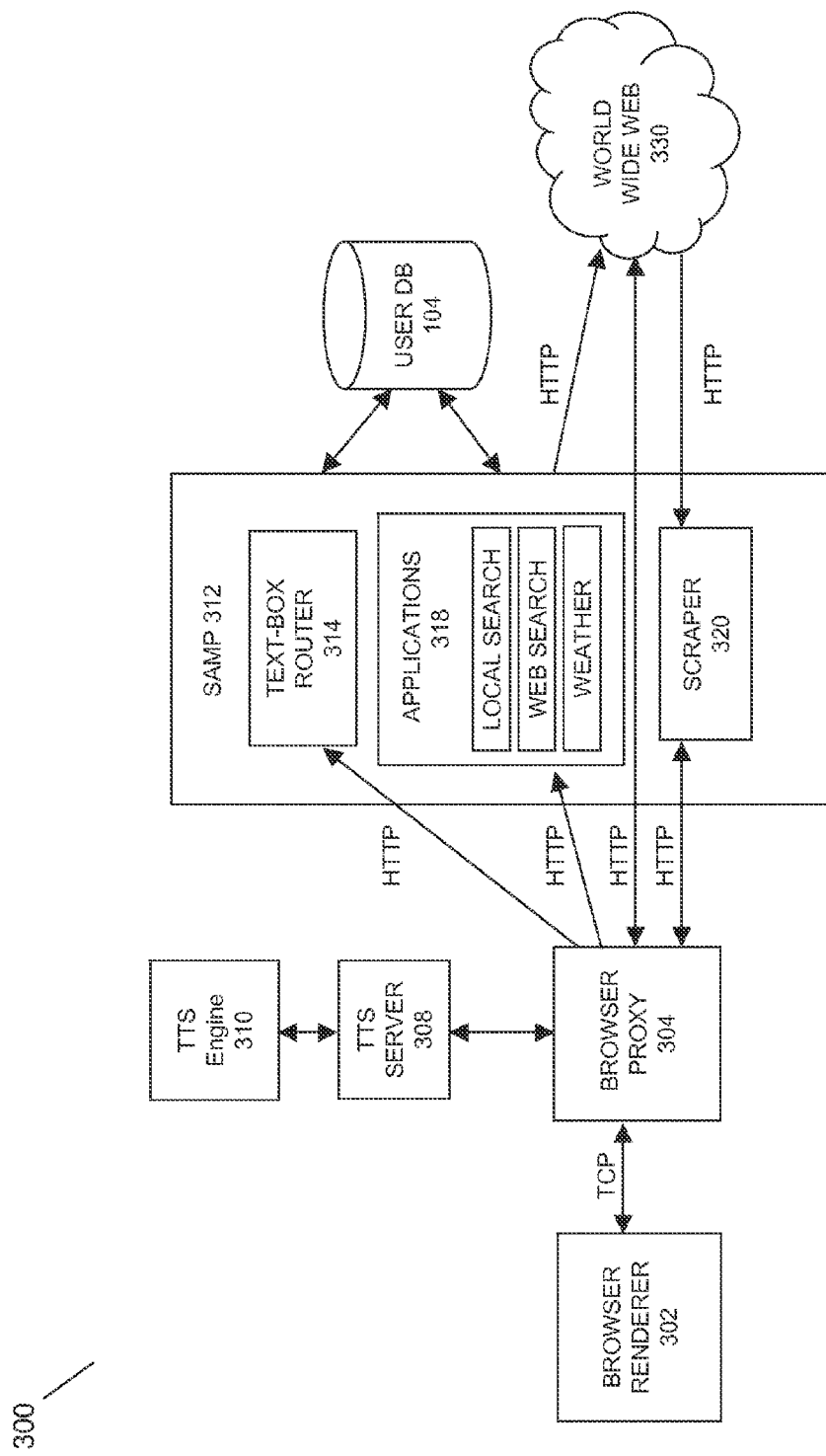
FIG. 3 depicts a block diagram of the application infrastructure architecture.

FIG. 3 depicts an example browser-based application infrastructure architecture 300 including the browser rendering facility 302, the browser proxy 604, text-to-speech (TTS) server 308, TTS engine 310, speech aware mobile portal (SAMP) 312, text-box router 314, domain applications 312, scrapper 320, user 130 database 104, and the World Wide Web 330. The browser rendering facility 302 may be a part of the application code 114 in the user's mobile communication facility 120 and may provide a graphical and speech user interface for the user 130 and display elements on screen-based information coming from browser proxy 304. Elements may include text elements, image elements, link elements, input elements, format elements, and the like. The browser rendering facility 302 may receive input from the user 130 and send it to the browser proxy 304. Inputs may include text in a text-box, clicks on a link, clicks on an input element, or the like. The browser rendering facility 302 also may maintain the stack required for "Back" key presses, pages associated with each tab, and cache recently-viewed pages so that no reads from proxy are required to display recent pages (such as "Back").

The browser proxy 304 may act as an enhanced HTML browser that issues http requests for pages, http requests for links, interprets HTML pages, or the like. The browser proxy 304 may convert user 130 interface elements into a form required for the browser rendering facility 302. The browser proxy 304 may also handle TTS requests from the browser rendering facility 302; such as sending text to the TTS server 308; receiving audio from the TTS server 308 that may be in compressed format; sending audio to the browser rendering facility 302 that may also be in compressed format; and the like.

Other blocks of the browser-based application infrastructure 300 may include a TTS server 308, TTS engine 310, SAMP 312, user 130 database 104 (previously described), the World Wide Web 330, and the like. The TTS server 308 may accept TTS requests, send requests to the TTS engine 310, receive audio from the TTS engine 310, send audio to the browser proxy 304, and the like. The TTS engine 310 may accept TTS requests, generate audio corresponding to words in the text of the request, send audio to the TTS server 308, and the like. The SAMP 312 may handle application requests from the browser proxy 304, behave similar to a web application 330, include a text-box router 314, include domain applications 318, include a scrapper 320, and the like. The text-box router 314 may accept text as input, similar to a search engine's search box, semantically parsing input text using geocoding, key word and phrase detection, pattern matching, and the like. The text-box router 314 may also route parse requests accordingly to appropriate domain applications 318 or the World Wide Web 330. Domain applications 318 may refer to a number of different domain applications 318 that may interact with content on the World Wide Web 330 to provide application-specific functionality to the browser proxy. And finally, the scrapper 320 may act as a generic interface to obtain information from the World Wide Web 330 (e.g., web services, SOAP, RSS, HTML, scrapping, and the like) and formatting it for the small mobile screen.

Figure 4:
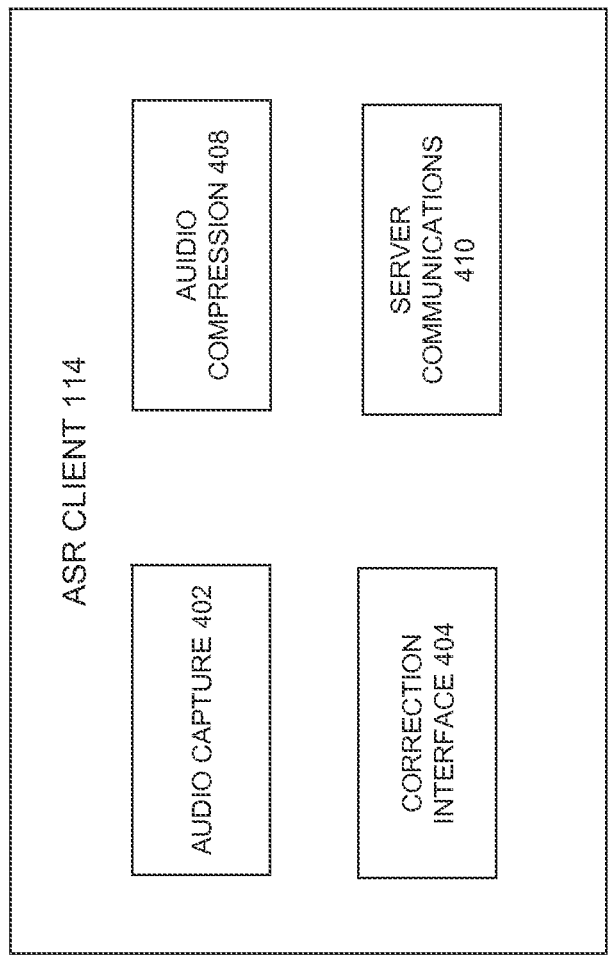
FIG. 4 depicts some of the components of the ASR Client.

FIG. 4 depicts some of the components of the ASR Client 118. The ASR client 11 may include an audio capture 402 component which may wait for signals to begin and end recording, interacts with the built-in audio functionality on the mobile communication facility 120, interact with the audio compression 408 component to compress the audio signal into a smaller format, and the like. The audio capture 402 component may establish a data connection over the data network using the server communications component 410 to the ASR server infrastructure 102 using a protocol such as TCP or HTTP. The server communications 410 component may then wait for responses from the ASR server infrastructure 102 indicated words which the user may have spoken. The correction interface 404 may display words, phrases, sentences, or the like, to the user, 130 indicating what the user 130 may have spoken and may allow the user 130 to correct or change the words using a combination of selecting alternate recognition hypotheses, navigating to words, seeing list of alternatives, navigating to desired choice, selecting desired choice; deleting individual characters, using some delete key on the keypad or touch screen; deleting entire words one at a time; inserting new characters by typing on the keypad; inserting new words by speaking; replacing highlighted words by speaking; or the like. Audio compression 408 may compress the audio into a smaller format using audio compression technology built into the mobile communication facility 120, or by using its own algorithms for audio compression. These audio compression 408 algorithms may compress the audio into a format which can be turned back into a speech waveform, or may compress the audio into a format which can be provided to the ASR engine 208 directly or uncompressed into a format which may be provided to the ASR engine 208. Server communications 410 may use existing data communication functionality built into the mobile communication facility 120 and may muse existing protocols such as TCP, HTTP, and the like.

FIG. 5A depicts the process 500A by which multiple language models may be used by the ASR engine. For the recognition of a given utterance, a first process 504 may decide on an initial set of language models 228 for the recognition. This decision may be made based on the set of information in the client state information 514, including application ID, user ID, text field ID, current state of application 112, or information such as the current location of the mobile communication facility 120. The ASR engine 208 may then run 508 using this initial set of language models 228 and a set of recognition hypotheses created based on this set of language models 228. There may then be a decision process 510 to decide if additional recognition passes 508 are needed with additional language models 228. This decision 510 may be based on the client state information 514, the words in the current set of recognition hypotheses, confidence scores from the most recent recognition pass, and the like. If needed, a new set of language models 228 may be determined 518 based on the client state information 514 and the contents of the most recent recognition hypotheses and another pass of recognition 508 made by the ASR engine 208. Once complete, the recognition results may be combined to form a single set of words and alternates to pass back to the ASR client 118.

FIG. 5B depicts the process 500B by which multiple language models 228 may be used by the ASR engine 208 for an application 112 that allows speech input 502 about locations, such as a navigation, local search, or directory assistance application 112. For the recognition of a given utterance, a first process 522 may decide on an initial set of language models 228 for the recognition. This decision may be made based on the set of information in the client state information 524, including application ID, user ID, text field ID, current state of application 112, or information such as the current location of the mobile communication facility 120. This client state information may also include favorites or an address book from the user 130 and may also include usage history for the application 112. The decision about the initial set of language models 228 may be based on likely target cities for the query 522. The initial set of language models 228 may include general language models 228 about business names, business categories, city and state names, points of interest, street addresses, and other location entities or combinations of these types of location entities. The initial set of language models 228 may also include models 228 for each of the types of location entities specific to one or more geographic regions, where the geographic regions may be based on the phone's current geographic location, usage history for the particular user 130, or other information in the navigation application 112 which may be useful in predicting the likely geographic area the user 130 may want to enter into the application 112. The initial set of language models 228 may also include language models 228 specific to the user 130 or group to which the user 130 belongs. The ASR engine 208 may then run 508 using this initial set of language models 228 and a set of recognition hypotheses created based on this set of language models 228. There may then be a decision process 510 to decide if additional recognition passes 508 are needed with additional language models 228. This decision 510 may be based on the client state information 524, the words in the current set of recognition hypotheses, confidence scores from the most recent recognition pass, and the like. This decision may include determining the likely geographic area of the utterance and comparing that to the assumed geographic area or set of areas in the initial language models 228. This determining the likely geographic area of the utterance may include looking for words in the hypothesis or set of hypotheses, which may correspond to a geographic region. These words may include names for cities, states, areas and the like or may include a string of words corresponding to a spoken zip code. If needed, a new set of language models 228 may be determined 528 based on the client state information 524 and the contents of the most recent recognition hypotheses and another pass of recognition 508 made by the ASR engine 208. This new set of language models 228 may include language models 228 specific to a geographic region determined from a hypothesis or set of hypotheses from the previous recognition pass Once complete, the recognition results may be combined 512 to form a single set of words and alternates to pass back 520 to the ASR client 118.

FIG. 5C depicts the process 500S by which multiple language models 228 may be used by the ASR engine 208 for a messaging application 112 such as SMS, email, instant messaging, and the like, for speech input 502. For the recognition of a given utterance, a first process 532 may decide on an initial set of language models 228 for the recognition. This decision may be made based on the set of information in the client state information 534, including application ID, user ID, text field ID, or current state of application 112. This client state information may include an address book or contact list for the user, contents of the user's messaging inbox and outbox, current state of any text entered so far, and may also include usage history for the application 112. The decision about the initial set of language models 228 may be based on the user 130, the application 12, the type of message, and the like. The initial set of language models 228 may include general language models 228 for messaging applications 112, language models 228 for contact lists and the like. The initial set of language models 228 may also include language models 228 that are specific to the user 130 or group to which the user 130 belongs. The ASR engine 208 may then run 508 using this initial set of language models 228 and a set of recognition hypotheses created based on this set of language models 228. There may then be a decision process 510 to decide if additional recognition passes 508 are needed with additional language models 228. This decision 510 may be based on the client state information 534, the words in the current set of recognition hypotheses, confidence scores from the most recent recognition pass, and the like. This decision may include determining the type of message entered and comparing that to the assumed type of message or types of messages in the initial language models 228. If needed, a new set of language models 228 may be determined 538 based on the client state information 534 and the contents of the most recent recognition hypotheses and another pass of recognition 508 made by the ASR engine 208. This new set of language models 228 may include language models specific to the type of messages determined from a hypothesis or set of hypotheses from the previous recognition pass Once complete, the recognition results may be combined 512 to form a single set of words and alternates to pass back 520 to the ASR client 118.

Figure 5D:
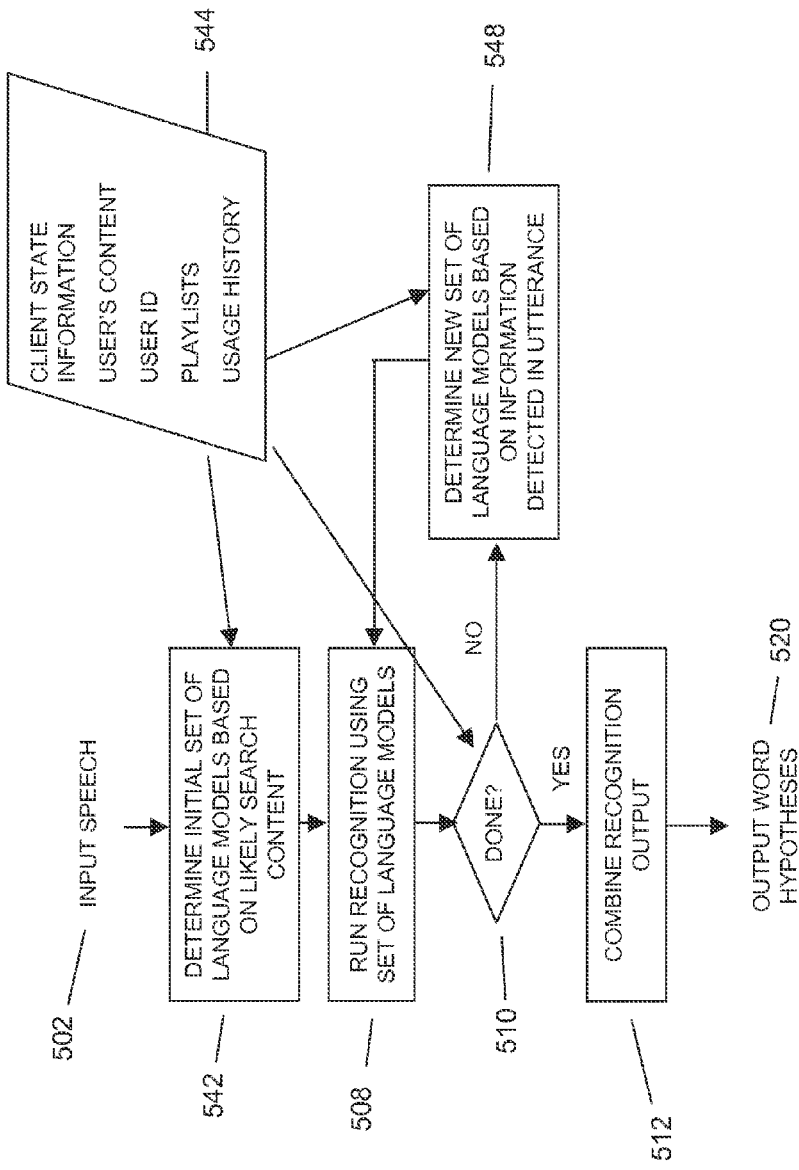
FIG. 5D depicts the process by which multiple language models may be used by the ASR engine for a content search application embodiment.

FIG. 5D depicts the process 500D by which multiple language models 228 may be used by the ASR engine 208 for a content search application 112 such as music download, music player, video download, video player, game search and download, and the like, for speech input 502. For the recognition of a given utterance, a first process 542 may decide on an initial set of language models 228 for the recognition. This decision may be made based on the set of information in the client state information 544, including application ID, user ID, text field ID, or current state of application 112. This client state information may include information about the user's content and play lists, either on the client itself or stored in some network-based storage, and may also include usage history for the application 12. The decision about the initial set of language models 228 may be based on the user 130, the application 112, the type of content, and the like. The initial set of language models 228 may include general language models 228 for search, language models 228 for artists, composers, or performers, language models 228 for specific content such as song and album names, movie and TV show names, and the like. The initial set of language models 228 may also include language models 228 specific to the user 130 or group to which the user 130 belongs. The ASR engine 208 may then run 508 using this initial set of language models 228 and a set of recognition hypotheses created based on this set of language models 228. There may then be a decision process 510 to decide if additional recognition passes 508 are needed with additional language models 228. This decision 510 may be based on the client state information 544, the words in the current set of recognition hypotheses, confidence scores from the most recent recognition pass, and the like. This decision may include determining the type of content search and comparing that to the assumed type of content search in the initial language models 228. If needed, a new set of language models 228 may be determined 548 based on the client state information 544 and the contents of the most recent recognition hypotheses and another pass of recognition 508 made by the ASR engine 208. This new set of language models 228 may include language models 228 specific to the type of content search determined from a hypothesis or set of hypotheses from the previous recognition pass Once complete, the recognition results may be combined 512 to form a single set of words and alternates to pass back 520 to the ASR client 118.

Figure 5E:
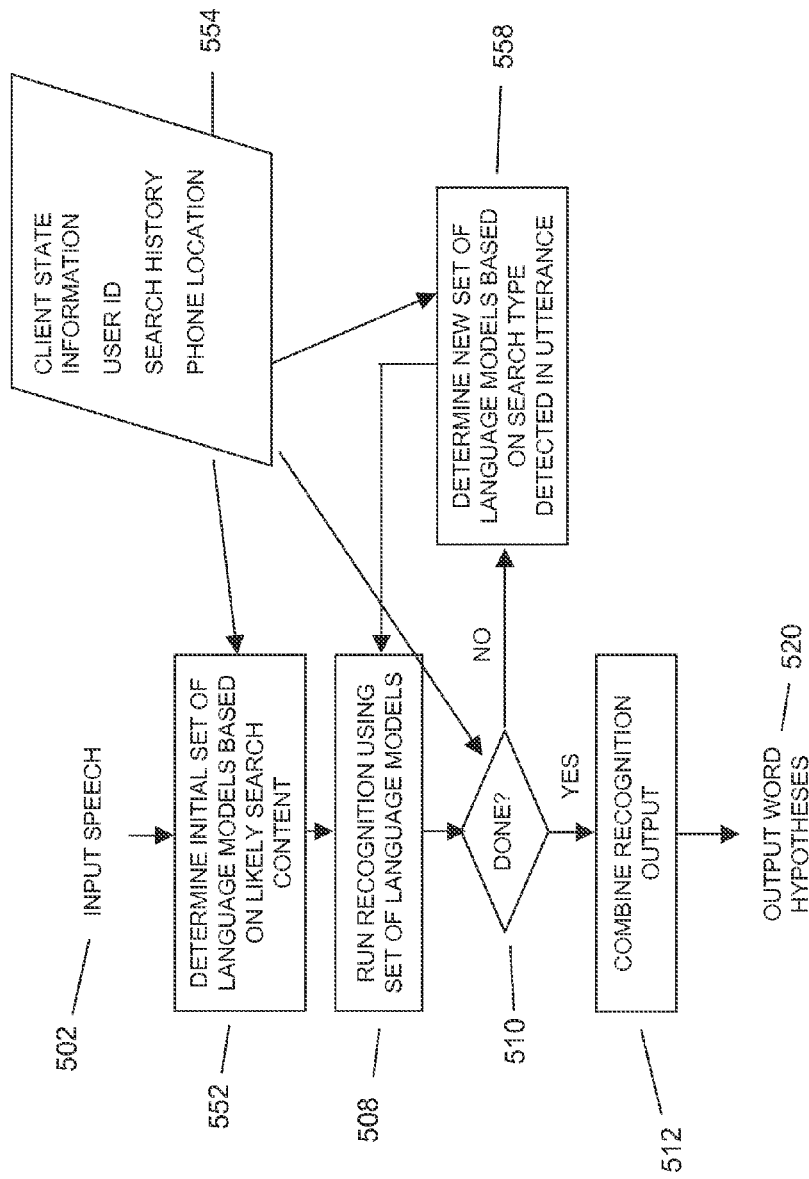
FIG. 5E depicts the process by which multiple language models may be used by the ASR engine for a search application embodiment.

FIG. 5E depicts the process 500E by which multiple language models 228 may be used by the ASR engine 208 for a search application 112 such as general web search, local search, business search, and the like, for speech input 502. For the recognition of a given utterance, a first process 552 may decide on an initial set of language models 228 for the recognition. This decision may be made based on the set of information in the client state information 554, including application ID, user ID, text field ID, or current state of application 112. This client state information may include information about the phone's location, and may also include usage history for the application 112. The decision about the initial set of language models 228 may be based on the user 130, the application 112, the type of search, and the like. The initial set of language models 228 may include general language models 228 for search, language models 228 for different types of search such as local search, business search, people search, and the like. The initial set of language models 228 may also include language models 228 specific to the user or group to which the user belongs. The ASR engine 208 may then run 508 using this initial set of language models 228 and a set of recognition hypotheses created based on this set of language models 228. There may then be a decision process 510 to decide if additional recognition passes 508 are needed with additional language models 228. This decision 510 may be based on the client state information 554, the words in the current set of recognition hypotheses, confidence scores from the most recent recognition pass, and the like. This decision may include determining the type of search and comparing that to the assumed type of search in the initial language models. If needed, a new set of language models 228 may be determined 558 based on the client state information 554 and the contents of the most recent recognition hypotheses and another pass of recognition 508 made by the ASR engine 208. This new set of language models 228 may include language models 228 specific to the type of search determined from a hypothesis or set of hypotheses from the previous recognition pass. Once complete, the recognition results may be combined 512 to form a single set of words and alternates to pass back 520 to the ASR client 118.

FIG. 5F depicts the process 500F by which multiple language models 228 may be used by the ASR engine 208 for a general browser as a mobile-specific browser or general internet browser for speech input 502. For the recognition of a given utterance, a first process 562 may decide on an initial set of language models 228 for the recognition. This decision may be made based on the set of information in the client state information 564, including application ID, user ID, text field ID, or current state of application 112. This client state information may include information about the phone's location, the current web page, the current text field within the web page, and may also include usage history for the application 112. The decision about the initial set of language models 228 may be based on the user 130, the application 112, the type web page, type of text field, and the like. The initial set of language models 228 may include general language models 228 for search, language models 228 for date and time entry, language models 228 for digit string entry, and the like. The initial set of language models 228 may also include language models 228 specific to the user 130 or group to which the user 130 belongs. The ASR engine 208 may then run 508 using this initial set of language models 228 and a set of recognition hypotheses created based on this set of language models 228. There may then be a decision process 510 to decide if additional recognition passes 508 are needed with additional language models 228. This decision 510 may be based on the client state information 564, the words in the current set of recognition hypotheses, confidence scores from the most recent recognition pass, and the like. This decision may include determining the type of entry and comparing that to the assumed type of entry in the initial language models 228. If needed, a new set of language models 228 may be determined 568 based on the client state information 564 and the contents of the most recent recognition hypotheses and another pass of recognition 508 made by the ASR engine 208. This new set of language models 228 may include language models 228 specific to the type of entry determined from a hypothesis or set of hypotheses from the previous recognition pass Once complete, the recognition results may be combined 512 to form a single set of words and alternates to pass back 520 to the ASR client 118.

The process to combine recognition output may make use of multiple recognition hypotheses from multiple recognition passes. These multiple hypotheses may be represented as multiple complete sentences or phrases, or may be represented as a directed graph allowing multiple choices for each word. The recognition hypotheses may include scores representing likelihood or confidence of words, phrases, or sentences. The recognition hypotheses may also include timing information about when words and phrases start and stop. The process to combine recognition output may choose entire sentences or phrases from the sets of hypotheses or may construct new sentences or phrases by combining words or fragments of sentences or phrases from multiple hypotheses. The choice of output may depend on the likelihood or confidence scores and may take into account, the time boundaries of the words and phrases.

Figure 6:
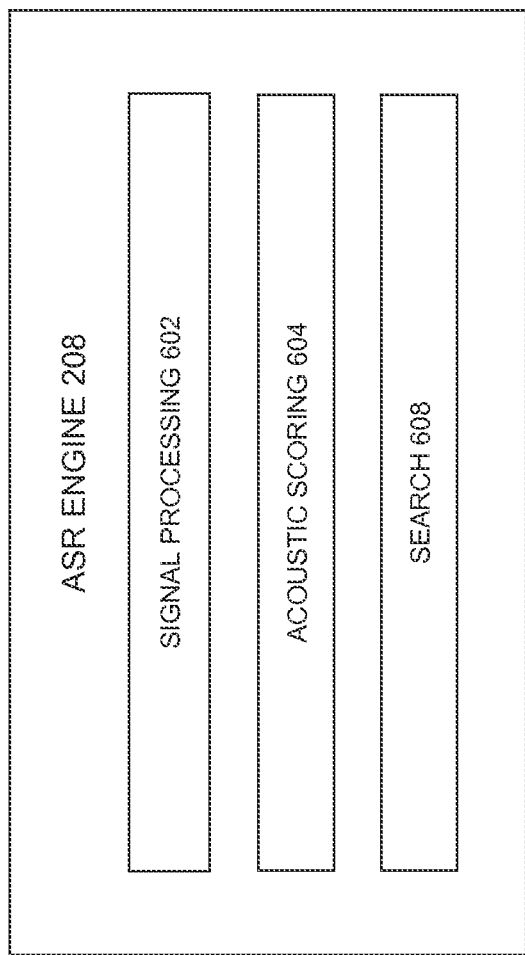
FIG. 6 depicts the components of the ASR engine.

FIG. 6 shows the components of the ASR engine 208. The components may include signal processing 602 which may process the input speech either as a speech waveform or as parameters from a speech compression algorithm and create representations which may be used by subsequent processing in the ASR engine 208. Acoustic scoring 604 may use acoustic models 220 to determine scores for a variety of speech sounds for portions of the speech input. The acoustic models 220 may be statistical models and the scores may be probabilities. The search 608 component may make use of the score of speech sounds from the acoustic scoring 602 and using pronunciations 222, vocabulary 224, and language models 228, find the highest scoring words, phrases, or sentences and may also produce alternate choices of words, phrases, or sentences.

In embodiments, the present invention may enable a user 130 to interact with the mobile communication facility 120 where the user 130 records speech using a mobile communication facility resident capture facility. The recorded speech may be sent to both an external speech recognition facility 142 and a resident speech recognition facility 142 for recognition analysis, where sending to the external speech recognition facility 142 may include a communications facility. Individual results from the separate speech recognition facilities may be alternatively selected or combined using one or more of the outputs of the external speech recognition facility 142 and resident speech recognition facility 142. The combined or selected result may be used to perform a function on the mobile communication facility 120, such as filling in a text field, launching an application, and the like as described herein.

In embodiments, a user 130 may provide a speech input to the mobile communication facility 120, and the speech may be simultaneously provided to a resident speech recognition facility 142 and transmitted to an external speech recognition facility 142, as described herein. In embodiments, the two speech recognition facilities 142 may both begin the process of speech recognition in an attempt to provide a result to the user 130. The resident speech recognition facility 142 and external speech recognition facility 142 may have different capabilities that may help to determine which result will be used, or if a combination of the results will be used. For instance, the resident speech recognition facility 142 may provide a faster response due to being resident on the device; may be able to provide more user applicable results due to having access to user information such as usage history, grammar, and the like; may be able to provide more location applicable responses; and the like. On the other hand, the external speech recognition facility 142 may provide a more comprehensive result due to access to greater information facilities, processing facilities, vocabulary, language models, and the like. In embodiments, the speech processing facility 100 may select the result from the resident or external speech recognition facility 142 based on a predetermined criteria, such as whether the network is available to access the external speech recognition facility, the time it takes the external speech recognition facility 142 to respond in comparison with the response time of the resident speech recognition facility 142, a confidence score from at least one of the speech recognition facilities 142 a confidence score threshold, and the like. For example, the speech processing facility 100 may run speech recognition on both the resident speech recognition facility 142 and the external speech recognition facility 142, and if the resident speech recognition facility 142 indicates a high confidence score with a faster response time than the external speech recognition facility 142, to choose the resident speech recognition facility result and present the result to the user 130. In embodiments, selection of either the external output from the external speech recognition facility 142 or the internal output from the internal speech recognition facility 142 may be based on a criterion, such as a confidence score, the time to receive the external output, and the like.

In embodiments, the attempt to recognize the user's speech using the external speech recognition facility 142 may be aborted, such as based in part on the amount of time taken by the external speech recognition facility 142, based in part on information from the resident speech recognition facility 142, based in part on information from the resident speech recognition facility 142 where the information from the resident speech recognition facility 142 includes a score which indicates a confidence that the results provided by the resident recognition facility 142 correctly represents what the user spoke, based in part on the amount of time taken by the external speech recognition facility 142 and on information from the resident speech recognition facility 142, based in part on the amount of time taken by the external speech recognition facility 142 and on information from the resident speech recognition facility 142 where the information from the resident speech recognition facility 142 includes a score which indicates a confidence that the results provided by the resident recognition facility 142 correctly represents what the user spoke, and the like.

In embodiments, the resident speech recognition facility 142 may be adapted based on information about the user 130, such as the usage history of this user. In addition, the adaption may be performed externally, on the device, and the like. For example, the speech processing facility 100 may use processing capabilities associated with the external speech recognition facility 142 to adapt the vocabulary, grammar, and the like, for the resident speech recognition facility 142 based on usage, such as in keeping track of the most frequent usages of user speech, and keep the resident speech recognition facility 142 updated based on this information. In embodiments, this may result in higher confidence scores from the resident speech recognition facility 142.

In embodiments, the present invention may interact with a mobile communication facility, where speech presented by a user is recorded using a mobile communication facility resident capture facility. The recorded speech may be recognized using an external speech recognition facility to produce an external output and a resident speech recognition facility to produce an internal output, where at least one of the external output and the internal output may be selected based on a criteria. The selected output may then be used to perform a function on the mobile communication facility. In embodiments, the criteria may be based on a confidence score, a time to respond by at least one of the internal and external speech recognition facilities, information from the resident speech recognition facility, and the like. The time to respond by the external speech recognition facility may be longer than the time for the internal speech recognition facility because the internal speech recognition facility is constrained to a grammar, such as the grammar of the user, and the external speech recognition facility is not. In embodiments, the resident speech recognition facility may be adapted based on information about the user, such as usage history. The adaption may be performed externally, internally, on the device, and the like. In embodiments, the selection of the internal output may be based in part on the amount of time taken by the external speech recognition facility and on information from the resident speech recognition facility. The information from the resident speech recognition facility may include a score which indicates a confidence that the results provided by the resident recognition facility correctly represents what the user spoke. In embodiments, the recognizing of the recorded speech using an external speech recognition facility may be aborted when the internal output is selected.

In embodiments, the present invention may interact with a mobile communication facility, where speech presented by a user is recorded using a mobile communication facility resident capture facility. The recorded speech may be communicated and recognized by an external speech recognition facility to produce an external output and to a resident speech recognition facility to produce an internal output. The external output may be selected based on the timely receiving of the external output at the mobile communication facility, and using the selected external output to perform a function on the mobile communication facility.

Figure 7:
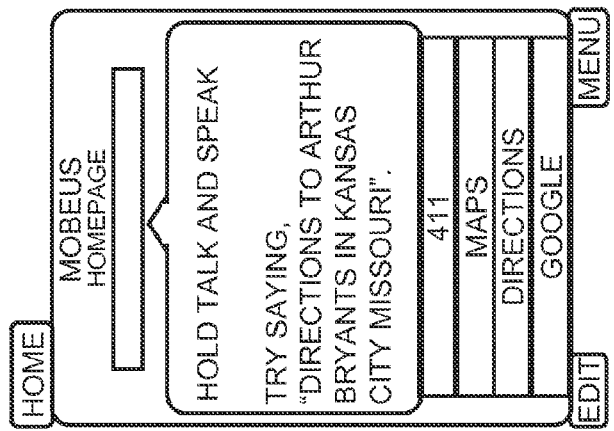
FIG. 7 depicts the layout and initial screen for the user interface.
Figure 7:
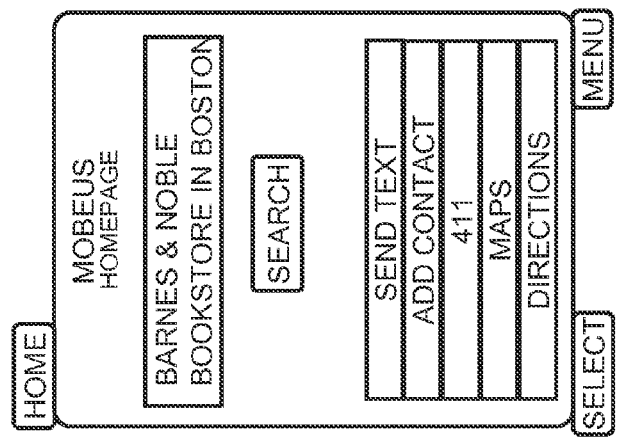
Figure 7:
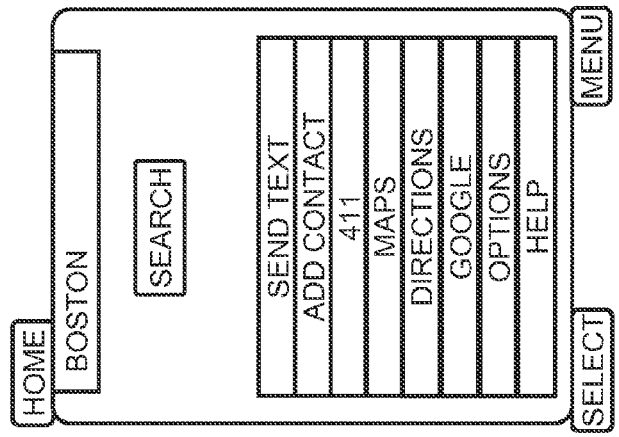

FIG. 7 shows an example of how the user 130 interface layout and initial screen 700 may look on a user's 130 mobile communications facility 120. The layout, from top to bottom, may include a plurality of components, such as a row of navigable tabs, the current page, soft-key labels at the bottom that can be accessed by pressing the left or right soft-keys on the phone, a scroll-bar on the right that shows vertical positioning of the screen on the current page, and the like. The initial screen may contain a text-box with a "Search" button, choices of which domain applications 318 to launch, a pop-up hint for first-time users 130, and the like. The text box may be a shortcut that users 130 can enter into, or speak into, to jump to a domain application 318 such as "Restaurants in Cambridge" or "Send a text message to Joe". When the user 130 selects the "Search" button, the text content is sent. Application choices may send the user 130 to the appropriate application when selected. The popup hint 1) tells the user 130 to hold the green TALK button to speak, and 2) gives the user 130 a suggestion of what to say to try the system out. Both types of hints may go away after several uses.

Figure 7A:
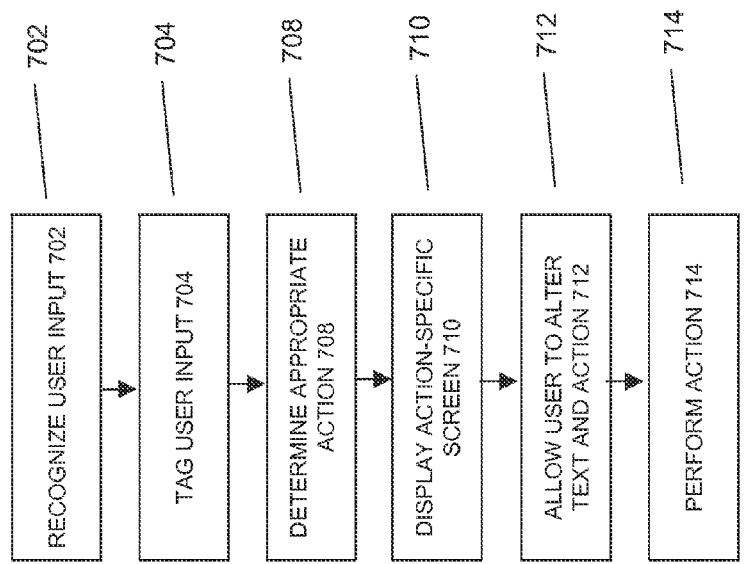
FIG. 7A depicts the flow chart for determining application level actions.

FIG. 7A depicts using the speech recognition results to provide top-level control or basic functions of a mobile communication device, music device, navigation device, and the like. In this case, the outputs from the speech recognition facility may be used to determine and perform an appropriate action of the phone. The process depicted in FIG. 7A may start at step 702 to recognize user input, resulting in the words, numbers, text, phrases, commands, and the like that the user spoke. Optionally at a step 704 user input may be tagged with tags which help determine appropriate actions. The tags may include information about the input, such as that the input was a messaging input, an input indicating the user would like to place a call, an input for a search engine, and the like. The next step 708 is to determine an appropriate action, such as by using a combination of words and tags. The system may then optionally display an action-specific screen at a step 710, which may allow a user to alter text and actions at a step 712. Finally, the system performs the selected action at a step 714. The actions may include things such as: placing a phone call, answering a phone call, entering text, sending a text message, sending an email message, starting an application 112 resident on the mobile communication facility 120, providing an input to an application resident on the mobile communication facility 120, changing an option on the mobile communication facility 120, setting an option on the mobile communication facility 120, adjusting a setting on the mobile communication facility 120, interacting with content on the mobile communication facility 120, and searching for content on the mobile communication facility 120. The perform action step 714 may involve performing the action directly using built-in functionality on the mobile communications facility 120 or may involve starting an application 112 resident on the mobile communication facility 120 and having the application 112 perform the desired action for the user. This may involve passing information to the application 112 which will allow the application 112 to perform the action such as words spoken by the user 130 or tagged results indicating aspects of action to be performed. This top level phone control is used to provide the user 130 with an overall interface to a variety of functionality on the mobile communication facility 120. For example, this functionality may be attached to a particular button on the mobile communication facility 120. The user 130 may press this button and say something like "call Joe Cerra" which would be tagged as [type=call] [name=Joe Cerra], which would map to action DIAL, invoking a dialing-specific GUI screen, allowing the user to correct the action or name, or to place the call. Other examples may include the case where the user can say something like "navigate to 17 dunster street Cambridge Mass.", which would be tagged as [type=navigate] [state=MA] [city=Cambridge] [street=dunster] [street_number=17], which would be mapped to action NAVIGATE, invoking a navigation-specific GUI screen allowing the user to correct the action or any of the tags, and then invoking a build-in navigation system on the mobile communications facility 120. The application which gets invoked by the top-level phone control may also allow speech entry into one or more text boxes within the application. So, once the user 130 speaks into the top level phone control and an application is invoked, the application may allow further speech input by including the ASR client 118 in the application. This ASR client 118 may get detailed results from the top level phone control such that the GUI of the application may allow the user 130 to correct the resulting words from the speech recognition system including seeing alternate results for word choices.

Figure 7B:
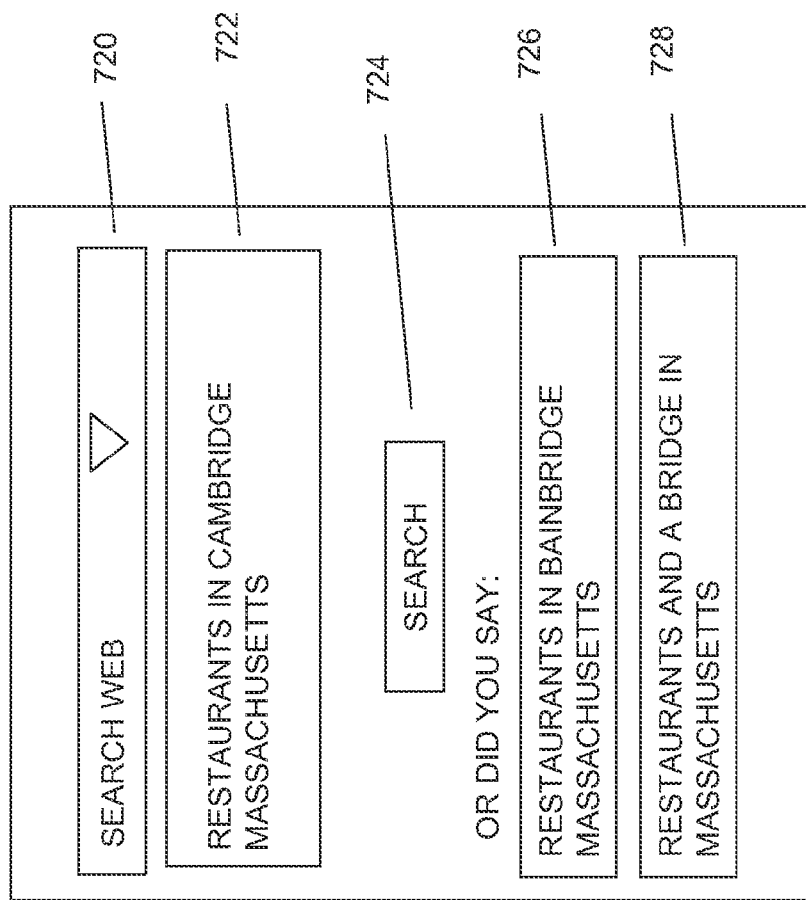
FIG. 7B depicts a searching landing page.

FIG. 7B shows as an example, a search-specific GUI screen that may result if the user says something like "restaurants in Cambridge Mass.". The determined action 720 is shown in a box which allows the user to click, on the down arrow or other icon to see other action choices (if the user wants to send email about "restaurants in Cambridge Mass." for example). There is also a text box 722 which shows the words recognized by the system. This text box 722 may allow the user to alter the text by speaking, or by using the keypad, or by selecting among alternate choices from the speech recognizer. The search button 724 allows the user to carry out the search based on a portion of the text in the text box 722. Boxes 726 and 728 show alternate choices from the speech recognizer. The user may click on one of these items to facilitate carrying out the search based on a portion of the text in one of these boxes. Selecting box 726 or 728 may cause the text in the selected box to be exchanged with the text in text box 722.

Figure 7C:
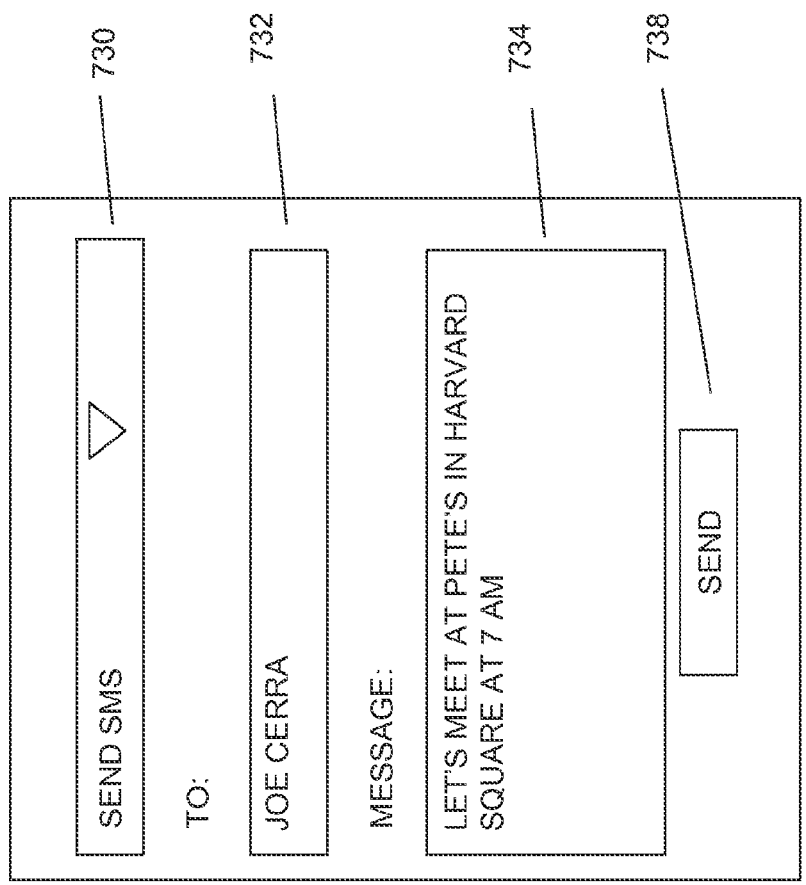
FIG. 7C depicts a SMS text landing page

FIG. 7C shows an embodiment of an SMS-specific GUI screen that may result if the user says something like "send SMS to joe cerra let's meet at pete's in harvard square at 7 am". The determined action 730 is shown in a box which allows the user to click on the down arrow or other icon to see other action choices. There is also a text box 732 which shows the words recognized as the "to" field. This text box 732 may allow the user to alter the text by speaking, or by using the keypad, or by selecting among alternate choices from the speech recognizer. Message text box 734 shows the words recognized as the message component of the input. This text box 734 may allow the user to alter the text by speaking, or by using the keypad, or by selecting among alternate choices from the speech recognizer. The send button 738 allows the user to send the text message based on the contents of the "to" field and the message component.

This top-level control may also be applied to other types of devices such as music players, navigation systems, or other special or general-purpose devices, in this case, the top-level control allows users to invoke functionality or applications across the device using speech input.

This top-level control may make use of adaptation to improve the speech recognition results. This adaptation may make use of history of usage by the particular user to improve the performance of the recognition models. The adaptation of the recognition models may include adapting acoustic models, adapting pronunciations, adapting vocabularies, and adapting language models. The adaptation may also make use of history of usage across many users. The adaptation may make use of any correction or changes made by the user. The adaptation may also make use of human transcriptions created after the usage of the system.

This top level control may make use of adaptation to improve the performance of the word and phrase-level tagging. This adaptation may make use of history of usage by the particular user to improve the performance of the models used by the tagging. The adaptation may also make use of history of usage by other users to improve the performance of the models used by the tagging. The adaptation may make use of change or corrections made by the user. The adaptation may also make use of human transcription of appropriate tags created after the usage of the system.

This top level control may make use of adaptation to improve the performance selection of the action. This adaptation may make use of history of usage by the particular user to improve the performance of the models and rules used by this action selection. The adaptation may also make use of history of usage by other users to improve the performance of the models and rules used by the action selection. The adaptation may make use of change or corrections made by the user. The adaptation may also make use of human transcription of appropriate actions after the usage of the system. It should be understood that these and other forms of adaptation may be used in the various embodiments disclosed throughout this disclosure where the potential for adaptation is noted.

Figure 8:
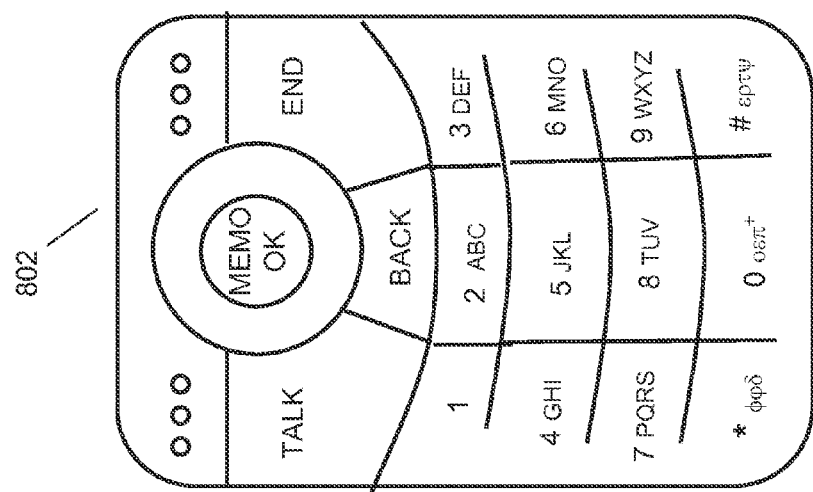
FIG. 8 depicts a keypad layout for the user interface.

Although there are mobile phones with full alphanumeric keyboards, most mass-market devices are restricted to the standard telephone keypad 802, such as shown in FIG. 8. Command keys may include a "TALK", or green-labeled button, which may be used to make a regular voice-based phone call; an "END" button which is used to terminate a voice-based call or end an application and go back to the phone's main screen; a five-way control navigation pad that users may employ to move up, down, left, and right, or select by pressing on the center button (labeled "MENU/OK" in FIG. 8); two soft-key buttons that may be used to select the labels at the bottom of the screen; a back button which is used to go back to the previous screen in any application; a delete button used to delete entered text that on some phones, such as the one pictured in FIG. 8, the delete and back buttons are collapsed into one; and the like.

Figure 9:
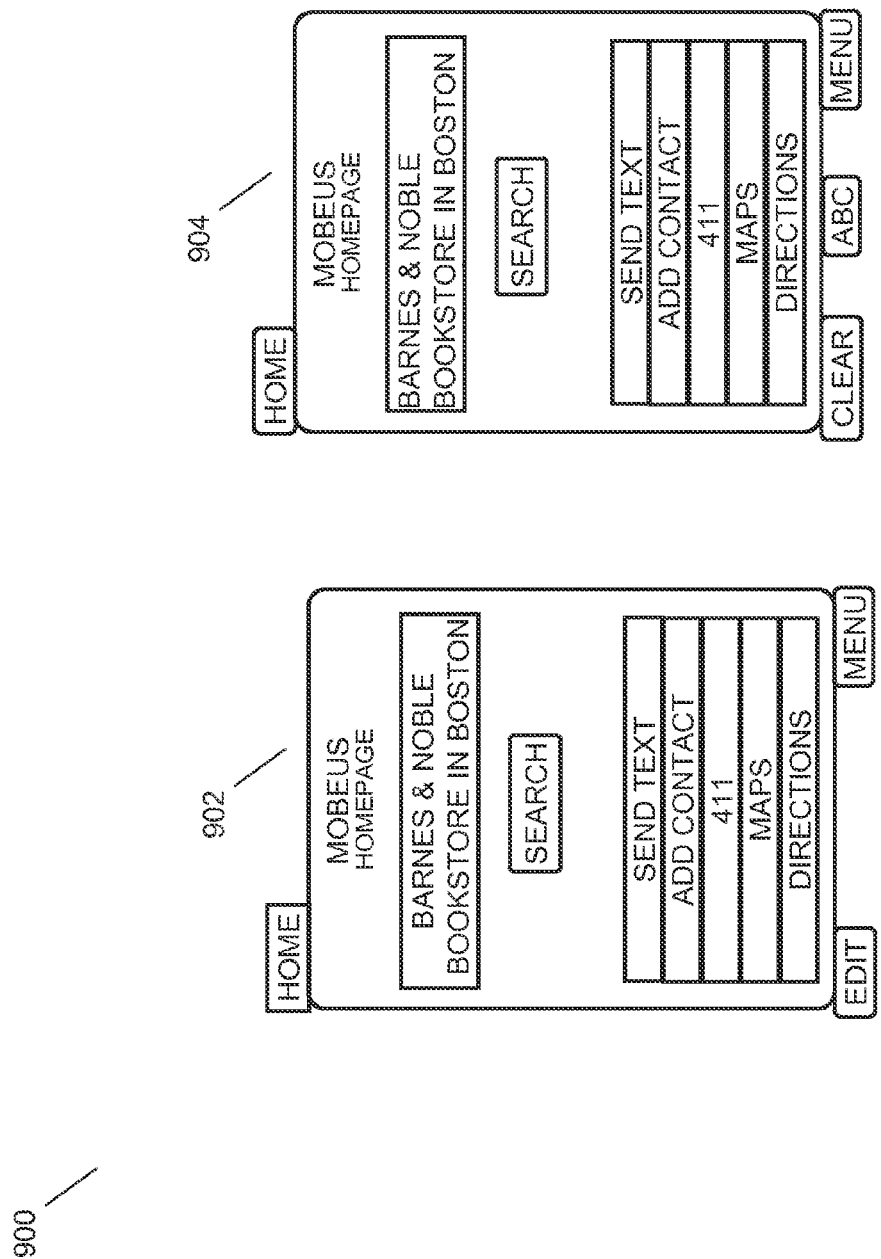
FIG. 9 depicts text boxes for the user interface.

FIG. 9 shows text boxes in a navigate-and-edit mode. A text box is either in navigate mode or edit mode 900. When in navigate mode 902, no cursor or a dim cursor is shown and 'up/down', when the text box is highlighted, moves to the next element on the browser screen. For example, moving down would highlight the "search" box. The user 130 may enter edit mode from navigate mode 902 on any of a plurality of actions; including pressing on center joystick; moving left/right in navigate mode; selecting "Edit" soft-key; pressing any of the keys 0-9, which also adds the appropriate letter to the text box at the current cursor position; and the like. When in edit mode 904, a cursor may be shown and the left soft-key may be "Clear" rather than "Edit." The current shift mode may be also shown in the center of the bottom row. In edit mode 904, up and down may navigate within the text box, although users 130 may also navigate out of the text box by navigating past the first and last rows. In this example, pressing up would move the cursor to the first row, while pressing down instead would move the cursor out of the text box and highlight the "search" box instead. The user 130 may hold the navigate buttons down to perform multiple repeated navigations. When the same key is held down for an extended time, four seconds for example, navigation may be sped up by moving more quickly, for instance, times four in speed. As an alternative, navigate mode 902 may be removed so that when the text box is highlighted, a cursor may be shown. This may remove the modality, but then requires users 130 to move up and down through each line of the text box when trying to navigate past the text box.

Figure 10:
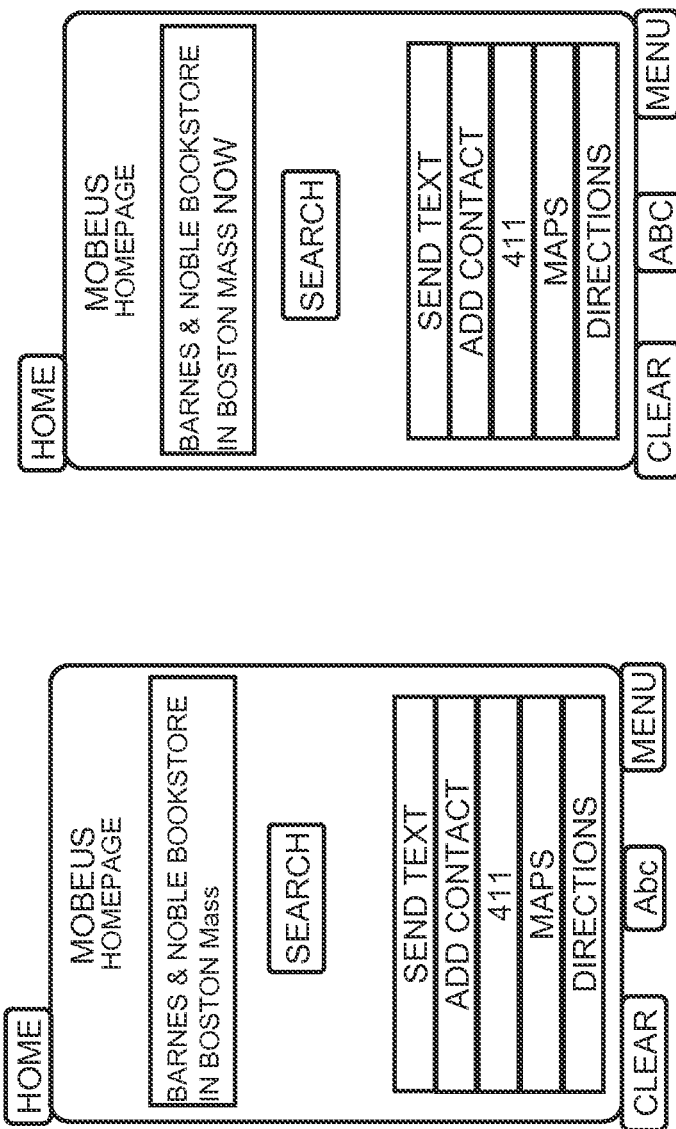
FIG. 10 depicts a first example of text entry for the user interface.
Figure 11:
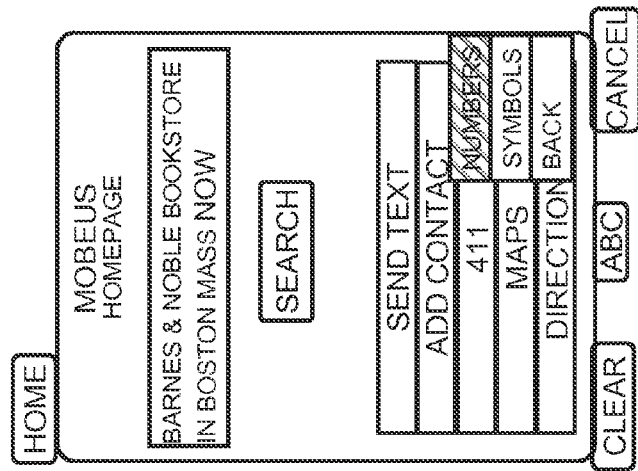
FIG. 11 depicts a second example of text entry for the user interface.
Figure 11:
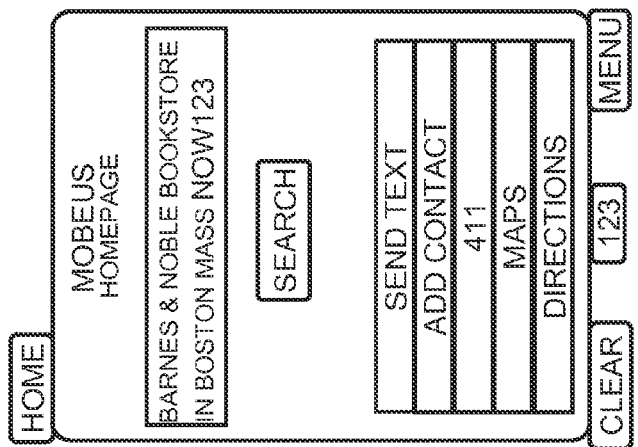
Figure 11:
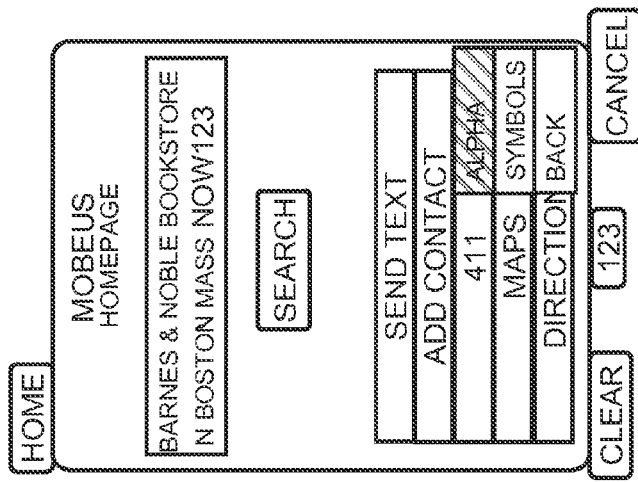
Figure 12:
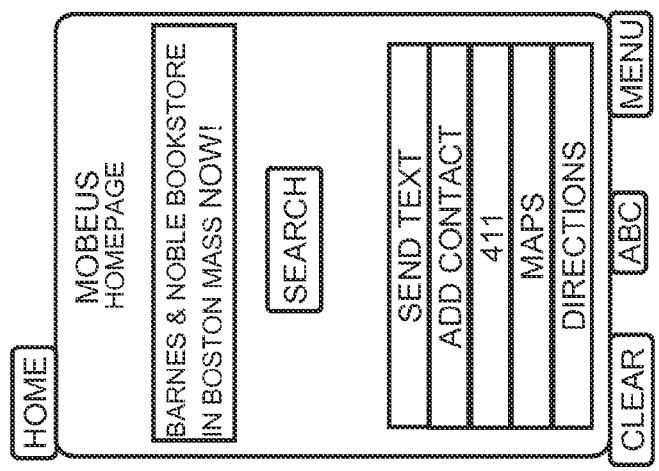
FIG. 12 depicts a third example of text entry for the user interface.
Figure 12:
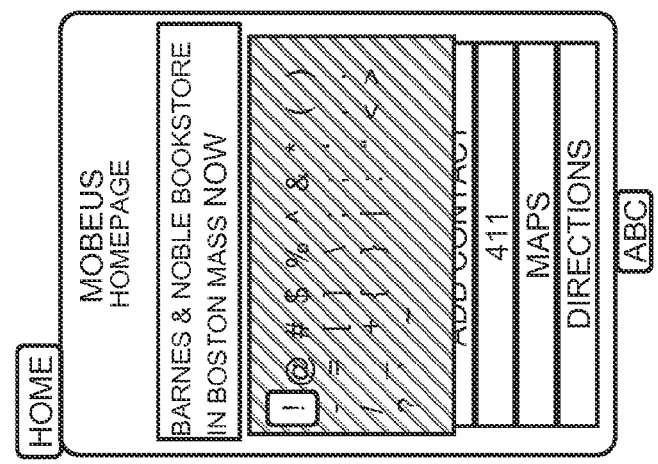
Figure 12:
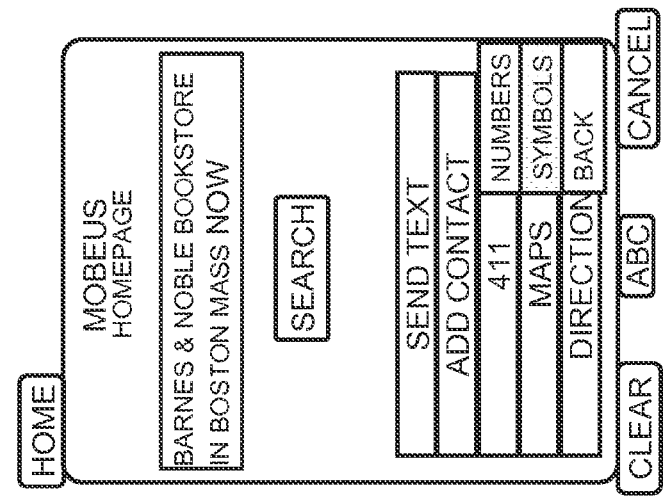

Text may be entered in the current cursor position in multi-tap mode, as shown in FIGS. 10, 11, and 12. As an example, pressing "2" once may be the same as entering "a", pressing "2" twice may be the same as entering "b", pressing "2" three times may be the same as entering "c", and pressing "2" 4 times may be the same as entering "2". The direction keys may be used to reposition the cursor. Back, or delete on some phones, may be used to delete individual characters. When Back is held down, text may be deleted to the beginning of the previous recognition result, then to the beginning of the text. Capitalized letters may be entered by pressing the "*" key which may put the text into capitalization mode, with the first letter of each new word capitalized. Pressing "*" again puts the text into all-caps mode, with all new entered letters capitalized. Pressing "*" yet again goes back to lower case mode where no new letters may be capitalized. Numbers may be entered either by pressing a key repeatedly to cycle through the letters to the number, or by going into numeric mode. The menu soft-key may contain a "Numbers" option which may put the cursor into numeric mode. Alternatively, numeric mode may be accessible by pressing "*" when cycling capitalization modes. To switch back to alphanumeric mode, the user 130 may again select the Menu soft-key which now contains an "Alpha" option, or by pressing "*". Symbols may be entered by cycling through the "1" key, which may map to a subset of symbols, or by bringing up the symbol table through the Menu soft-key. The navigation keys may be used to traverse the symbol table and the center OK button used to select a symbol and insert it at the current cursor position.

Figure 13:
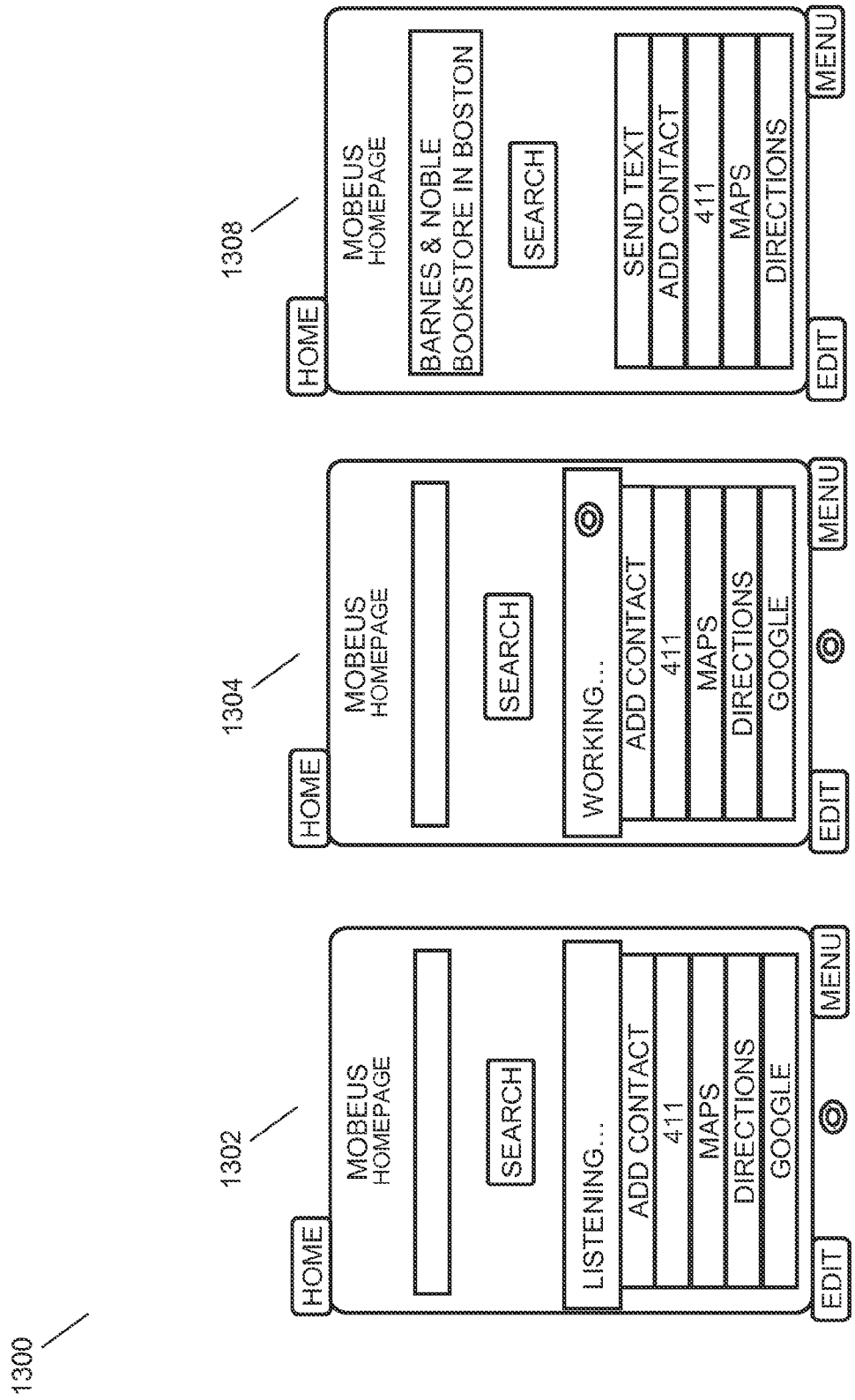
FIG. 13 depicts speech entry for the user interface.

FIG. 13 provides examples of speech entry 1300, and how it is depicted on the user 130 interface. When the user 130 holds the TALK button to begin speaking, a popup may appear informing the user 130 that the recognizer is listening 1302. In addition, the phone may either vibrate or play a short beep to cue the user 130 to begin speaking. When the user 130 is finished speaking and releases the TALK button, the popup status may show "Working" with a spinning indicator. The user 130 may cancel a processing recognition by pressing a button on the keypad or touch screen, such as "Back" or a directional arrow. Finally, when the result is received from the ASR server 204, the text box may be populated.

Figure 14:
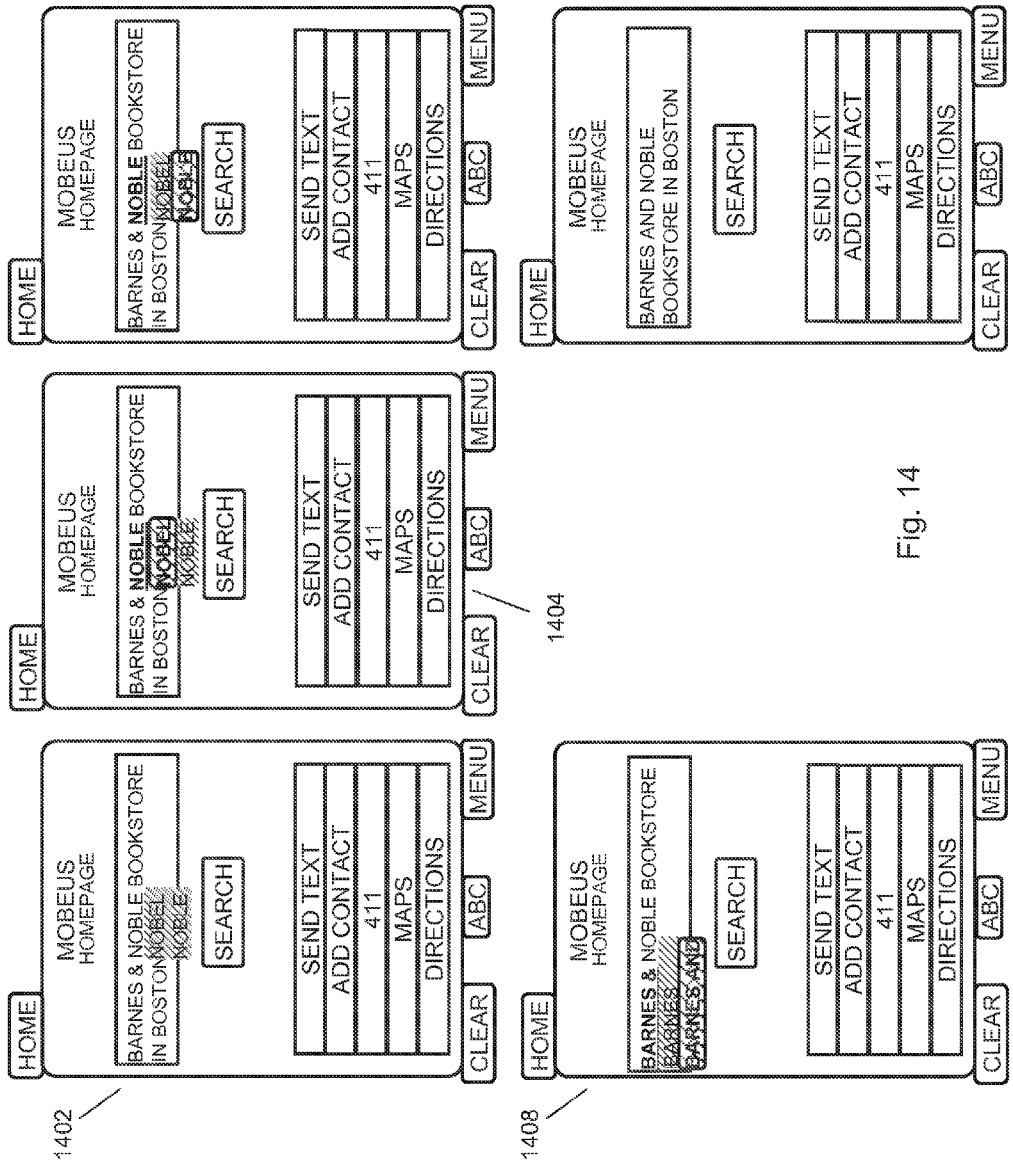
FIG. 14 depicts speech-result correction for the user interface.

Referring to FIG. 14, when the user 130 presses left or right to navigate through the text box, alternate results 1402 for each word may be shown in gray below the cursor for a short time, such as 1.7 seconds. After that period, the gray alternates disappear, and the user 130 may have to move left or right again to get the box. If the user 130 presses down to navigate to the alternates while it is visible, then the current selection in the alternates may be highlighted, and the words that will be replaced in the original sentence may be highlighted in red 1404. The image on the bottom left of FIG. 14 shows a case where two words in the original sentence will be replaced 1408. To replace the text with the highlighted alternate, the user 130 may press the center OK key. When the alternate list is shown in red 1408 after the user 130 presses down to choose it, the list may become hidden and go back to normal cursor mode if there is no activity after some time, such as 5 seconds. When the alternate list is shown in red, the user 130 may also move out of it by moving up or down past the top or bottom of the list, in which case the normal cursor is shown with no gray alternates box. When the alternate list is shown in red, the user 130 may navigate the text by words by moving left and right. For example, when "Nobel" is highlighted 1404, moving right would highlight "bookstore" and show its alternate list instead.

Figure 15:
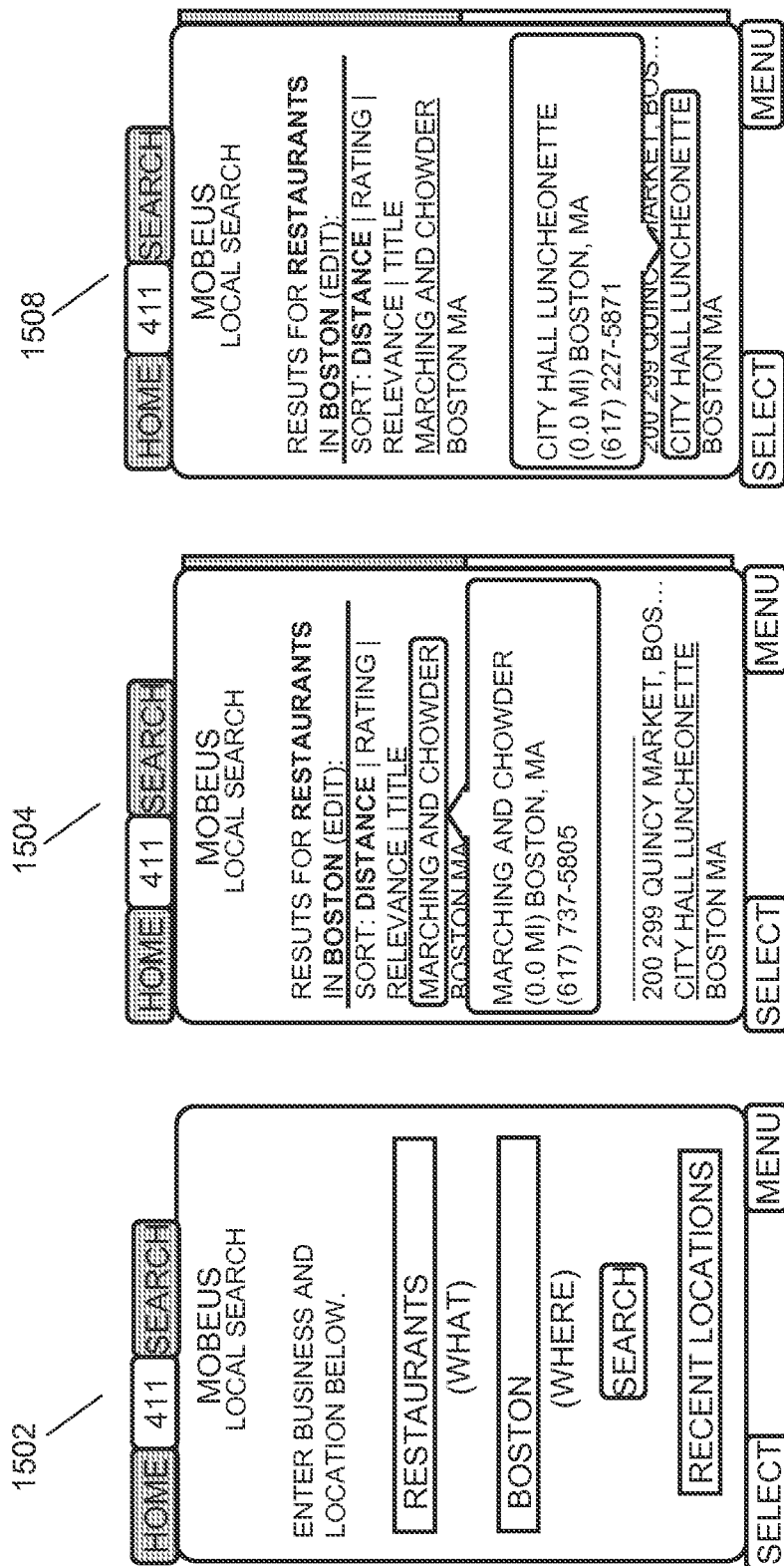
FIG. 15 depicts a first example of navigating browser screen for the user interface.

FIG. 15 depicts screens that show navigation and various views of information related to search features of the methods and systems herein described. When the user 130 navigates to a new screen, a "Back" key may be used to go back to a previous screen. As shown in FIG. 15, if the user 130 selects "search" on screen 1502 and navigates to screen 1504 or 1508, pressing "Back" after looking through the search results of screens 1504 or 1508 the screen 1502 may be shown again.

Figure 16:
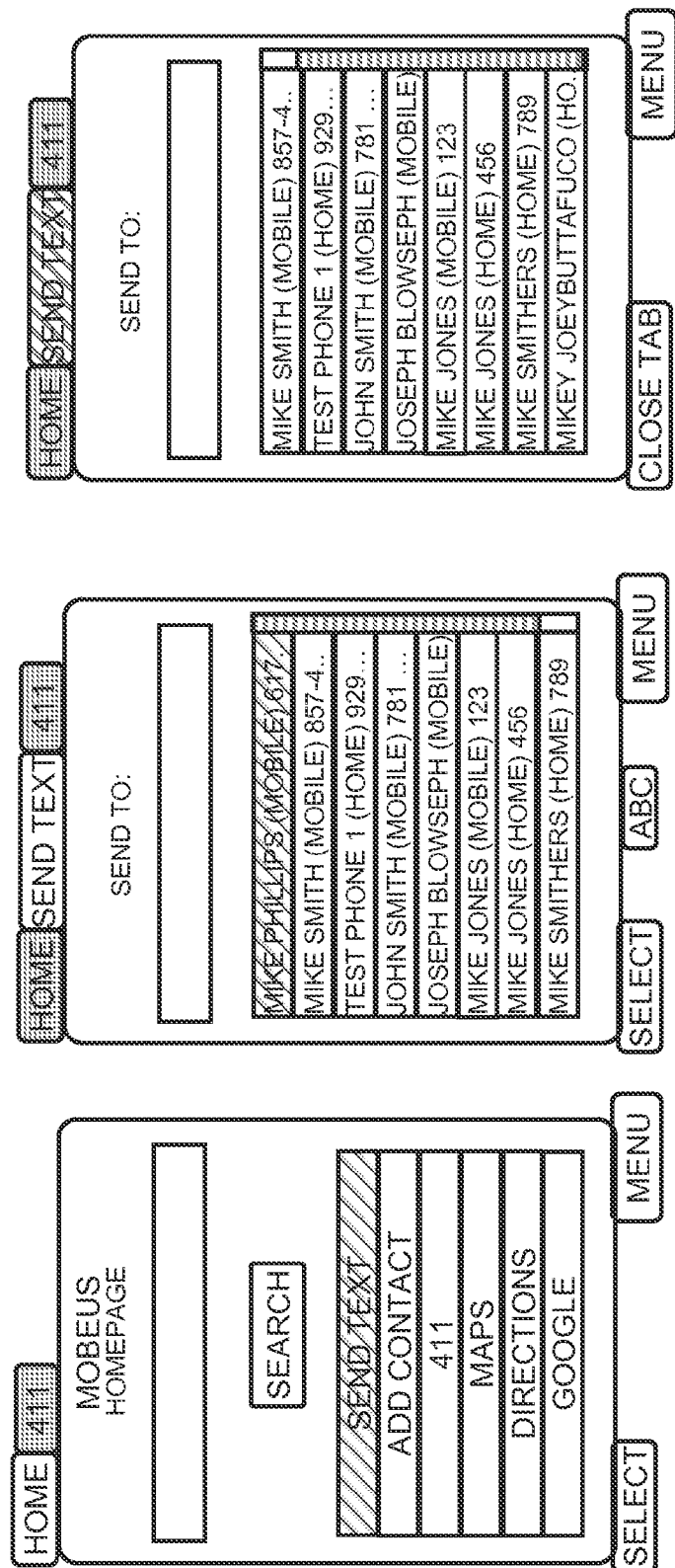
FIG. 16 depicts a second example of navigating browser screen for the user interface.

Referring to FIG. 16, when the user 130 navigates to a new page from the home page, a new tab may be automatically inserted, such as to the right of the "home" tab, as shown in FIG. 16. Unless the user 130 has selected to enter or alter entries in a text box, tabs can be navigated by pressing left or right keys on the user interface keypad. The user 130 may also move the selection indicator to the top of the screen and select the tab itself before moving left or right. When the tab is highlighted, the user 130 may also select a soft-key to remove the current tab and screen. As an alternative, tabs may show icons instead of names as pictured, tabs may be shown at the bottom of the screen, the initial screen may be pre-populated with tabs, selection of an item from the home page may take the user 130 to an existing tab instead of a new one, and tabs may not be selectable by moving to the top of the screen and tabs may not be removable by the user 130, and the like.

Referring again briefly to FIG. 2, communication may occur among at least the ASR client 118, ASR router 202, and ASR server 204. These communications may be subject to specific protocols. In an embodiment of these protocols, the ASR client 118, when prompted by user 130, may record audio and may send it to the ASR router 202. Received results from the ASR router 202 are displayed for the user 130. The user 130 may send user 130 entries to ASR router 202 for any text entry. The ASR router 202 sends audio to the appropriate ASR server 204, based at least on the user 130 profile represented by the client ID and CPU load on ASR servers 204. The results may then be sent from the ASR server 204 back to the ASR client 118. The ASR router 202 re-routes the data if the ASR server 204 indicates a mismatched user 130 profile. The ASR muter 202 sends to the ASR server 204 any user 130 text inputs for editing. The ASR server 204 receives audio from ASR router 202 and performs recognition. Results are returned to the ASR router 202. The ASR server 204 alerts the ASR router 202 if the user's 130 speech no longer matches the user's 130 predicted user 130 profile, and the ASR router 202 handles the appropriate re-route. The ASR server 204 also receives user-edit accepted text results from the ASR router 202.

Figure 17:
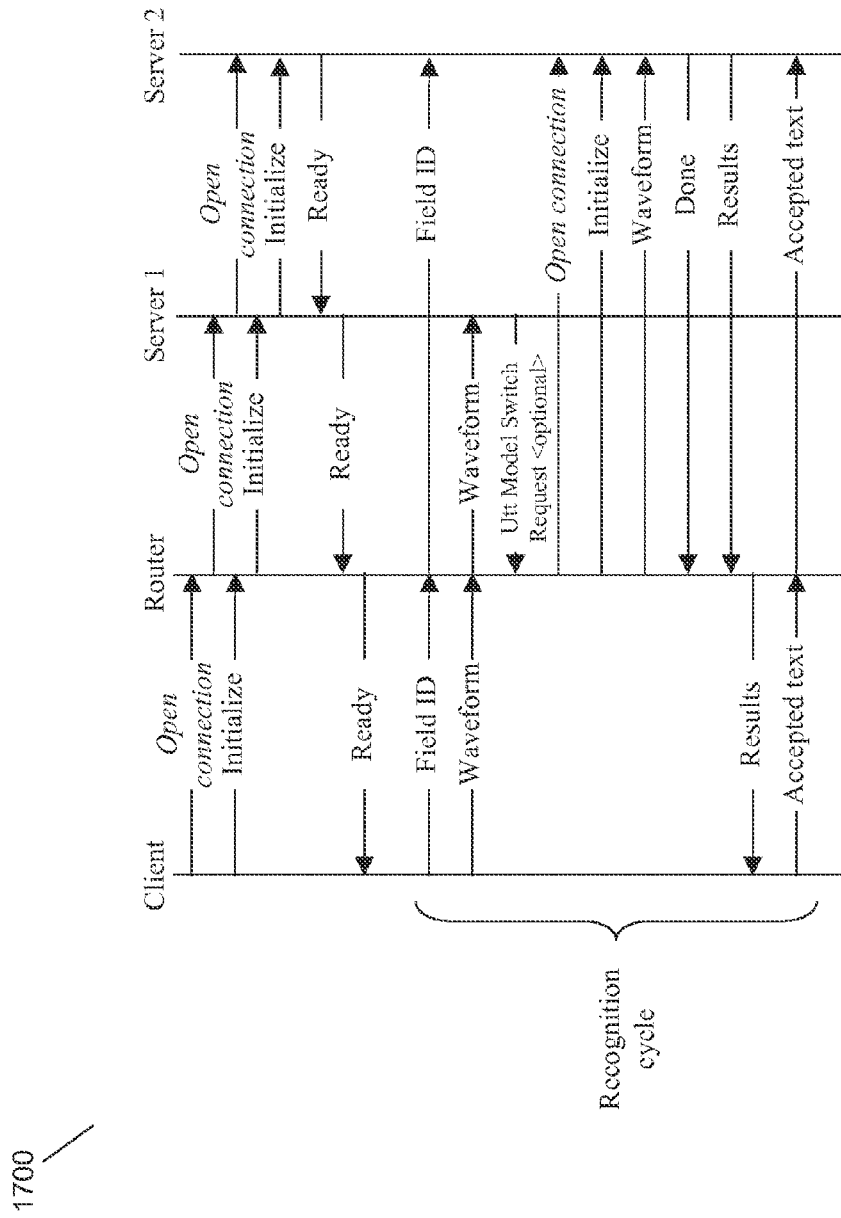
FIG. 17 depicts packet types communicated between the client, router, and server at initialization and during a recognition cycle.

FIG. 17 shows an illustration of the packet types that are communicated between the ASR client 118, ASR router 202, and server 204 at initialization and during a recognition cycle. During initialization, a connection is requested, with the connection request going from ASR client 118 to the ASR router 202 and finally to the ASR server 204. A ready signal is sent back from the ASR servers 204 to the ASR router 202 and finally to the ASR client 118. During the recognition cycle, a waveform is input at the ASR client 118 and routed to the ASR servers 204. Results are then sent back out to the ASR client 118, where the user 130 accepts the returned text, sent back to the ASR servers 104. A plurality of packet types may be utilized during these exchanges, such as PACKET_WAVEFORM=1, packet is waveform; PACKET_TEXT=2, packet is text; PACKET_END_OF_STREAM=3, end of waveform stream; PACKET_IMAGE=4, packet is image; PACKET_SYNCLIST=5, syncing lists, such as email lists; PACKET_CLIENT_PARAMETERS=6, packet contains parameter updates for client; PACKET_ROUTER_CONTROL=7, packet contains router control information; PACKET_MESSAGE=8, packet contains status, warning or error message; PACKET_IMAGE_REQUEST=9, packet contains request for an image or icon; or the like.

Referring to FIG. 18, each message may have a header, that may include various fields, such as packet version, packet type, length of packet, data flags, unreserved data, and any other data fields or content that is applicable to the message. All multi-byte words may be encoded in big-endian format.

Referring again to FIG. 17, initialization may be sent from the ASR client 118, through the ASR router 202, to the ASR server 204. The ASR client 118 may open a connection with the ASR router 202 by sending its Client ID. The ASR router 202 in turn looks up the ASR client's 118 most recent acoustic model 220 (AM) and language model 228 (LM) and connects to an appropriate ASR server 204. The ASR router 202 stores that connection until the ASR client 118 disconnects or the Model ID changes. The packet format for initialization may have a specific format, such as Packet type=TEXT, Data=ID:<client id string> ClientVersion: <client version string>, Protocol:<protocol id string> NumReconnects: <#attempts client has tried reconnecting to socket>, or the like. The communications path for initialization may be (1) Client sends Client ID to ASR router 202, (2) ASR router 202 forwards to ASR a modified packet: Modified Data=<client's original packet data> SessionCount; <session count string> SpeakerID: <user id sting>\0, and (3) resulting state; ASR is now ready to accept utterance(s) from the ASR client 118, ASR router 202 maintains client's ASR connection.

As shown in FIG. 17, a ready packet may be sent back to the ASR client 118 from the ASR servers 204. The packet format for packet ready may have a specific format, such as Packet type=TEXT, Data=Ready\0, and the communications path may be (1) ASR sends Ready router and (2) ASR router 202 forwards Ready packet to ASR client 118.

As shown in FIG. 17, a field ID packet containing the name of the application and text field within the application may be sent from the ASR client 118 to the ASR servers 204. This packet is sent as soon as the user 130 pushes the TALK button to begin dictating one utterance. The ASR servers 204 may use the field ID information to select appropriate recognition models 142 for the next speech recognition invocation. The ASR router 202 may also use the field ID information to route the current session to a different ASR server 204. The packet format for the field ID packet may have a specific format, such as Packet type=TEXT; Data=FieldID; <type> <url> <form element name>, for browsing mobile web pages; Data=FieldID; message, for SMS text box; or the like. The connection path may be (1) ASR client 118 sends Field ID to ASR router 202 and (2) ASR router 202 forwards to ASR for logging.

As shown in FIG. 17, a waveform packet may be sent from the ASR client 118 to the ASR servers 204. The ASR router 202 sequentially streams these waveform packets to the ASR server 204. If the ASR server 204 senses a change in the Model ID, it may send the ASR router 202 a ROUTER. CONTROL packet containing the new Model ID. In response, the ASR router 202 may reroute the waveform by selecting an appropriate ASR and flagging the waveform such that the new ASR server 204 will not perform additional computation to generate another Model ID. The ASR router 202 may also re-route the packet if the ASR server's 204 connection drops or times out. The ASR router 202 may keep a cache of the most recent utterance, session information such as the client ID and the phone ID, and corresponding FieldID, in case this happens. The packet format for the waveform packet may have a specific format, such as Packet type=WAVEFORM; Data=audio; with the lower 16 bits of flags set to current Utterance ID of the client. The very first part of WAVEFORM packet may determine the waveform type, currently only supporting AMR or QCELP, where "#!.AMR\n" corresponds to AMR and "RIFF" corresponds to QCELP. The connection path may be (1) ASR client 118 sends initial audio packet (referred to as the BOS, or beginning of stream) to the ASR router 202, (2) ASR router 202 continues streaming packets (regardless of their type) to the current ASR until one of the following events occur: (a) ASR router 202 receives packet type END_OF_STREAM, signaling that this is the last packet for the waveform, (b) ASR disconnects or times out, in which case ASR router 202 finds new ASR, repeats above handshake, sends waveform cache, and continues streaming waveform from client to ASR until receives END_OF_STREAM, (c) ASR sends ROUTER_CONTROL to ASR router 202 instructing the ASR router 202 that the Model ID for that utterance has changed, in which case the ASR router 202 behaves as in 'b', (d) ASR client 118 disconnects or times out, in which case the session is closed, or the like. If the recognizer times out or disconnects after the waveform is sent then the ASR router 202 may connect to a new ASR.

As shown in FIG. 17, a request model switch for utterance packet may be sent from the ASR server 204 to the ASR router 202. This packet may be sent when the ASR server 204 needs to flag that its user 130 profile does not match that of the utterance, i.e. Model ID for the utterances has changed. The packet format for the request model switch for utterance packet may have a specific format, such as Packet type=ROUTER_CONTROL; Data=SwitchModelID; AM=<integer> LM=<integer> SessionID=<intger> UttID=<integer>. The communication may be (1) ASR server 204 sends control packet to ASR router 202 after receiving the first waveform packet, and before sending the results packet, and (2) ASR router 202 then finds an ASR which best matches the new Model ID, flags the waveform data such that the new ASR server 204 will not send another SwitchModelID packet, and resends the waveform. In addition, several assumptions may be made for this packet, such as the ASR server 204 may continue to read the waveform packet on the connection, send a Alternate String or Switch-ModelID for every utterance with BOS, and the ASR router 202 may receive a switch model id packet, it sets the flags value of the waveform packets to <flag value> & 0x8000 to notify ASR that this utternce's Model ID does not need to be checked.

As shown in FIG. 17, a done packet may be sent from the ASR server 204 to the ASR router 202. This packet may be sent when the ASR server 204 has received the last audio packet, such as type END_OF_STREAM. The packet format for the done packet may have a specific format, such as Packet type=TEXT; with the lower 16 bits of lags set to Utterance ID and Data=Done\0. The communications path may be (1) ASR sends done to ASR router 202 and (2) ASR router 202 forwards to ASR client 118, assuming the ASR client 118 only receives one done packet per utterance.

As shown in FIG. 17, an utterance results packet may be sent from the ASR server 204 to the ASR client 118. This packet may be sent when the ASR server 204 gets a result from the ASR engine 208. The packet format for the utterance results packet may have a specific format, such as Packet type=TEXT, with the lower 16 bits of flags set to Utterance ID and Data=ALTERNATES: <utterance result string>. The communications path may be (1) ASR sends results to ASR router 202 and (2) ASR router 202 forwards to ASR client 118. The ASR client 118 may ignore the results if the Utterance ID does not match that of the current recognition As shown in FIG. 17, an accepted text packet may be sent from the ASR client 118 to the ASR server 204. This packet may be sent when the user 130 submits the results of a text box, or when the text box looses focus, as in the API, so that the recognizer can adapt to corrected input as well as full-text input. The packet format for the accepted text packet may have a specific format, such as Packet type=TEXT, with the lower 16 bits of flags set to most recent Utterance ID, with Data=Accepted_Text: <accepted utterance string>. The communications path may be (1) ASR client 118 sends the text submitted by the user 130 to ASR router 202 and (2) ASR router 202 forwards to ASR server 204 which recognized results, where <accepted utterance string> contains the text string entered into the text box. In embodiments, other logging information, such as timing information and user 130 editing keystroke information may also be transferred.

Router control packets may be sent between the ASR client 118, ASR router 202, and ASR servers 204, to help control the ASR router 202 during runtime. One of a plurality of router control packets may be a get router status packet. The packet format for the get router status packet may have a specific format, such as Packet type=ROUTER_CONTROL, with Data=GetRouterStatus\0. The communication path may be one or more of the following: (1) entity sends this packet to the ASR router 202 and (2) ASR router 202 may respond with a status packet.

FIG. 19 depicts an embodiment of a specific status packet format 1900, that may facilitate determining status of the ASR Router 202, ASR Server 204, ASR client 118 and any other element, facility, function, data state, or information related to the methods and systems herein disclosed.

Another of a plurality of router control packets may be a busy out ASR server packet. The packet format for the busy out ASR server packet may have a specific format, such as Packet type=ROUTER_CONTROL, with Data=BusyOutASRServer: <ASR Server ID>\0. Upon receiving the busy out ASR server packet, the ASR router 202 may continue to finish up the existing sessions between the ASR router 202 and the ASR server 204 identified by the <ASR Server ID>, and the ASR router 202 may not start a new session with the said ASR server 204. Once all existing sessions are finished, the ASR router 202 may remove the said ASR server 204 from its ActiveServer array. The communication path may be (1) entity sends this packet to the ASR router 202 and (2) ASR router 202 responds with ACK packet with the following format: Packet type=TEXT, and Data=ACK\0.

Another of a plurality of router control packets may be an immediately remove ASR server packet. The packet format for the immediately remove ASR server packet may have a specific format, such as Packet type=ROUTER_CONTROL, with Data=RemoveASRServer; <ASR Server ID>\0. Upon receiving the immediately remove ASR server packet, the ASR router 202 may immediately disconnect all current sessions between the ASR muter 202 and the ASR server 204 identified by the <ASR Server ID>, and the ASR router 202 may also immediately remove the said ASR server 204 from its Active Server array. The communication path may be (1) entity sends this packet to the ASR router 202 and (2) ASR router 202 responds with ACK packet with the following format: Packet type=TEXT, and Data=ACK\0.

Another of a plurality of router control packets may be an add of an ASR server 204 to the router packet. When an ASR server 204 is initially started, it may send the router(s) this packet. The ASR router 202 in turn may add this ASR server 204 to its Active Server array after establishing this ASR server 204 is indeed functional. The packet format for the add an ASR server 204 to the ASR router 202 may have a specific format, such as Packet type=ROUTER_CONTROL, with Data=AddASRServer: ID=<server id> IP=<server ip address> PORT=<server port> AM=<server AM integer> LM=<server LM integer> NAME=<server name string> PROTOCOL=<server protocol float>. The communication path may be (1) entity sends this packet to the ASR router 202 and (2) ASR router 202 responds with ACK packet with the following format: Packet type=TEXT, and Data=ACK\0.

Another of a plurality of router control packets may be an alter router logging format packet. This function may cause the ASR router 202 to read a logging.properties file, and update its logging format during runtime. This may be useful for debugging purposes. The location of the logging.properties file may be specified when the ASR router 202 is started. The packet format for the alter router logging format may have a specific format, such as Packet type=ROUTER_CONTROL, with Data=ReadLogConfigurationFile. The communications path may be (1) entity sends this packet to the ASR router 202 and (2) ASR router 202 responds with ACK packet with the following format: Packet type=TEXT, and Data=ACK\0.

Another of a plurality of router control packets may be a get ASR server status packet. The ASR server 204 may self report the status of the current ASR server 204 with this packet. The packet format for the get ASR server 204 status may have a specific format, such as Packet type=ROUTER_CONTROL, with data=RequestStatus\0. The communications path may be (1) entity sends this packet to the ASRServer 204 and (2) ASR Server 204 responds with a status packet with the following format: Packet type=TEXT; Data=ASRServerStatus: Status=<1 for ok or 0 for error> AM=<AM id> LM=LM id> NumSession=<number of active sessions> NumUtts=<number of queued utterances> TimeSinceLastRec=<seconds since last recognizer activity>\n Session: client=<client id> speaker=<speaker id> sessioncount=<sessioncount>\n <other Session: line if other sessions exist>\n\0. This router control packet may be used by the ASR router 202 when establishing whether or not an ASR server 204 is indeed functional.

There may be a plurality of message packets associated with communications between the ASR client 118, ASR router 202, and ASR servers 204, such as error, warning, and status. The error message packet may be associated with an irrecoverable error, the warning message packet may be associated with a recoverable error, and a status message packet may be informational. All three types of messages may contain strings of the format:

"<messageType><message>message</message><cause>cause</cause><code>code</code></messageType>".

Wherein "messageType" is one of either "status," "warning," or "error"; "message" is intended to be displayed to the user; "cause" is intended for debugging; and "code" is intended to trigger additional actions by the receiver of the message.

The error packet may be sent when a non-recoverable error occurs and is detected. After an error packet has been sent, the connection may be terminated in 5 seconds by the originator if not already closed by the receiver. The packet format for error may have a specific format, such as Packet type=MESSAGE; and Data="<error><message>error message</message><cause>error cause</cause><code>error code</code></error>". The communication path from ASR client 118 (the originator) to ASR server 204 (the receiver) may be (1) ASR client 118 sends error packet to ASR server 204, (2) ASR server 204 should close connection immediately and handle error, and (3) ASR client 118 will close connection in S seconds if connection is still live. There are a number of potential causes for the transmission of an error packet, such as the ASR has received beginning of stream (BOS), but has not received end of stream (EOS) or any waveform packets for 20 seconds; a client has received corrupted data; the ASR server 204 has received corrupted data; and the like. Examples of corrupted data may be invalid packet type, checksum mismatch, packet length greater than maximum packet size, and the like.

The warning packet may be sent when a recoverable error occurs and is detected. After a warning packet has been sent, the current request being handled may be halted. The packet format for warning may have a specific format, such as Packet type=MESSAGE; Data="<warning><message>warning message</message><cause>warning cause</cause><code>warning code</code></warning>". The communications path from ASR client 118 to ASR server 204 may be (1) ASR client 118 sends warning packet to ASR server 204 and (2) ASR server 204 should immediately handle the warning. The communications path from ASR server 204 to ASR client 118 may be (1) ASR server 204 sends error packet to ASR client 118 and (2) ASR client 118 should immediately handle warning. There are a number of potential causes for the transmission of a warning packet; such as there are no available ASR servers 204 to handle the request ModelID because the ASR servers 204 are busy.

The status packets may be informational. They may be sent asynchronously and do not disturb any processing requests. The packet format for status may have a specific format, such as Packet type=MESSAGE; Data "<status><messge>status message</message><cause>status cause</cause><code>status code</code></status>". The communications path from ASR client 118 to ASR server 204 may be (1) ASR client 118 sends status packet to ASR server 204 and (2) ASR server 204 should handle status. The communication path from ASR server 204 to ASR client 118 may be (1) ASK server 204 sends status packet to ASR client 118 and (2) ASR client 118 should handle status. There are a number of potential causes for the transmission of a status packet, such as an ASR server 204 detects a model ID change for a waveform, server timeout, server error, and the like.

In embodiments, it may be useful to use a switch to indicate when the user is giving a command or information request, such as (1) push-to-talk, where the system listens while the switch or button is depressed; (2) push-to-start and push-to-end, where the system starts to listen when the button is pressed (and released) and stops when it is pressed again; and the like. The "button" might be a physical button or a virtual button on a display (e.g., a touch screen, activated by a touch). The button might be, for example, on a mobile phone, or on a mouse attached to a PC. On a mobile phone, the "talk" button might be used.

Being able to tell the speech recognition software or hardware when to listen (and, conversely, when to ignore the signal from the microphone) has a clear advantage. For instance, the speech recognition won't do something when it thinks it hears a command, but the user did not intend a command, e.g., when background noise triggers an erroneous response. Also, running the speech recognition software unnecessarily can waste computational resources on the device and slow other applications, as well as drain power unnecessarily. A button press to turn "listening" on and off with a positive action, as opposed to the possibility of an always-listening device, also gives the user a sense of security that the device isn't listening when it shouldn't.

Some solutions have used a "wake-up" word or "keyword" to tell the system to start listening. This doesn't solve the problem, since the system must be listening constantly for such a wake-up word. Wake-up words often require a distinct pause after the wake-up word to work, and users have difficulty consistently inserting such a pause after a wake-up word followed by a command. And wake-up words often have a latency, in that, once a wake-up word is detected, a secondary speech recognition process that can handle a full set of commands must be activated. Further, if the speech recognition is network-based, a wake-up word may have to initiate a network connection, adding further latency.

A problem with using a button, commonly observed in practice, is that a user will begin speaking as the button as pressed. Buttons have some resistance to being pressed and a travel time before the switch is actually closed; otherwise, the slightest touch would activate the switch inadvertently. Thus, the first part of a speech utterance is often not captured. If part of a word is cut off, the utterance may not be recognized accurately, and often the first word is a command that needs to be recognized accurately (e.g., "Search . . . " versus "Call . . . "). We will refer to this as the "instantiation problem."

The instantiation problem can be compounded in some devices, where the key press is interpreted by software, particularly on a mobile phone. The key is pressed, but the software must decide what to do with that press, and sometimes adds a further delay to the key travel.

One approach to the instantiation problem is to buffer the microphone signal, e.g., always "listen" and store perhaps a second of the speech signal in a buffer, so that when the button is pressed, the software can look backward in time (that is, use the buffer) and find the beginning of the speech with speech boundary detection algorithms. This requires memory and constant processing, at times when nothing else is going on and the device might otherwise "go to sleep." This problem is a particular issue with battery-powered devices such as mobile phones, and not a generally attractive solution.

In embodiments, a solution to the instantiation problem may be to implement "application naming." A name may be assigned to the application, and the user is told that they must address the application (or their digital "personal assistant") by name before telling the application what they want—e.g., "Vlingo, call John Jones." If the time needed to say the name before the command is sufficient to allow the key press to be detected, only part of the name will be cut off and the command will be left intact. While the command itself is fully intact, the problem of dealing with a clipped name remains, since we must "remove" this remnant so that it doesn't get incorporated into the interpretation of the spoken command. Giving the application a name has the additional advantage that it can "personalize" it, making it seem more like a human assistant than software, and increasing acceptance of the application.

The key issue in using application naming in this context is dealing with the clipped name. The name or part of the name that isn't clipped should be recognized as the name, so that the start of the command can be accurately identified and recognized. There are several ways that this can be accomplished. Some can be used alone, and some can be combined.

In a statistical or grammar-based model of what the user will say (a "language model"), the application name (or names) can be an optional word at the start of any utterance, with probabilities (if the model is statistical) reflecting different variations on how the name is spoken, as described herein. The possibility that the name isn't spoken should be allowed, since it may be cut off entirely. This may also allow a command to be recognized at least some of the time when the application name is not spoken. The application, is designed to ignore the application name, except in special cases where it contains information (e.g., there is more than one name used, as discussed in a later section).

The way of handling clipping of the application name that appears to require the minimal change in methodology over standard recognition techniques is to add dictionary spellings of possible clipped names. For example, if the application name is "Vlingo," then the dictionary can include as possible pronunciations of Vlingo (represented phonetically); "Vlingo," "lingo," "ingo," "ngo," "go," and "o.") The case of it being clipped entirely is probably best handled as part of the definition of the language model, as discussed, but could be an option in the dictionary (that is, a possible silent pronunciation). If there are multiple names, as discussed in a later section, the application should encourage choosing names that have clearly distinct final syllables.

When speech is present as the switch closes, the clipping looks like a sudden appearance of energy to the speech processing software. This is somewhat like a "stop consonant," like "b" or "t" might look, since these are produced by closing the mouth and suddenly releasing a sound. If the sound were listened to, it might sound like a click, which has a characteristic spectrum. Whatever the specific spectrum of this onset, examples of it from many utterances can be collected, an acoustic model created for that phoneme, and it can be put in the dictionary spelling as a possible first "phoneme" for the application name, including shortened versions of that name. This creates a specific statistical model that can be used in processing, such as Hidden Markov Model processing, to fit the observed sound and give accurate recognition results.

Since the application name will be used more than any other word (in theory, at the start of every utterance), extra modeling effort is warranted. Phonetically based Hidden Markov Model (HMM) technology usually uses acoustic models of individual sounds, such as how the "a" sound in "make" sounds when the "a" sound is preceded by an "m" sound and followed by a "k" sound. It can be extended to use larger units, however, such as the "ingo" in "Vlingo." This explicit modeling should increase recognition accuracy relative to the approximate modeling of the partial phonetic spellings, even with the use of a special acoustic model for the clipped-onset sound. As the device is used, the models can be adapted using new examples.

To model some or all of the partial words as units, however, may require collecting extensive examples of the partial word if the model is to be fully general and in fact increase accuracy. Data could be collected conventionally over time from many speakers speaking many commands. This data, however, might in some cases, be specific to a particular mobile device or switch, and of limited extensibility to other cases. A shortcut that might provide more data quickly, as well as more variety, may be to artificially generate data by taking many examples of the application name in unclipped form, and using those examples to create many clipped versions from each by simulating the clipping. Since switches go from "silence" (no energy) to the speech signal being received by the microphone (created by the sound pressure wave) almost instantaneously, the simulation of this onset is particularly simple. One can simply cut off the first part of the example at a series of increasingly later points in time to create many samples from one. These samples can then be used to create an acoustic HMM model for the application name. That model could then be used as acoustic models are typically used in HMM technology.

The speech recognition technology discussed here assumes that a typical speech recognition method such as Hidden Markov Modeling (HMM) with acoustic units such as phonetic variants (e.g., triphones) is used. This methodology is well understood, and this document discusses how to vary it to accomplish the desired objectives. Explanations of the core technology include: Huang, X., Accro, A., and Hon, H-W., *Spoken Language Processing*, Prentice-Hall, 2001; and Rabiner, L., and Juang, B-H., *Fundamentals of Speech Recognition*, Prentice-Hall, 1993.

There are several possible variations on the application-naming theme, as examples:

Allow there to be more than one application name on one device, so that more than one user can have a personalized assistant. The application can use those names to treat the user differently, despite, for example, it being a single mobile phone.

Allow there to be more than one application name for one user, where the each different "assistant" does different things and may be personalized differently. For example, there could be a business persona and a personal-activity persona. Another distinction could be between general applications and the "banker," that is, applications that, for example, provided information on the value of a stock portfolio or provided access to an electronic wallet. (See "Speaker authentication for security" following.)

The user can be given a list of pre-defined names, which have been previously checked for sufficient length, which differ in final syllables in case more than one is used, and which can have empirically derived models from examples of those names collected from many speakers.

Allow the user to choose an application name, rather than having a fixed name or a list for a voice "assistant."

Typically, the name will be entered as text.

If the user is given a choice of pre-defined names from a list, the names can be pre-analyzed. As noted under "Variations," however, it may be desirable to allow the user to choose the name by which the application is addressed (or names for different functions, as discussed). In that case, there is less control, and specialized techniques can be used to make that case more effective.

If the user enters the name as text, a letter-to-sound algorithm (typically part of a text-to-speech system) can be used to create a phonetic spelling of the word that is used in the application dictionary. As noted earlier clipped phonetic spellings can also be added.

As a variation, multiple possible phonetic spellings can be created (e.g., for names that have multiple pronunciations). Each of those can be repeated to the user using text-to-speech software, and the user can pick the one that sounds closest to the desired pronunciation.

As a further variation, the user may be asked to speak the name once or more. The system can then pick from available phonetic spellings, and use the one which has the highest average recognition score.

Once the user has picked a name, the system can immediately check that if the name has sufficient duration (phonemes) to avoid clipping a command and warn the user if otherwise. The system can also ask for the name to be spoken, and suggest that another name be chosen if the recognition score is low.

Many of the techniques suggested can be done immediately when a name is chosen. Most allow improvement through adaptation using examples as the application name is used in regular usage.

With increasingly more personal data, even electronic wallets, being associated with mobile devices and PCs, security is an increasingly pressing issue. The current application-naming method can be extended to include speaker authentication, verifying a user by the characteristics of their voice (sometimes called a "voiceprint"). In the current context, verification by voice characteristics can be done "invisibly" (without specific action other than an initial enrollment) for access to specified data or applications within the device. The user can specify what data or applications require authentication.

The "token" used in speaker verification is typically different than used in speech recognition, characterized by different measurements. Speaker verification can be based on comparing how a specific word is said during an enrollment period versus during a request for access. It may be necessary to create tokens for parts of the name as defined in the speech recognition processing (parts after clipping of the initial part of the name), using the speech recognition models to first decide which was spoken. Creation of tokens for parts of the name can be done artificially during enrollment, cutting off successive pieces of a spoken token algorithmically. Within the context of the recognition of the application name, the additional processing and memory required for speaker authentication is minimal.

Alternatively, there are methods for text-independent verification that can be used on arbitrary requests, with the system stopping and asking for a password or other confirmation of the user if cumulative testing suggests the owner of the device is not the speaker. This requires a longer enrollment, and more continuous processing.

A further refinement could be to ask for a repetition of the name for particularly high-sensitivity data. When the name is requested for authentication, a data buffer could be selectively used to get the whole phrase.

There are known methods for speaker authentication that can be adapted to this context. The basic distinction is that, in speech recognition, we want to remove speaker differences in describing the speech, and use representations such as Mel-Frequency Cepstral Coefficients (MFCCs) that try to remove, for example, the impact of different average pitch values. In speaker verification, we try to retain information on where the specific resonances are within the vocal tract with different signal processing. See, for example, the following references: Cambell, J., "Speaker recognition: A tutorial," *Proc. of the IEEE,* 1997, 85(9), pp. 1437-1462; and Furui. S., "Recent Advances in Speaker Recognition," *Pattern Recognition Letters,* 1997, 8, pp. 859-872.

The methods discussed in this document can be used with speech recognition in the network (voice data transmitted over a network), speech recognition in the device ("embedded" speech recognition), and a combination of the two. Note that, even if the speech recognition is done entirely on the device, network-based processing can be done as part of the set-up process (e.g., to create clipped acoustic models) and those results uploaded for use on the device.

This section discusses how the processing of an utterance with an application name can be distributed between a device that the user is addressing and a network-based server or servers.

Continuous speech recognition technology uses search techniques that find a good (sometimes "optimal") match to what was said given all the parameters of the speech engine, including acoustic models, language models, and dictionaries. The methods use various search techniques that include the Viterbi algorithm and branch-and-bound techniques (e.g. see section 8.2.3, "How to decode an HMM—the Viterbi algorithm," and chapter 13. "Large-vocabulary search algorithms," in Spoken Language Processing, previously referenced herein).

If the entire decoding may be done on a device such as a mobile phone (a fully embedded solution), it may (1) require more processing power and memory than the device can provide; (2) use more battery power than desired; (3) create an unacceptable delay in the software responding; (4) require compromises that reduce accuracy, and the like. One approach is to do only part of the processing on the device, and particularly the part that is most predictable and doesn't require network-based data. That part is detecting the spoken application name (or clipped part thereof).

One approach to doing so is to create a language model that expects the name (defined as including parts of the name, using methods already outlined), followed by some command or information-request utterance. The last part of the utterance (after the name) can be specified in the language model as starting with an arbitrary phonetic sequence the rest of the language model is relatively unimportant. The search method can then begin at the start of the utterance and stop when it has best matched the name. The remainder of the utterance is then the command; that part of the speech is passed on to the network system for processing (along with the name, in case there is more than one name with different handling).

This has some advantages. It off-loads part of the processing from the network system, and, of course, has the advantage that the start of the command is not clipped. Since name detection is done on the device, it is easier to manage the creation of user-chosen names without network interaction or to create multiple names for different classes of tasks.

Additional speech recognition processing can be done on the device, e.g., checking the command part of the utterance to see if it matches a voice dialing grammar (dialing by spoken name or number), and completing the command if it does, but otherwise sending the speech data on for network processing.

The method, and systems described herein may be deployed in part or in whole through a machine that executes computer software, program codes, and/or instructions on a processor. The present invention may be implemented as a method on the machine, as a system or apparatus as part of or in relation to the machine, or as a computer program product embodied in a computer readable medium executing on one or more of the machines. The processor may be part of a server, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client.

The client may provide an interface to other devices including, without limitation, servers, other clients, primers, database servers, print servers, file servers, communication servers, distributed servers and the like. Additionally, this coupling and/or connection may facilitate remote execution of program across the network. The networking of some or all of these devices may facilitate parallel processing of a program or method at one or more location without deviating from the scope of the invention. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer to peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine readable medium.

The computer executable code may be created using a structured programming language such as C, an object oriented programming language such as C++, or any other high-level or low-level programming language (including assembly languages, hardware description, languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method of interacting with a mobile communication facility comprising:

generating a plurality of clipped versions of a voice command, wherein the plurality of the clipped versions of the voice command is simulated from a complete voice command;

receiving a switch activation from a user to initiate a speech recognition recording session, wherein the speech recognition recording session comprises the voice command from the user followed by speech to be recognized from the user;

recording the speech recognition recording session using a mobile communication facility resident capture facility;

detecting a first portion of the voice command as clipped and a second portion of the voice command as a portion of the command that was not clipped off during the speech recognition recording session, wherein the first portion is determined as being clipped as a result of the user providing the command before the mobile communication facility resident capture facility was ready to receive is based in part on the plurality of clipped versions of the voice command;

recognizing the first portion of the voice command as an indication that user speech for recognition will begin following the end of the first portion of the voice command;

recognizing the recorded speech in the second portion of the voice command using a speech recognition facility to produce an external output; and using the selected output to perform a function on the mobile communication facility.

2. The method of claim 1, wherein the voice command is a single word.

3. The method of claim 1, wherein the voice command is multiple words.

4. The method of claim 1, wherein the switch is a physical switch on the mobile communication facility.

5. The method of claim 1, wherein the switch is a virtual switch displayed on the mobile communications facility.

6. The method of claim 1, wherein the voice command is pre-defined.

7. The method of claim 1, wherein the voice command is an application name.

8. The method of claim 1, wherein the voice command is user selectable.

9. The method of claim 8, wherein the user inputs the voice command by voice input.

10. The method of claim 8, wherein the user inputs the voice command by typing.

11. The method of claim 1, wherein the voice command is verified by characteristics of the user's voice.

12. The method of claim 1, wherein the at least a portion of the voice command is a portion of the command that was not clipped off during the speech recognition recording session as a result of user providing the command before the mobile communication facility resident capture facility was ready to receive.

13. The method of claim 1, wherein the recognizing at least a portion of the voice command is through language modeling.

14. The method of claim 13, wherein the language modeling involves collecting examples of portions of the voice command as spoken by a plurality of users.

15. The method of claim 1, wherein the recognizing at least a portion of the voice command is through dictionary representation.

16. The method of claim 1, wherein the recognizing at least a portion of the voice command is through acoustic modeling.

17. The method of claim 16, wherein the acoustic modeling creates a statistical model that can be used in Hidden Markov Model processing to fit a sound of the at least a portion of the voice command.

18. The method of claim 17, wherein the at least a portion of the voice command is an individual sound.

19. The method of claim 17, wherein the at least a portion of the voice command is a plurality of sounds.

20. The method of claim 16, wherein the acoustic modeling involves collecting examples of sounds for the voice command as spoken by a plurality of users.

21. The method of claim 1, wherein the speech recognition facility is internal to the mobile communication facility.

22. The method of claim 1, wherein the speech recognition facility is external to the mobile communication facility.

23. The method of claim 1, wherein the recognizing at least a portion of the voice command is performed internal to the mobile communication facility, and recognizing the recorded speech is performed external to the mobile communications facility.

24. A method of interacting with a mobile communication facility comprising:
- generating a plurality of clipped versions of a voice command, wherein the plurality of the clipped versions of the voice command is simulated from a complete voice command;
- receiving a switch activation from a user to initiate a speech recognition recording session, wherein the speech recognition recording session comprises the voice command from the user followed by speech to be recognized from the user;
- recording the speech recognition recording session using a mobile communication facility resident capture facility;
- detecting a first portion of the voice command as entirely clipped and a second portion of the voice command as a portion of the command that was not clipped off during the speech recognition recording session, wherein the first portion is determined as being clipped as a result of the user providing the command before the mobile communication facility resident capture facility was ready to receive is based in part on the plurality of clipped versions of the voice command;
- recognizing the first portion of the voice command as an indication that user speech for recognition will begin following the end of the first portion of the voice command;
- recognizing the recorded speech in the second portion of the voice command using a speech recognition facility to produce an external output; and
- using the selected output to perform a function on the mobile communication facility.

* * * * *